(12) United States Patent
Min et al.

(10) Patent No.: US 12,556,789 B2
(45) Date of Patent: Feb. 17, 2026

(54) CAMERA ACTUATOR, AND CAMERA DEVICE AND OPTICAL DEVICE COMPRISING SAME

(71) Applicant: LG INNOTEK CO., LTD., Seoul (KR)

(72) Inventors: Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 183 days.

(21) Appl. No.: 18/286,396

(22) PCT Filed: Apr. 14, 2022

(86) PCT No.: PCT/KR2022/005417
§ 371 (c)(1),
(2) Date: Oct. 11, 2023

(87) PCT Pub. No.: WO2022/220617
PCT Pub. Date: Oct. 20, 2022

(65) Prior Publication Data
US 2024/0201564 A1    Jun. 20, 2024

(30) Foreign Application Priority Data

Apr. 15, 2021 (KR) .................. 10-2021-0049232
May 10, 2021 (KR) .................. 10-2021-0060049

(51) Int. Cl.
*G03B 3/10* (2021.01)
*G02B 7/02* (2021.01)
(Continued)

(52) U.S. Cl.
CPC ............ *H04N 23/54* (2023.01); *G02B 7/021* (2013.01); *G02B 13/0065* (2013.01); *G03B 3/10* (2013.01);
(Continued)

(58) Field of Classification Search
None
See application file for complete search history.

(56) References Cited

U.S. PATENT DOCUMENTS 5,253,005 A     10/1993  Koyama et al.
2018/0164603 A1*  6/2018  Taguchi ............... H01F 27/36
(Continued)

FOREIGN PATENT DOCUMENTS

JP    2004-047849    2/2004
JP    2004-200406    7/2004
(Continued)

OTHER PUBLICATIONS

International Search Report dated Jul. 12, 2022 issued in Application No. PCT/KR2022/005417.
(Continued)

*Primary Examiner* — Paul M Berardesca
(74) *Attorney, Agent, or Firm* — KED & ASSOCIATES

(57) ABSTRACT

Disclosed in an embodiment of the present invention is a camera actuator comprising: a housing; a first lens assembly and a second lens assembly, moving in an optical axis direction with respect to the housing; and a driver unit for moving the first lens assembly and the second lens assembly, wherein the driver unit comprises: a driver coil; and a driver magnet facing the driver coil, and the driver coil comprises: a first pattern area; and a second pattern area arranged in a direction perpendicular to the first pattern area, wherein a width of the first pattern area differs from a width of the second pattern area.

20 Claims, 31 Drawing Sheets

(51) Int. Cl.
    *G02B 13/00*     (2006.01)
    *G03B 5/00*     (2021.01)
    *G03B 17/17*     (2021.01)
    *H02K 3/28*     (2006.01)
    *H04N 23/54*     (2023.01)
    *H04N 23/55*     (2023.01)
    *H04N 23/57*     (2023.01)
    *H04N 23/68*     (2023.01)

(52) U.S. Cl.
    CPC .............. *G03B 5/00* (2013.01); *G03B 17/17* (2013.01); *H02K 3/28* (2013.01); *H04N 23/55* (2023.01); *H04N 23/57* (2023.01); *H04N 23/687* (2023.01); *G03B 2205/0046* (2013.01); *G03B 2205/0069* (2013.01)

(56) References Cited

U.S. PATENT DOCUMENTS

| | | | |
|---|---|---|---|
| 2020/0052621 A1* | 2/2020 | Yu | G03B 3/10 |
| 2020/0249423 A1* | 8/2020 | Yang | H02K 41/0354 |
| 2020/0278073 A1* | 9/2020 | Yoshida | H04N 23/695 |
| 2021/0294184 A1* | 9/2021 | Kim | G03B 17/17 |
| 2022/0059266 A1* | 2/2022 | Saito | H05K 1/16 |
| 2022/0157503 A1* | 5/2022 | Saito | H01F 5/06 |
| 2022/0208428 A1* | 6/2022 | Tsuda | H05K 1/165 |
| 2022/0272244 A1* | 8/2022 | Yamashita | H01F 5/003 |
| 2023/0114245 A1* | 4/2023 | Lee | H02K 41/0354 |
| | | | 359/819 |
| 2023/0187120 A1* | 6/2023 | Kim | H01F 27/2804 |
| | | | 336/90 |
| 2023/0296964 A1* | 9/2023 | Park | H04N 23/51 |
| | | | 348/345 |
| 2024/0006945 A1* | 1/2024 | Lee | G03B 5/02 |
| 2025/0047962 A1* | 2/2025 | Jun | G03B 3/10 |

FOREIGN PATENT DOCUMENTS

| | | |
|---|---|---|
| KR | 10-2017-0062795 | 6/2017 |
| KR | 10-2020-0006607 | 1/2020 |
| KR | 10-2020-0038431 | 4/2020 |
| KR | 10-2021-0000069 | 1/2021 |
| KR | 10-2021-0022501 | 3/2021 |

OTHER PUBLICATIONS

Korean Office Action issued in Application No. 10-2021-0060049 dated Apr. 29, 2025.

* cited by examiner

FIG. 15
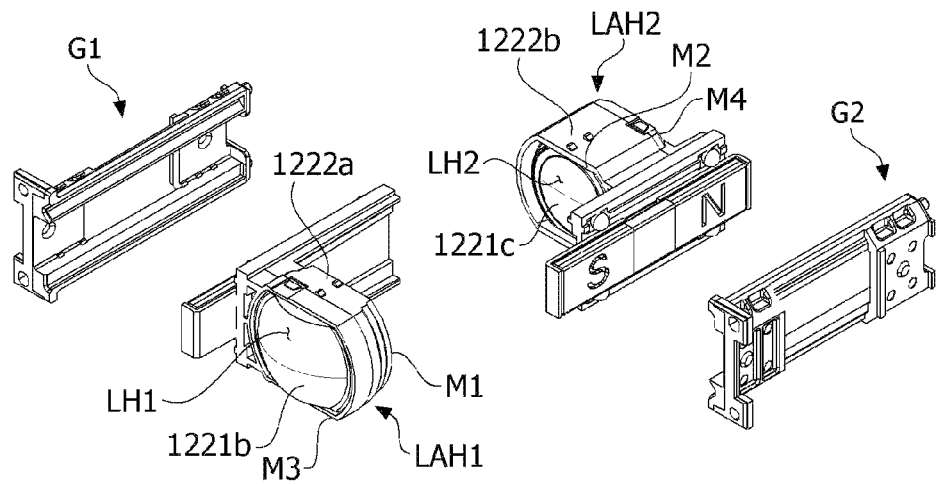
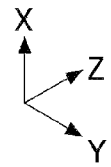
FIG. 16
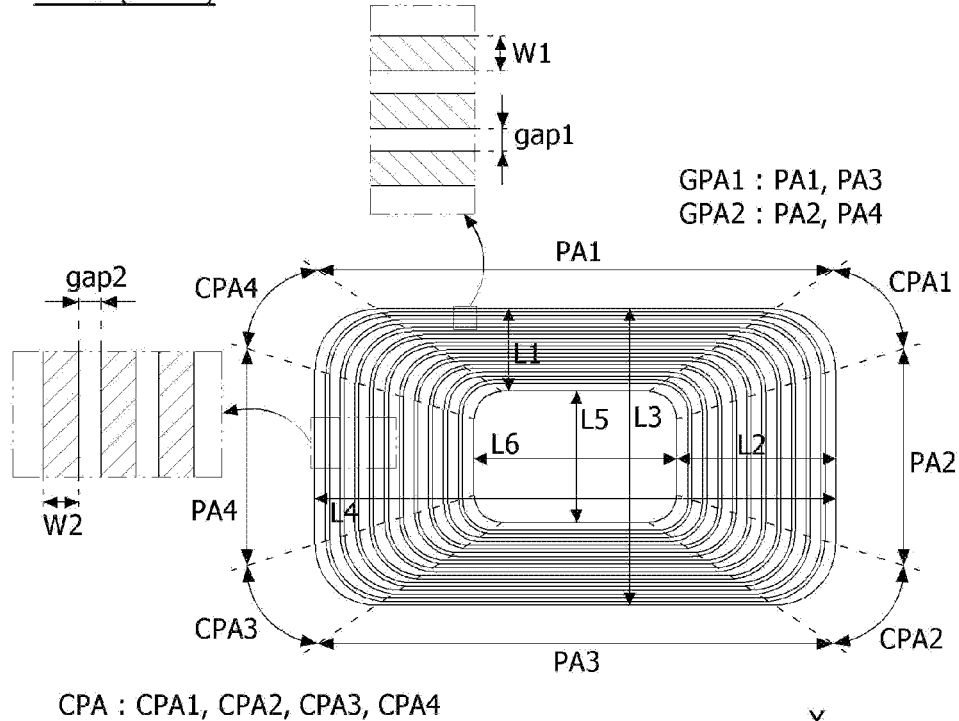
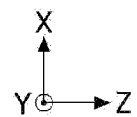

001
CAMERA ACTUATOR, AND CAMERA DEVICE AND OPTICAL DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/005417, filed Apr. 14, 2022, which claims priority to Korean Patent Application Nos. 10-2021-0049232, filed Apr. 15, 2021 and 10-2021-0060049, filed May 10, 2021, whose entire disclosures are hereby incorporated by reference.

TECHNICAL FIELD

The present invention relates to a camera actuator, and a camera device and an optical instrument including the same.

BACKGROUND ART

A camera is a device for photographing pictures or videos of subjects and is mounted on a mobile device, a drone, a vehicle, etc. A camera device or a camera module may have an image stabilization (IS) function of correcting or preventing the image shake caused by a user's motion in order to improve the quality of the image, an auto focusing (AF) function of aligning a focal length of a lens by automatically adjusting a distance between an image sensor and the lens, and a zooming function of capturing a remote subject by increasing or decreasing the magnification of the remote subject through a zoom lens.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to a general OIS technique, the motion of the camera may be detected through a gyro sensor or the like, and a lens may tilt or move, or a camera device including the lens and an image sensor may tilt or move based on the detected motion. When the lens or the camera device including the lens and the image sensor tilts or moves for OIS, it is necessary to additionally secure a space for tilting or moving around the lens or the camera device.

Meanwhile, an actuator for OIS may be disposed around the lens. In this case, the actuator for OIS may include actuators, which are in charge of two axes perpendicular to an optical axis Z, that is, an actuator in charge of an X-axis tilting and an actuator in charge of a Y-axis tiling.

However, according to the needs of ultra-slim and ultra-small camera devices, there is a large space constraint for arranging the actuator for OIS, and it may be difficult to ensure a sufficient space where the lens or the camera device including the lens and the image sensor itself may tilt or move for OIS. In addition, as the camera has a higher pixel density, it is preferable that a size of the lens be increased to increase the amount of received light, and there may be a limit to increasing the size of the lens due to a space occupied by the actuator for OIS.

In addition, the demand and production of electronic products, such as smartphones and portable phones in which a camera is mounted, are increasing. The trend of a camera for a portable phone is higher resolution and miniaturization, and thus an actuator is also becoming smaller, larger in diameter, and multi-functional. In order to implement a camera for a portable phone having a higher pixel density, improved performance and additional functions, such as auto focusing, improved shutter shake, and zooming function of the camera for the portable phone, are required.

In addition, when the zooming function, the AF function, and the OIS function are all included in the camera device, there is a problem that an OIS magnet and an AF or zoom magnet are disposed close to each other and cause magnetic field interference.

Technical Problem

The present invention is directed to providing a camera actuator, a camera device and an optical instrument applicable to ultra-slim, ultra-small, and high-resolution cameras.

In addition, the present invention is directed to providing a camera actuator, a camera device, and an optical instrument, which have an increased moving distance of a lens assembly through a shape of a driving coil.

In addition, the present invention is directed to providing a small camera actuator, camera device, and optical instrument through the shape of the driving coil.

In addition, the present invention is directed to providing a camera actuator, a camera device, and an optical instrument, which have an increased moving distance for auto focusing (AF) in order to implement high-magnification zoom.

In addition, the present invention is directed to providing a camera actuator, a camera device, and an optical instrument, of which a weight is decreased due to a decrease in size of a driving magnet.

In addition, an embodiment is directed to providing a camera actuator, a camera device, and an optical instrument, of which an increase in thickness can be prevented even when a size of an image sensor increases.

The object of embodiments is not limited thereto and may also include objects or effects that may be identified from the configurations or embodiments to be described below.

Technical Solution

A camera actuator according to an embodiment of the present invention includes a housing, a first lens assembly and a second lens assembly configured to move in an optical axis direction based on the housing, and a driving unit configured to move the first lens assembly and the second lens assembly, wherein the driving unit includes a driving coil and a driving magnet facing the driving coil, the driving coil includes a first pattern area and a second pattern area disposed in a direction perpendicular to the first pattern area, and a width of the first pattern area differs from a width of the second pattern area.

The driving coil may include a third pattern area facing the first pattern area, and a fourth pattern area facing the second pattern area, and a width of the fourth pattern area may be larger than a width of the third pattern area.

The driving coil may include a curve pattern area connecting the first pattern area to the second pattern area.

The curve pattern area may include a first curve pattern area to a fourth curve pattern area.

The width of the first pattern area may be smaller than the width of the second pattern area.

The driving coil may be formed with a plurality of turns.

The width of the first pattern area may be smaller than the width of the second pattern area.

The first pattern area may be disposed at one side, the second pattern area may be disposed to be spaced apart from the first pattern area, and the third pattern area may be disposed to be spaced apart from the fourth pattern area.

An innermost turn among a plurality of turns of the driving coil may have a first point which is one end of any one of the first pattern area and the third pattern area, an outermost turn among the plurality of turns of the driving coil may have a second point which is one end of any one of the first pattern area and the third pattern area, and a virtual line connecting the first point to the second point may be inclined at a first angle with respect to an optical axis.

The first curve pattern area may be an area in which a width of the first curved pattern area is changed, and a first angle between a first boundary line in contact with the first pattern area and a second boundary line in contact with the second pattern area may be in a range of 20 to 45 degrees.

The first angle may be in a range of 20 to 45 degrees.

A maximum moving distance of the driving magnet may be larger than or equal to the width of the second pattern area.

A ratio of the width of the first pattern area to the width of the second pattern area may be in a range of 1:1.5 to 1:4.5.

The width of the first pattern area may be a length in a vertical direction between an innermost turn and an outermost turn among the plurality of turns in the first pattern area, and the width of the second pattern area may be a length in an optical axis direction between an innermost turn and an outermost turn among the plurality of turns in the second pattern area.

A ratio of a first width to a second width may be in a range of 1:1.5 to 1:4, the first width may be a distance in the vertical direction between the outermost turn among the plurality of turns in the first pattern area and the outermost turn among the plurality of turns in the third pattern area, and the second width may be a distance in the optical axis direction between the outermost turn among the plurality of turns in the second pattern area and the outermost turn among the plurality of turns in the fourth pattern area.

A ratio of a third width to a fourth width may be in a range of 1:1.5 to 1:2.5, the third width may be a distance in the vertical direction between the innermost turn among the plurality of turns in the first pattern area and the innermost turn among the plurality of turns in the second pattern area, and the fourth width may be a distance in the optical axis direction between the innermost turn among the plurality of turns in the third pattern area and the innermost turn among the plurality of turns in the fourth pattern area.

A width of the curve pattern area may decrease as the width approaches the first pattern area or the third pattern area.

A surface of the driving magnet facing the driving coil may include a first magnet area having a first polarity, and a second magnet area having a second polarity, and the first polarity may be opposite to the second polarity.

The first magnet area and the second magnet area may be spaced apart from each other in the optical axis direction.

Lengths of the first magnet area and the second magnet area in the vertical direction may be smaller than a length of the second pattern area in the vertical direction.

The driving magnet may include a neutral area between the first magnet area and the second magnet area.

The camera actuator may include a plurality of Hall sensors positioned within the innermost turn among the plurality of turns of the driving coil.

The first lens assembly may include a first lens hole, and the second lens assembly may include a second lens hole and include at least one lens disposed in each of the first lens hole and the second lens hole.

The housing may include a first side portion and a second side portion corresponding to the first side portion and include a guide unit disposed adjacent to at least one of the first side portion and the second side portion.

The driving coil may be disposed on a side portion of the first side portion and the second side portion, which is disposed adjacent to the guide unit.

The first lens assembly may include a first ball disposed on an upper side of the first lens assembly and a second ball disposed on a lower side of the first lens assembly, in which the first ball and the second ball may be disposed between the first lens assembly and the guide unit.

The first lens assembly may include a first recess in which the first ball is seated, and a second recess in which the second ball is seated.

The guide unit may include a guide groove in which the first ball and the second ball are seated.

A width of any one of the plurality of turns in the first pattern area may be smaller than a width of any one of the plurality of turns in the second pattern area.

A camera actuator according to an embodiment includes a housing, a first lens assembly and a second lens assembly configured to move in an optical axis direction based on the housing, and a driving unit configured to move the first lens assembly and the second lens assembly, wherein the driving unit includes a driving coil and a driving magnet facing the driving coil, the driving coil includes a first pattern area and a second pattern area disposed in a direction perpendicular to the first pattern area, and ½ times (0.5 times) a maximum moving distance of the driving magnet is smaller than or equal to a width of the second pattern area.

The maximum moving distance of the driving magnet may be larger than a width of the first pattern area.

A ratio of the maximum moving distance of the driving magnet to the width of the first pattern area may be in a range of 1:0.1 to 1:0.6.

A camera device according to an embodiment includes an optical path changing unit including an incident surface through which light enters in a first vertical direction and an emitting surface through which the light is emitted in a first lateral direction perpendicular to the first vertical direction, a moving unit configured to move a lens module configured to pass through the light emitted from the emitting surface, a reflective unit including a first reflector configured to primarily reflect the light passing through the lens module in a second vertical direction, which is a direction opposite to the first vertical direction, a second reflector configured to secondarily reflect the primarily reflected light in the first lateral direction, and a third reflector configured to tertiarily reflect the secondarily reflected light in the first vertical direction, and an image sensor configured to receive the light reflected by the third reflector.

The image sensor may include an active area including at least one pixel, and the active area may be parallel to the incident surface.

An uppermost end of the first reflector may be positioned under a baseline, and the baseline may be a line parallel to the incident surface.

A lowermost end of the second reflector and a lowermost end of the third reflector may be positioned above the baseline or positioned at the same height as the baseline.

The lowermost end of the second reflector and the lowermost end of the third reflector may be positioned under the baseline or positioned at the same height as the baseline.

A distance from the baseline to the lowermost end of the second reflector may be smaller than a distance from the baseline to an uppermost end of the second reflector.

The distance from the baseline to the lowermost end of the second reflector may be equal to or smaller than a distance from the baseline to the uppermost end of the first reflector.

A distance in the first vertical direction from the lowermost end of the third reflector to the image sensor may be equal to or smaller than a distance in the first vertical direction from the lowermost end of the second reflector to the lowermost end of the first reflector.

The camera device may include a convex lens disposed on the incident surface. The camera device may include a concave lens disposed between the image sensor and the third reflector.

The optical path changing unit may be tilted about an axis perpendicular to an optical axis direction of the lens module.

An upper end of the second reflector and an upper end of the third reflector may be spaced apart from each other. Alternatively, the upper end of the second reflector and the upper end of the third reflector may be in contact with each other.

The moving unit may move the lens module in a direction perpendicular to the optical axis direction. The camera device may include a filter disposed between the concave lens and the image sensor.

An optical instrument according to an embodiment includes a display panel, and a camera device disposed under the display panel, wherein the camera device includes an optical path changing unit including an incident surface through which light enters in a first vertical direction and an emitting surface through which the light is emitted in a first horizontal direction perpendicular to the first vertical direction, a moving unit configured to move a lens module configured to pass through the light emitted from the emitting surface, a reflective unit including a first reflector configured to primarily reflect the light passing through the lens module in a second vertical direction, which is a direction opposite to the first vertical direction, a second reflector configured to secondarily reflect the primarily reflected light in the first lateral direction, and a third reflector configured to tertiarily reflect the secondarily reflected light in the first vertical direction, and an image sensor configured to receive the light reflected by the third reflector. The image sensor may include an active area including at least one pixel, and the active area may be parallel to a front surface of the display panel.

Advantageous Effects

According to embodiments of the present invention, it is possible to provide a camera actuator, a camera device, and an optical instrument applicable to ultra-slim, ultra-small, and high-resolution cameras. In particular, it is possible to effectively arrange an actuator for an optical image stabilizer (OIS) even without increasing the entire size of the camera device.

According to the embodiments of the present disclosure, it is possible to implement a precise OIS function by implementing an X-axis tilting and a Y-axis tilting with a stable structure without causing magnetic field interference between the X-axis tilting and the Y-axis tilting and by not causing magnetic field interference with an auto focusing (AF) actuator or a zooming actuator.

According to the present invention, it is possible to implement a camera actuator, a camera device, and an optical instrument applicable to ultra-slim, ultra-small, and high-resolution cameras.

According to the present invention, it is possible to implement a camera actuator, a camera device, and an optical instrument, of which a moving distance of a lens assembly is increased through a shape of a driving coil.

In addition, it is possible to implement a camera actuator, a camera device, and an optical instrument, of which a moving distance for AF is increased in order to implement high-magnification zoom.

According to the present invention, it is possible to implement a small camera actuator, camera device, and optical instrument through the shape of the driving coil.

According to the present invention, it is possible to implement a camera actuator, a camera device, and an optical instrument, of which a weight is decreased due to a decrease in size of a driving magnet.

In addition, according to embodiments, since an image sensor is disposed parallel to an incident surface of an optical path changing unit or a front surface of a display panel, a size of an optical instrument in a direction perpendicular to the display panel does not increase even when a size of the image sensor increases, and thus it is possible to prevent an increase in thickness of the optical instrument.

In addition, by adjusting heights of a second reflector and a third reflector, it is possible to decrease a height of an optical instrument in a vertical direction, thereby preventing the increase in the thickness of the optical instrument.

Various and beneficial advantages and effects of the present invention are not limited to the above-described contents and will be more readily understood in a process of describing specific embodiments of the present invention.

DESCRIPTION OF DRAWINGS

FIG. 15 is a perspective view illustrating a first lens assembly, a first bonding member, a second bonding member, and a second lens assembly according to the embodiment.

FIG. 16 is a view illustrating a second driving coil according to the embodiment.

MODES OF THE INVENTION

Figure 1:
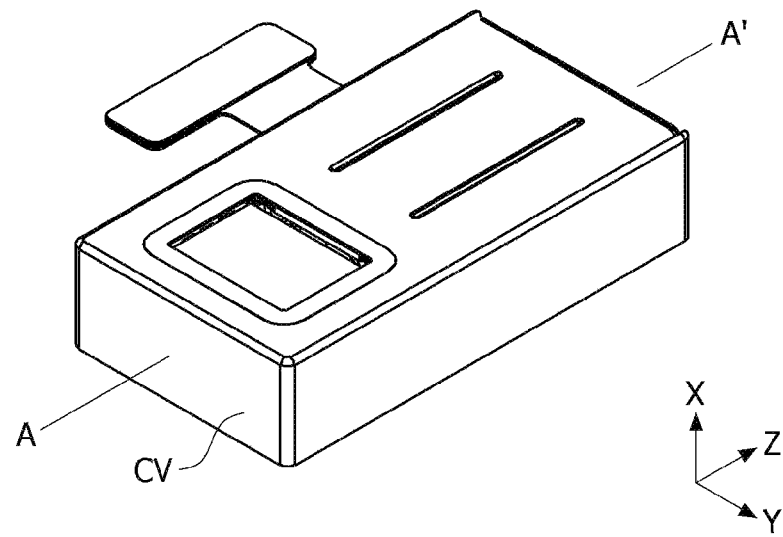
FIG. 1 is a perspective view illustrating a camera device according to an embodiment.

Since the present invention may have various changes and various embodiments, specific embodiments are illustrated and described in the accompanying drawings.

However, it should be understood that this is not intended to limit the present invention to specific embodiments and includes all modifications and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
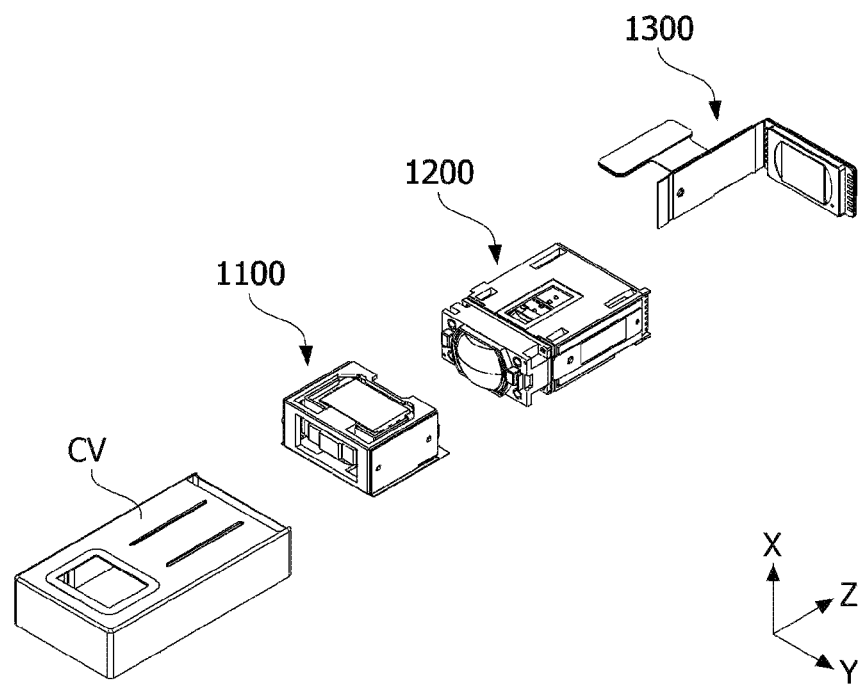
FIG. 2 is an exploded perspective view illustrating the camera device according to the embodiment.
Figure 3:
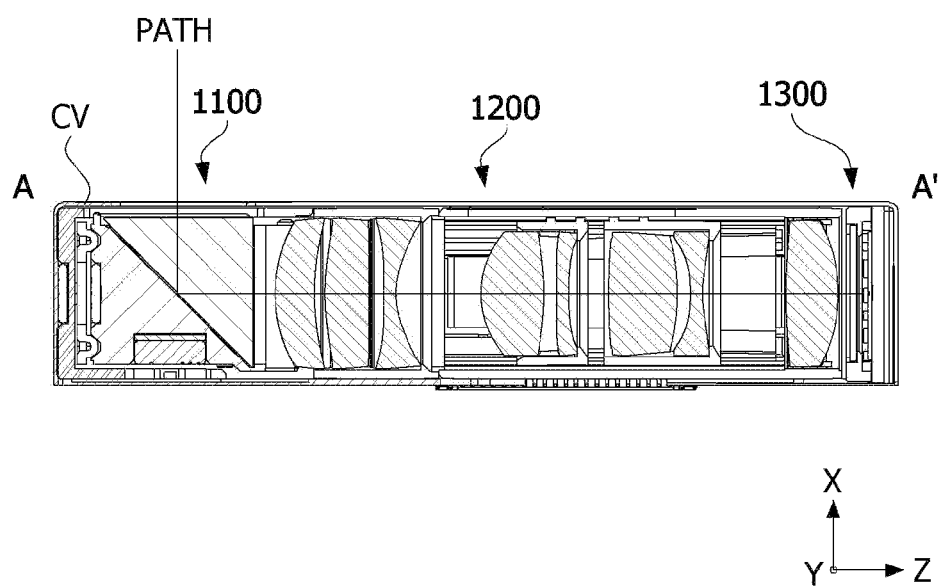
FIG. 3 is a cross-sectional view illustrating the camera device along line A-A' in FIG. 1.

FIG. 1 is a perspective view illustrating a camera device according to an embodiment, FIG. 2 is an exploded perspective view illustrating the camera device according to the embodiment, and FIG. 3 is a cross-sectional view illustrating the camera device along line A-A' in FIG. 1.

Referring to FIGS. 1 and 2, a camera module 1000 according to an embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and/or the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV. The cover CV may be a shield can.

In addition, the first camera actuator 1100 may be an optical image stabilizer (OIS) actuator.

In the embodiment, the first camera actuator 1100 may change an optical path. In the embodiment, the first camera actuator 1100 may vertically change the optical path through an internal optical member (e.g., a prism or a mirror). With this configuration, even when a thickness of a mobile terminal decreases, a configuration of a lens that is larger than the thickness of the mobile terminal is disposed in the mobile terminal so that magnification, auto focusing (AF), and OIS functions may be performed through the change in the optical path.

The first camera actuator 1100 may change the optical path from a first direction to a third direction. In the specification, an optical axis direction is a third direction or a Z-axis direction and corresponds to a traveling direction of light provided to an image sensor.

Additionally, the first camera actuator 1100 may include a fixed focal length lens disposed in a predetermined barrel (not illustrated). The fixed focal length lens may be referred to as "single focal length lens" or "single lens."

The second camera actuator 1200 may be disposed at a rear end of the first camera actuator 1100. The second camera actuator 1200 may be coupled to the first camera actuator 1100. In addition, mutual coupling may be performed by various methods.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a controller.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may be provided with an image sensor. Furthermore, a base unit including a filter may be seated on the circuit board 1300. A description thereof will be made below.

The camera device according to the embodiment may be formed of one camera device or a plurality of camera devices. For example, the plurality of camera devices may include a first camera device and a second camera device. In addition, as described above, the camera device may be used interchangeably with "camera module," "camera device," "imaging device," "imaging module," "imaging machine," etc.

In addition, the first camera device may include one actuator or a plurality of actuators. For example, the first camera device may include the first camera actuator 1100 and the second camera actuator 1200.

In addition, the second camera device may include an actuator (not illustrated) disposed in a predetermined housing (not illustrated) and capable of driving a lens unit. The actuator may be a voice coil motor, a micro actuator, a silicon actuator, or the like and applied in various methods such as an electrostatic method, a thermal method, a bimorph method, and an electrostatic force method, but the present invention is not limited thereto. In addition, in the specification, the camera actuator may be referred to as "actuator," etc. In addition, the camera device formed of the plurality of camera devices may be mounted in various electronic devices such as a mobile terminal.

Referring to FIG. 3, the camera device according to the embodiment may include the first camera actuator 1100 for performing the OIS function and the second camera actuator 1200 for performing the zooming function and the AF function.

Light may enter the camera device through an opening area positioned in an upper surface of the first camera actuator 1100. In other words, the light may enter the first camera actuator 1100 in an optical axis direction (e.g., an X-axis direction), and the optical path may be changed into a vertical direction (e.g., a Z-axis direction) through the optical member. In addition, the light may pass through the second camera actuator 1200 and may enter an image sensor IS positioned at one end of the second camera actuator 1200 (PATH).

In the specification, a lower surface refers to one side in a first direction. In addition, the first direction is the X-axis direction in the drawings and may be used interchangeably with a second axis direction, etc. A second direction is a Y-axis direction in the drawings and may be used interchangeably with a first axis direction, etc. The second direction is a direction perpendicular to the first direction. In addition, a third direction is the Z-axis direction in the drawings and may be used interchangeably with a third axis direction, etc. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. A detailed description thereof will be made below. In addition, hereinafter, the optical axis direction corresponds to the optical path and is the third direction (Z-axis direction) in the description of the second camera actuator 1200, and the following description will be made based on this.

In addition, with this configuration, the camera device according to the embodiment may resolve the spatial limitations of the first camera actuator and the second camera actuator by changing the optical path. In other words, the camera device according to the embodiment may extend the optical path while minimizing the thickness of the camera device in response to the change in the optical path. Furthermore, it should be understood that the second camera actuator may provide a high range of magnification by controlling a focus or the like in the extended optical path.

In addition, the camera device according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, the first lens assembly and the second lens assembly may be moving lenses that move through the coil, the magnet, and the guide pin, and the third lens assembly may be a fixed lens, but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF/zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, shaking correction, etc.

Figure 4:
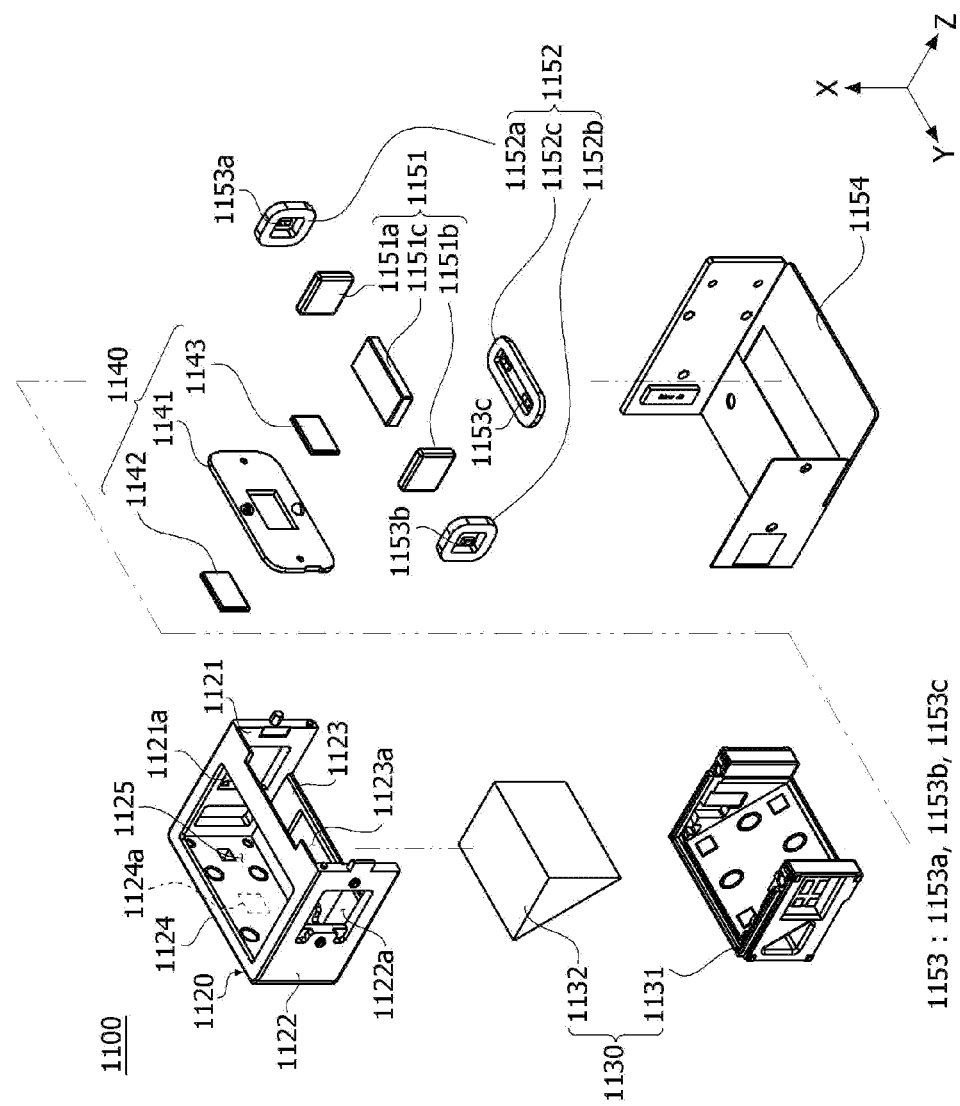
FIG. 4 is an exploded perspective view illustrating a first camera actuator according to the embodiment.

FIG. 4 is an exploded perspective view illustrating a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnetic part 1142 having a coupling strength with the rotating plate 1141, and a second magnetic part 1143 positioned within the rotating plate 1141. In addition, the first driving unit 1150 includes a driving magnet 1151, a driving coil 1152, a Hall sensor unit 1153, and a first board unit 1154. The rotating plate may be used interchangeably with "tilting plate," "moving plate," etc.

The first shield can (not illustrated) may be positioned at an outermost side of the first camera actuator 1100 and positioned to surround the rotating unit 1140 and the first driving unit 1150, which will be described below.

The first shield can (not illustrated) can block or reduce electromagnetic waves generated from the outside. Therefore, it is possible to reduce the occurrence of malfunction in the rotating unit 1140 or the first driving unit 1150.

The first housing 1120 may be positioned inside the first shield can (not illustrated). In addition, the first housing 1120 may be positioned inside the first board unit 1154 to be described below. The first housing 1120 may be fastened by being fitted into or matched with the first shield can (not illustrated).

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may include a lower surface as a lower side portion of the first housing 1120.

In addition, the first housing side portion 1121 may include a first housing hole 1121a. A first coil 1152a to be described below may be positioned in the first housing hole 1121a.

In addition, the second housing side portion 1122 may include a second housing hole 1122a. In addition, a second coil 1152b to be described below may be positioned in the second housing hole 1122a.

The first coil 1152a and the second coil 1152b may be coupled to the first board unit 1154. In the embodiment, the first coil 1152a and the second coil 1152b may be electrically connected to the first board unit 1154 so that a current may flow therebetween. The current is an element of an electromagnetic force capable of tilting the first camera actuator with respect to the X axis.

In addition, the third housing side portion 1123 may include a third housing hole 1123a. A first coil 1152c to be described below may be positioned in the third housing hole 1123a. The third coil 1152c may be coupled to the first board unit 1154. In addition, the third coil 1152c may be electrically connected to the first board unit 1154 so that a current may flow therebetween. The current is an element of an electromagnetic force capable of tilting the first camera actuator with respect to the Y-axis.

The fourth housing side portion 1124 may include a first housing hole 1124a. The first magnetic part 1142 to be described below may be disposed in an area facing the first housing groove 1124a. Therefore, the first housing 1120 may be coupled to the rotating plate 1141 by a magnetic force, etc.

In addition, the first housing groove 1124a according to the embodiment may be positioned on an inner surface or an outer surface of the fourth housing side portion 1124. Therefore, the first magnetic part 1142 may also be disposed to correspond to a position of the first housing groove 1124a.

In addition, the first housing 1120 may include an accommodating part 1125 formed by the first to fourth housing side portions 1121 to 1224. The mover 1130 may be positioned in the accommodating part 1125.

The mover 1130 may include the holder 1131 and the optical member 1132 seated on the holder 1131.

The holder 1131 may be seated in an accommodating part 1125 of the first housing 1120. The holder 1131 may include a first prism outer surface to a fourth prism outer surface respectively corresponding to the first housing side portion 1121, the second housing side portion 1122, the third housing side portion 1123, and the first member 1124.

A seating groove in which the second magnetic part 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera device. In other words, the optical member 1132 can resolve spatial limits of the first camera actuator and the second camera actuator by changing the path of the reflected light. Therefore, it should be understood that the camera device may provide a high range of magnification by extending the optical path while a thickness thereof is minimized.

The rotating unit 1140 includes the rotating plate 1141, the first magnetic part 1142 having the coupling strength with the rotating plate 1141, and the second magnetic part 1143 positioned within the rotating plate 1141.

The rotating plate 1141 may be coupled to the mover 1130 and the first housing 1120. The rotating plate 1141 may include an additional magnetic part (not illustrated) positioned therein.

In addition, the rotating plate 1141 may be disposed adjacent to the optical axis. Therefore, the actuator according to the embodiment may easily change the optical path according to the tilting of the first and second axes to be described below.

The rotating plate 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be made below.

In addition, the first magnetic part 1142 includes a plurality of yokes, and the plurality of yokes may be positioned to face each other based on the rotating plate 1141. In the embodiment, the first magnetic part 1142 may include a plurality of facing yokes. In addition, the rotating plate 1141 may be positioned between the plurality of yokes.

As described above, the first magnetic part 1142 may be positioned in the first housing 1120. In addition, as described above, the first magnetic part 1142 may be seated on an inner surface or outer surface of the fourth housing side portion 1124. For example, the first magnetic part 1142 may be seated in a groove formed in the outer surface of the fourth housing side portion 1124. Alternatively, the first magnetic part 1142 may be seated in the first housing groove 1124a.

In addition, the second magnetic part 1143 may be positioned on an outer surface of the mover 1130, particularly, the holder 1131. With this configuration, the rotating plate 1141 may be easily coupled to the first housing 1120 and the mover 1130 by the coupling strength generated by a magnetic force between the second magnetic part 1143 and the first magnetic part 1142 disposed therein. In the present invention, the positions of the first magnetic part 1142 and the second magnetic part 1143 may be moved.

The first driving unit 1150 includes the first driving magnet 1151, the first driving coil 1152, the first Hall sensor unit 1153, and the first board unit 1154.

The first driving magnet 1151 may include a plurality of magnets. In the embodiment, the first driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. In addition, the third magnet 1151c may be positioned on a lower surface of the outer surface of the holder 1131. A detailed description thereof will be made below.

The first driving magnet 1152 may include a plurality of coils. In the embodiment, the first driving coil 1152 may include a first coil 1152a, a second coil 1152b, and a third coil 1152c.

The first coil 1152a may be positioned to face the first magnet 1151a. Therefore, as described above, the first coil 1152a may be positioned in the first housing hole 1121a of the first housing side portion 1121.

In addition, the second coil 1152b may be positioned to face the second magnet 1151b. Therefore, as described above, the second coil 1152b may be positioned in the second housing hole 1122a of the second housing side portion 1122.

The first coil 1152a may be positioned to face the second coil 1152b. In other words, the first coil 1152a may be symmetrically disposed based on the second holder outer surface 1152b with respect to the first direction (X-axis direction). This may be applied to the first magnet 1151a and the second magnet 1151b in the same manner. In other words, the first magnet 1151a and the second magnet 1151b may be symmetrically disposed with respect to the first direction (X-axis direction). In addition, the first coil 1152a, the second coil 1152b, the first magnet 1151a, and the second magnet 1151b may be disposed to at least partially overlap in the second direction (Y-axis direction). With this configuration, the X-axis tilting may be accurately performed without tilting to one side by the electromagnetic force between the first coil 1152a and the first magnet 1151a and the electromagnetic force between the second coil 1152b and the second magnet 1151b.

The third coil 1152c may be positioned to face the third magnet 1151c. Therefore, as described above, the third coil 1152c may be positioned in the third housing hole 1123a of the third housing side portion 1123. The third coil 1152c may generate an electromagnetic force with the third magnet 1151c so that the mover 1130 and the rotating unit 1140 may perform a Y-axis tilting based on the first housing 1120.

Here, an X-axis tilting means a tilting with respect to the X-axis, and a Y-axis tilting means a tilting with respect to the Y-axis.

The first Hall sensor unit 1153 may include a plurality of Hall sensors. The Hall sensor corresponds to and is used interchangeably with "sensor unit" to be described below. In the embodiment, the first Hall sensor unit 1153 may include a first Hall sensor 1153a, a second Hall sensor 1153b, and a third Hall sensor 1153c.

The first Hall sensor 1153a may be positioned at an inner side of the first coil 1152a. In addition, the second Hall sensor 1153b may be disposed symmetrically with the first Hall sensor 1153a in the first direction (X-axis direction) and the third direction (Z-axis direction). In addition, the second Hall sensor 1153b may be positioned at an inner side of the second coil 1152b.

The first Hall sensor 1153a may detect a change in a magnetic flux inside the first coil 1152a. In addition, the second Hall sensor 1153b may detect a change in a magnetic flux in the second coil 1152b. Therefore, it is possible to perform position sensing between the first and second magnets 1151a and 1151b and the first and second Hall sensors 1153a and 1153b. The first camera actuator according to the embodiment may more accurately control the X-axis tilting by detecting the position through, for example, the first and second Hall sensors 1153a and 1153b.

In addition, the third Hall sensor 1153c may be positioned at an inner side of the third coil 1152c. The third Hall sensor 1153c may detect a change in a magnetic flux inside the third coil 1152c. Therefore, it is possible to perform position sensing between the third magnet 1151c and the third Hall sensor 1153c. Therefore, the first camera actuator according to the embodiment may control the Y-axis tilting. At least one of the first to third Hall sensors may be provided.

The first board unit 1154 may be positioned under the first driving unit 1150. The first board unit 1154 may be electrically connected to the first driving coil 1152 and the first Hall sensor unit 1153. For example, the first board unit 1154 may be coupled to the first driving coil 1152 and the first Hall sensor unit 1153 by a surface mount technology (SMT). However, the present invention is not limited to this method.

The first board unit 1154 may be positioned between the first shield can (not illustrated) and the first housing 1120 and coupled to the first shield can and the first housing 1120. The coupling method may be variously performed as described above. In addition, through the coupling, the first driving coil 1152 and the first Hall sensor unit 1153 may be positioned within an outer surface of the first housing 1120.

The first board unit 1154 may include a circuit board having wiring patterns that may be electrically connected, such as a rigid printed circuit board (rigid PCB), a flexible PCB, or a rigid-flexible (RFPCB). However, the present invention is not limited to these types.

Figure 5:
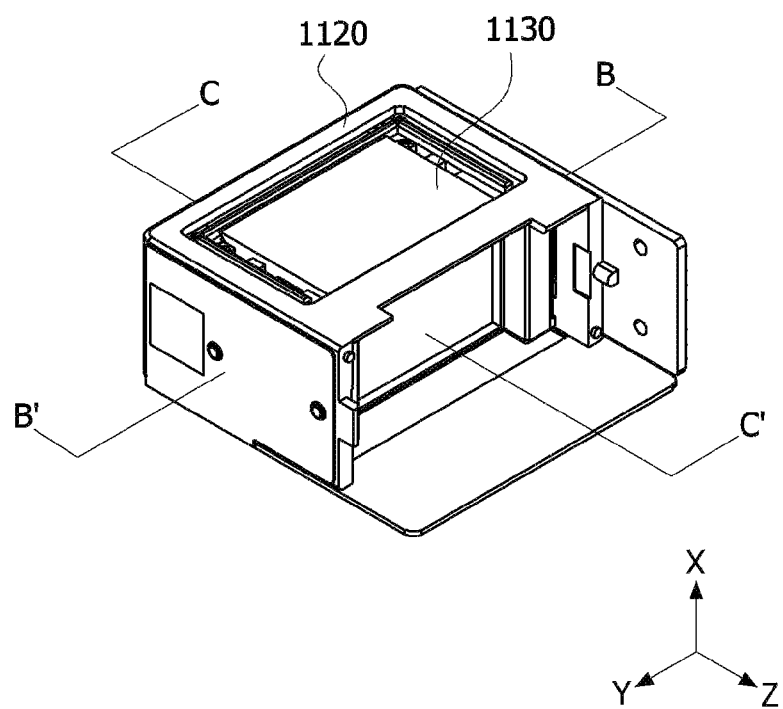
FIG. 5 is a perspective view illustrating the first camera actuator according to the embodiment in which a first shield can and a board are removed.
Figure 6:
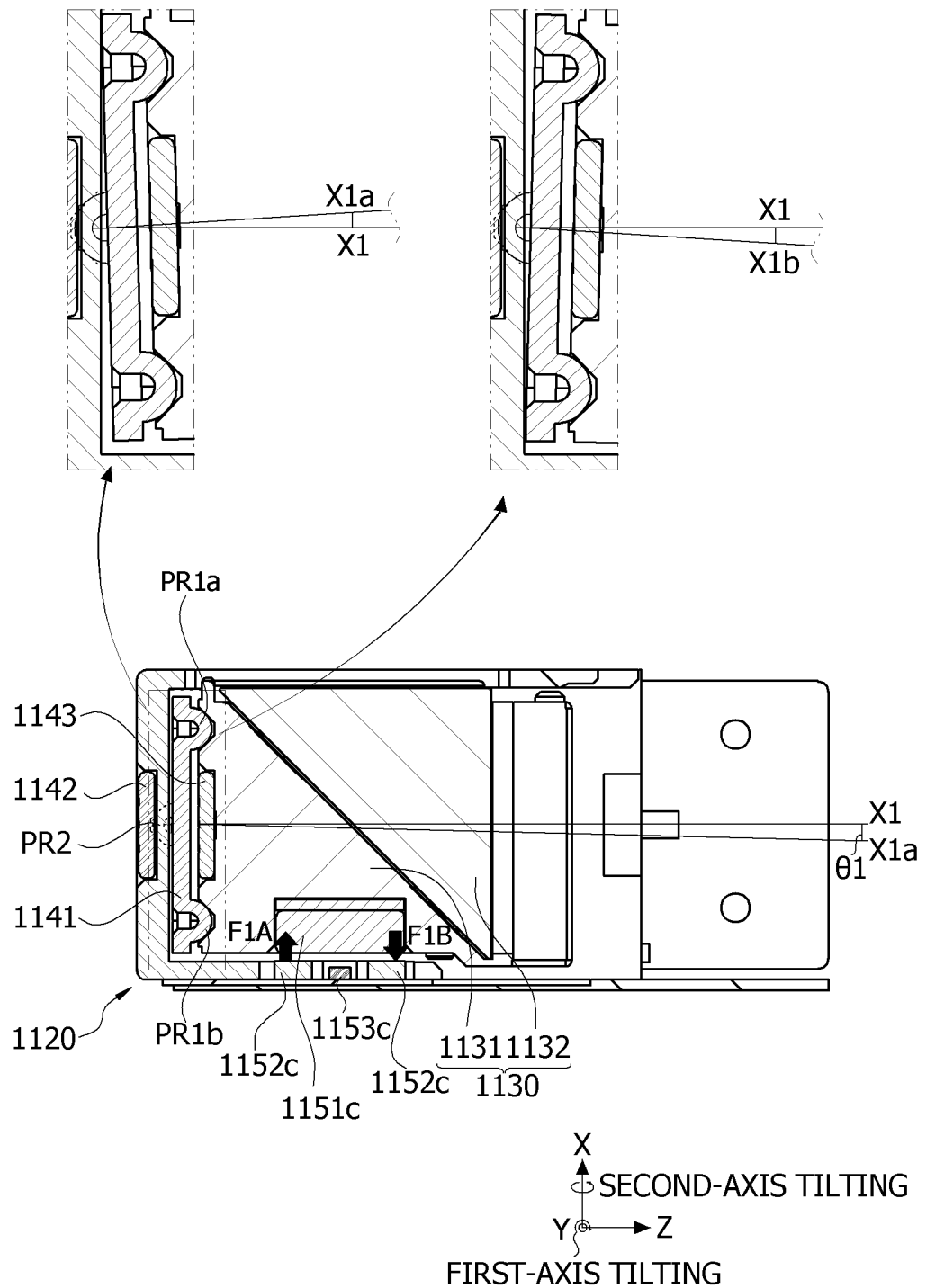
FIG. 6 is a cross-sectional view illustrating the first camera actuator along line B-B' in FIG. 5.
Figure 7:
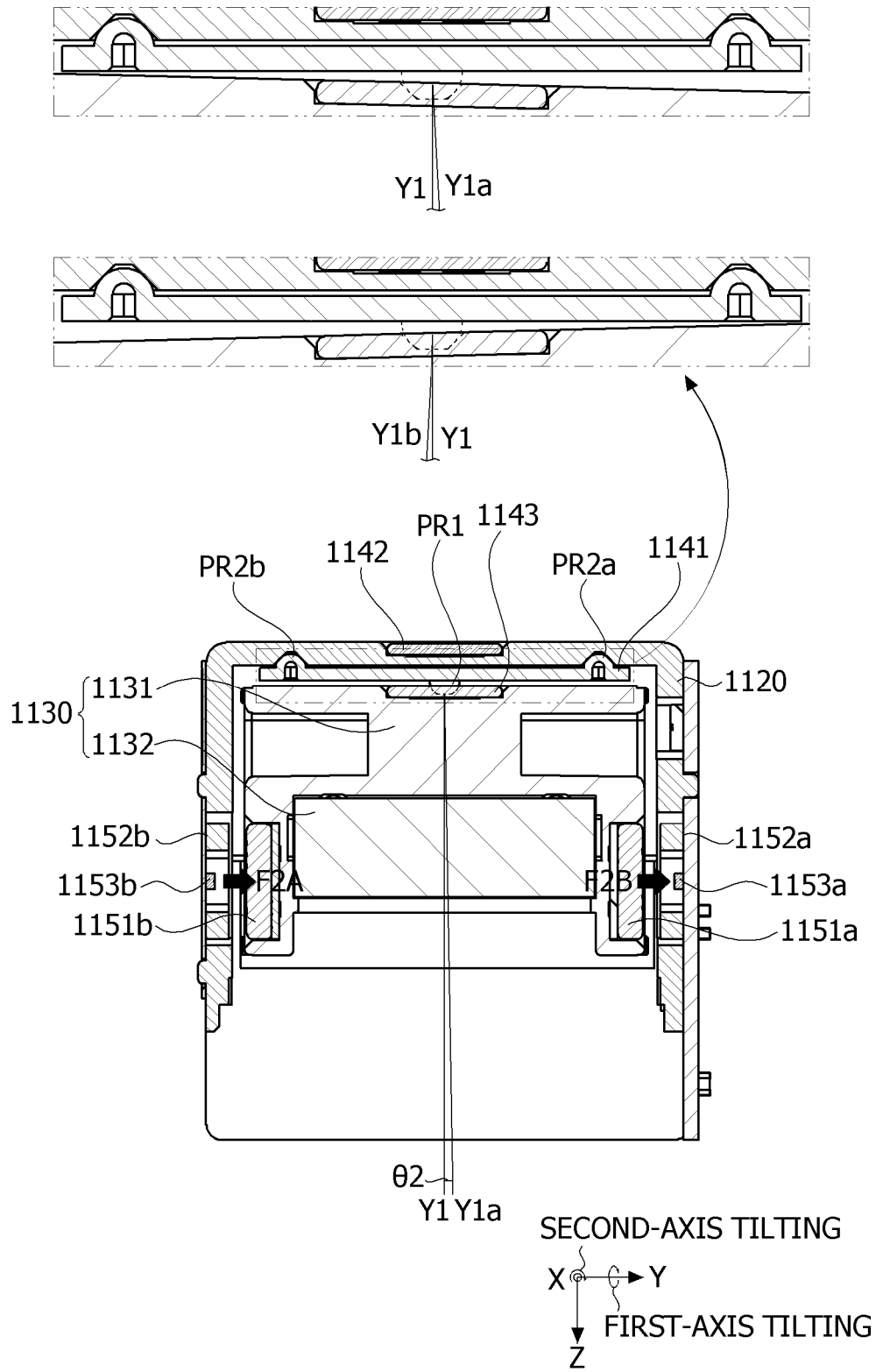
FIG. 7 is a cross-sectional view illustrating the first camera actuator along line C-C' in FIG. 5.

FIG. 5 is a perspective view illustrating the first camera actuator according to the embodiment in which a first shield can and a board are removed, FIG. 6 is a cross-sectional view illustrating the first camera actuator along line B-B' in FIG. 5, and FIG. 7 is a cross-sectional view illustrating the first camera actuator along line C-C' in FIG. 5.

Referring to FIGS. 5 to 7, the first coil 1152a may be positioned on the first housing side portion 1121.

In addition, the first coil 1152a and the first magnet 1151a may be positioned to face each other. At least a portion of the first magnet 1151a may overlap the first coil 1152a in the second direction (Y-axis direction).

In addition, the second coil 1152b may be positioned on the second housing side portion 1122. Therefore, the second coil 1152b and the second magnet 1151b may be positioned to face each other. At least a portion of the second magnet 1151b may overlap the second coil 1152b in the second direction (Y-axis direction).

In addition, the first coil 1152a and the second coil 1152b may overlap each other in the second direction (Y-axis direction). In addition, the first magnet 1151a and the second magnet 1151b may overlap each other in the second direction (Y-axis direction). With this configuration, the electromagnetic force applied to the outer surface of the holder (the first holder outer surface and the second holder outer surface) may be positioned on an axis parallel to the second direction (Y-axis direction) so that the X-axis tilting may be performed accurately and precisely.

In addition, a first accommodating groove (not illustrated) may be positioned in the fourth holder outer surface. In addition, first protrusions PR1a and PR1b may be disposed in the first accommodating groove. Therefore, when the X-axis tilting is performed, the first protrusions PR1a and PR1b may be reference axes (or rotation axes) of the tilting. Therefore, the rotating plate 1141 and the mover 1130 may move to a left or right side.

As described above, the second protrusion PR2 may be seated in a groove of an inner surface of the fourth housing side portion 1124. In addition, when the Y-axis tilting is performed, the rotating plate and the mover may rotate using the second protrusion PR2 as a reference axis of the Y-axis tilting.

According to the embodiment, an OIS may be performed by the first protrusion and the second protrusion.

Referring to FIG. 6, the Y-axis tilting may be performed. In other words, an OIS can be implemented by rotating the first camera actuator in the first direction (X-axis direction).

In the embodiment, the third magnet 1151c disposed under the holder 1131 may generate the electromagnetic force with the third coil 1152c to tilt or rotate the mover 1130 in the first direction (X-axis direction).

Specifically, the rotating plate 1141 may be coupled to the first housing 1120 and the mover 1130 by the first magnetic part 1142 in the first housing 1120 and the second magnetic part 1143 in the mover 1130. In addition, the first protrusions PR1 may be spaced apart in the first direction (X-axis direction) and supported by the first housing 1120.

In addition, the rotating plate 1141 may rotate or tilt using the second protrusion PR2 protruding to the mover 1130 as a reference axis (or a rotation axis). In other words, the rotating plate 1141 may perform the Y-axis tilting using the second protrusion PR2 as the reference axis.

For example, an OIS can be implemented by rotating (X1→X1a or X1b) the mover 130 at a first angle θ1 in the X-axis direction by first electromagnetic forces F1A and F1B between the third magnet 1151c disposed in the third seating groove and the third coil 1152c disposed on the third board side portion. The first angle θ1 may be in a range of ±1° to 3°. However, the present invention is not limited thereto.

Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151a and the second magnet 1151b disposed in the holder 1131 may tilt or rotate the rotating plate 1141 and the mover 1130 in the second direction (Y-axis direction) by respectively generating the electromagnetic force with the first coil 1152a and the second coil 1152b.

The rotating plate 1141 may rotate or tilt (X-axis tilting) in the second direction using the first protrusion PR1 as a reference axis (or a rotation axis).

For example, an OIS can be implemented by rotating (Y1→Y1a, Y1b) the mover 130 at a second angle θ2 in the Y-axis direction by second electromagnetic forces F2A and F2B between the first and second magnets 1151a and 1151b disposed in the first seating groove and the first and second coils 1152a and 1152b disposed on the first and second board side portions. The second angle θ2 may be in a range of ±1° to 3°. However, the present invention is not limited thereto.

In addition, as described above, the electromagnetic forces generated by the first and second magnets 1151a and 1151b and the first and second coils 1152a and 1152b may act in the third direction or in a direction opposite to the third direction. For example, the electromagnetic force may be generated on a left side portion of the mover 1130 in the third direction (Z-axis direction) and act on a right side portion of the mover 1130 in a direction opposite to the third direction (Z-axis direction). Therefore, the mover 1130 may rotate with respect to the first direction. Alternatively, the mover 130 may move in the second direction.

As described above, the first camera actuator according to the embodiment may control the rotating plate 1141 and the mover 1130 to rotate in the first direction (X-axis direction) or the second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS. In addition, as described above, "Y-axis tilting" may correspond to rotating or tilting in the first direction (X-axis direction). In addition, "X-axis tilting" may correspond to rotating or tilting in the second direction (Y-axis direction).

Figure 8:
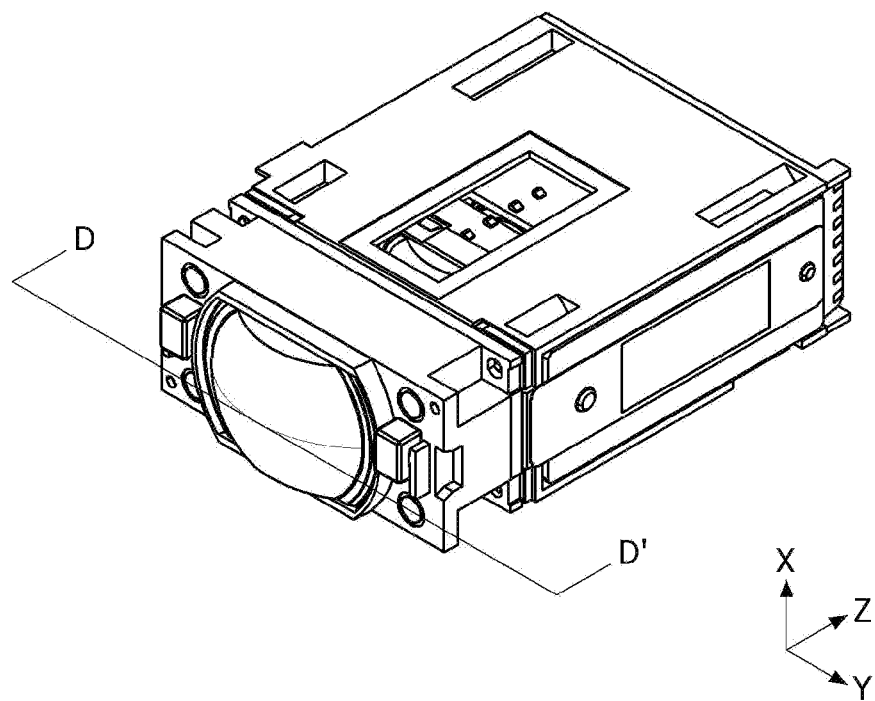
FIG. 8 is a perspective view illustrating a second camera actuator according to the embodiment.
Figure 9:
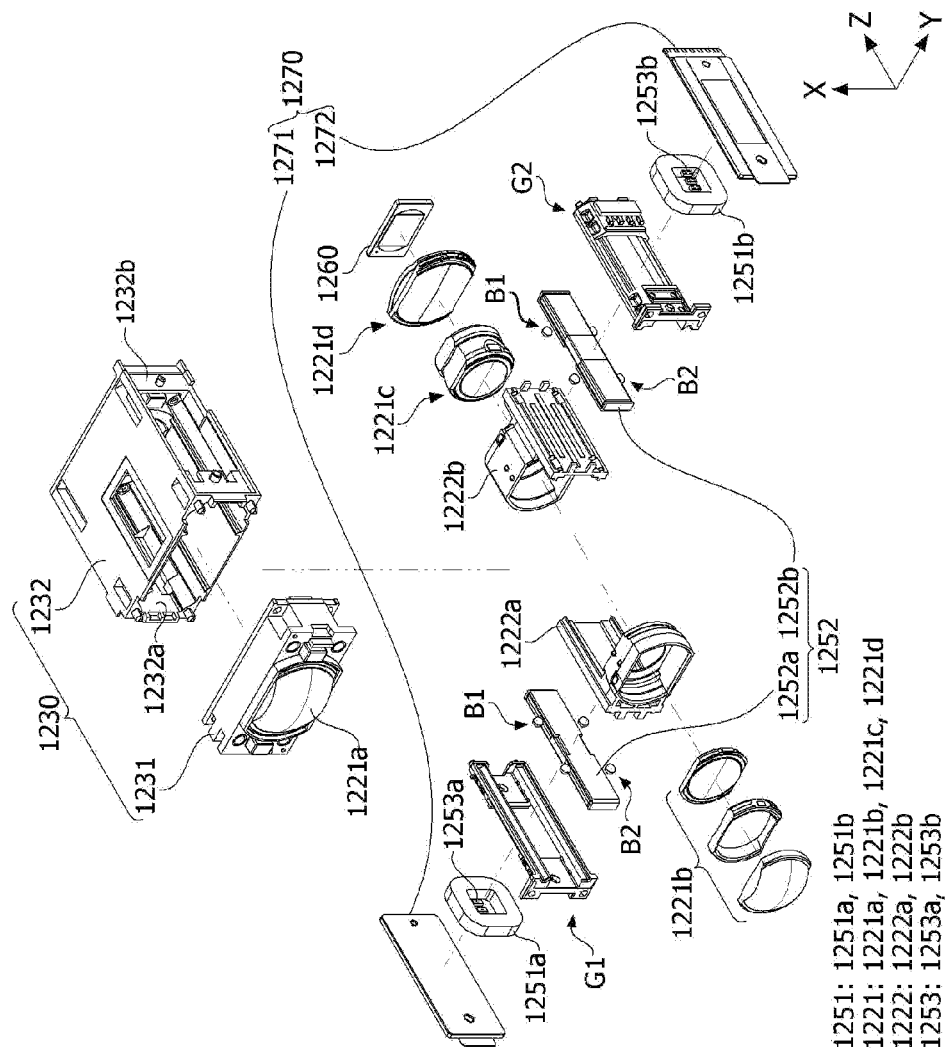
FIG. 9 is an exploded perspective view illustrating the second camera actuator according to the embodiment.
Figure 10:
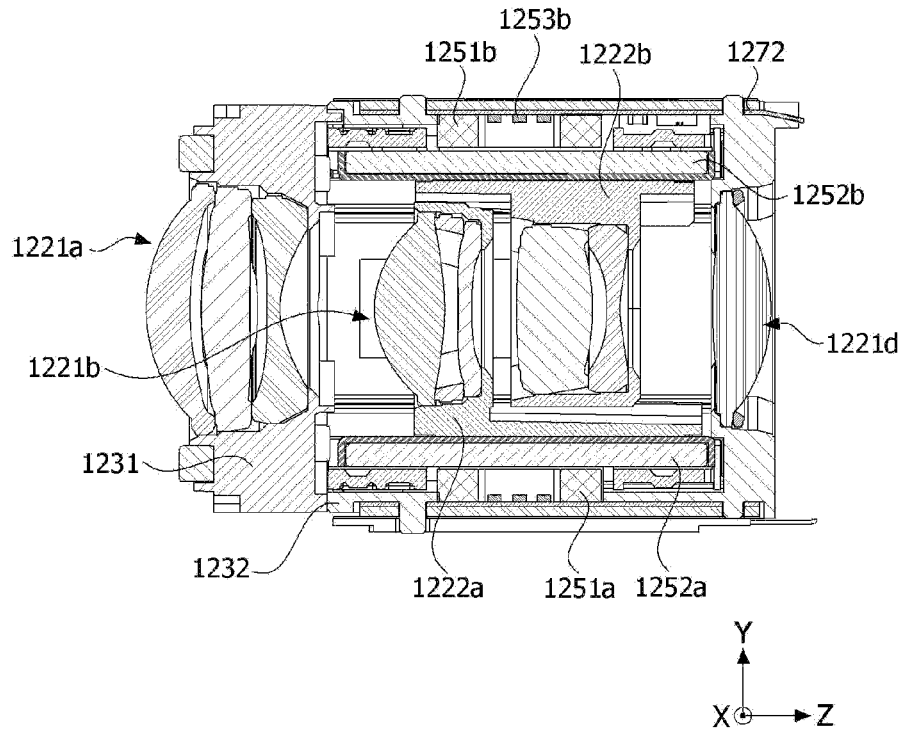
FIG. 10 is a cross-sectional view illustrating the second camera actuator along line D-D' in FIG. 8.
Figure 11:
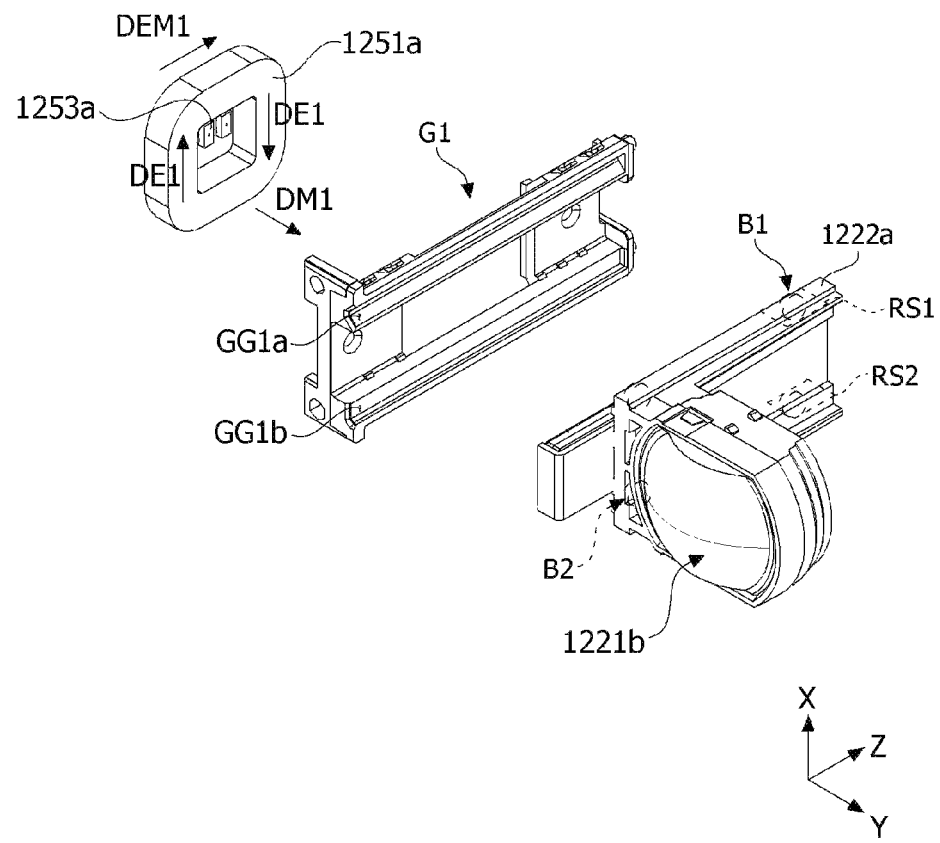
FIGS. 11 and 12 are views for describing each driving operation of lens assemblies according to the embodiment.
Figure 12:
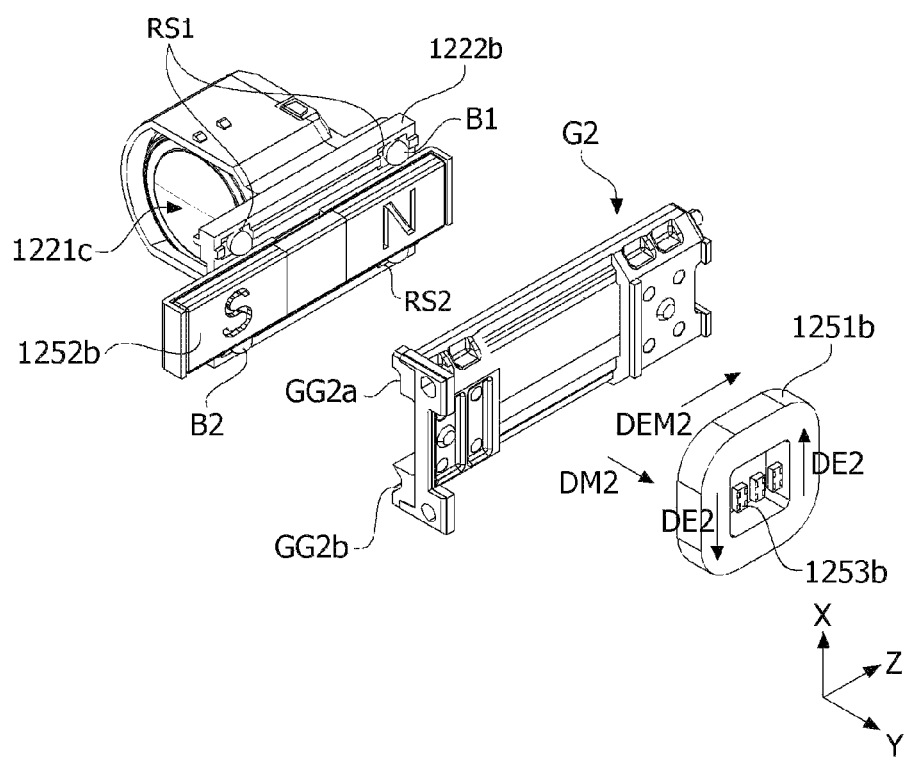
Figure 13:
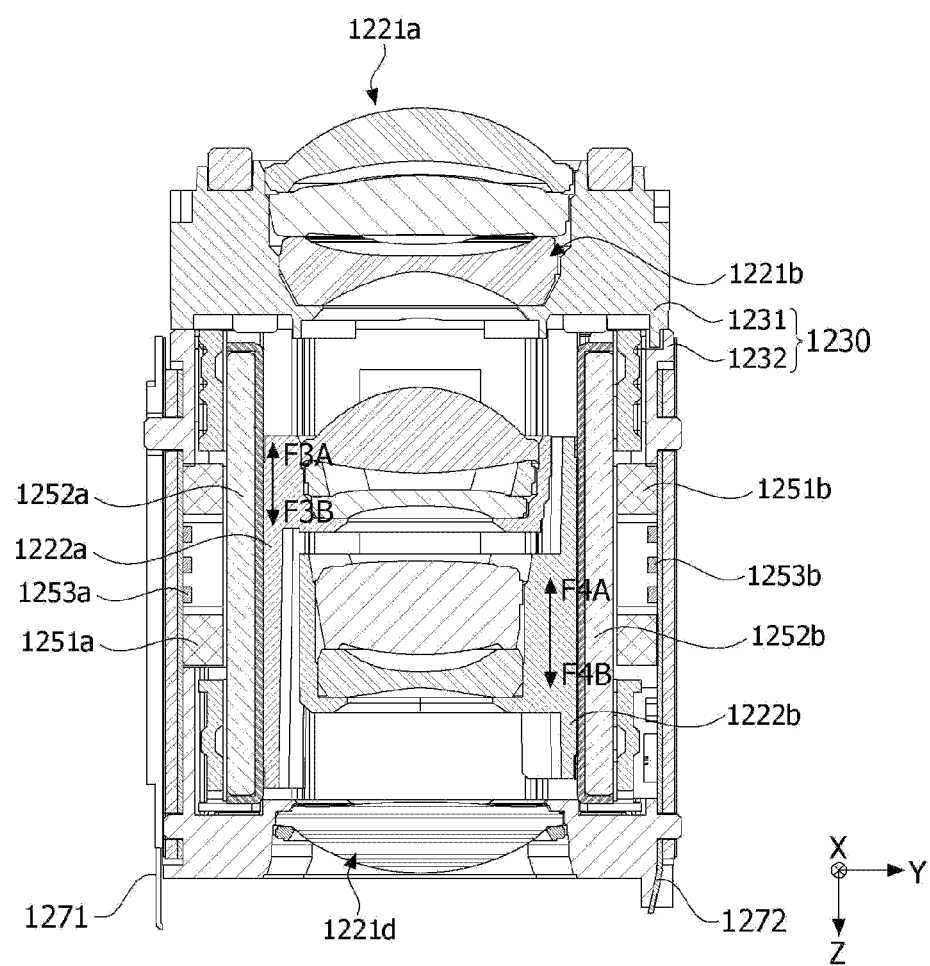
FIG. 13 is a view for describing a driving operation of the second camera actuator according to the embodiment.

FIG. 8 is a perspective view illustrating a second camera actuator according to the embodiment, FIG. 9 is an exploded perspective view illustrating the second camera actuator according to the embodiment, FIG. 10 is a cross-sectional view illustrating the second camera actuator along line D-D' in FIG. 8, FIGS. 11 and 12 are views for describing each driving operation of a lens assembly according to the embodiment, and FIG. 13 is a view for describing driving of the second camera actuator according to the embodiment.

Referring to FIGS. 8 to 10, the second camera actuator 1200 according to the embodiment may include a lens unit 1220, a second housing 1230, a second driving unit 1250, a base unit 1260, a second board unit 1270, and a bonding member 1280. Furthermore, the second camera actuator 1200 may further include a second shield can (not illustrated), an elastic unit (not illustrated), and a bonding member (not illustrated).

The second shield can (not illustrated) may be positioned in one area (e.g., an outermost side) of the second camera actuator 1200 and positioned to surround the components (the lens unit 1220, the second housing 1230, the second driving unit 1250, the base unit 1260, the second board unit 1270, and an image sensor (IS)) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction or optical axis direction). Therefore, the above-described AF function and zooming function can be performed.

In addition, the lens unit 1220 may be positioned in the second housing 1230. Therefore, at least a portion of the lens unit 1220 may move in the second housing 1230 in the optical axis direction or the third direction (Z-axis direction).

Specifically, the lens unit 1220 may include a lens group 1221 and a moving assembly 1222.

First, the lens group 1221 may include at least one lens. In addition, although a plurality of lens groups 1221 may be formed, the following description will be made based on one lens group.

The lens group 1221 may be coupled to the moving assembly 1222 and moved by an electromagnetic force generated from a fourth magnet 1252*a* and a fifth magnet 1252*b* coupled to the moving assembly 1222 in the third direction (Z-axis direction).

In the embodiment, the lens group 1221 may include a first lens group 1221*a*, a second lens group 1221*b*, and a third lens group 1221*c*. The first lens group 1221*a*, the second lens group 1221*b*, and the third lens group 1221*c* may be sequentially disposed in the optical axis direction. Furthermore, the lens group 1221 may further include a fourth lens group 1221*d*. The fourth lens group 1221*d* may be disposed at a rear end of the third lens group 1221*c*.

The first lens group 1221*a* may be fixedly coupled to a 2-1 housing. In other words, the first lens group 1221*a* may not move in the optical axis direction. The 2-1 housing coupled to the first lens group 1221*a* may be "lens assembly." For example, the 2-1 housing may be the first lens assembly, and the first lens assembly 1222*a* to be described below may be the second lens assembly. However, the following description will be made based on a first lens assembly 1222*a* and a second lens assembly 1222*b*.

The second lens group 1221*b* may be coupled to a first lens assembly 1222*a* to move in the third direction or the optical axis direction. Magnification adjustment may be performed by moving the first lens assembly 1222*a* and the second lens group 1221*b*.

The third lens group 1221*c* may be coupled to the second lens assembly 1222*b* to move in the third direction or the optical axis direction. Focus adjustment or auto focusing may be performed by moving the third lens group 1221.

However, the present invention is not limited to the number of lens groups, and the fourth lens group 1221*d* may not be present, or additional lens groups or the like other than the fourth lens group 1121*d* may be further disposed.

The moving assembly 1222 may include an opening area surrounding the lens group 1221. The moving assembly 1222 is used interchangeably with the lens assembly. In addition, the moving assembly 1222 may be coupled to the lens group 1221 by various methods. In addition, the moving assembly 1222 may include a groove in a side surface thereof and may be coupled to the fourth magnet 1252*a* and the fifth magnet 1252*b* through the groove. A coupling member or the like may be applied to the groove.

In addition, the moving assembly 1222 may be coupled to the elastic units (not illustrated) at an upper end and a rear end thereof. Therefore, the moving assembly 1222 may be supported by the elastic units (not illustrated) while moving in the third direction (Z-axis direction). In other words, the position of the moving assembly 1222 may be maintained in the third direction (Z-axis direction). The elastic unit (not illustrated) may be formed of various elastic elements such as a leaf spring.

The moving assembly 1222 may be positioned in the second housing 1230 and may include the first lens assembly 1222*a* and a second lens assembly 1222*b*.

An area of the second lens assembly 1222*b* in which the third lens group is seated may be positioned at a rear end of the first lens assembly 1222*a*. In other words, the area of the second lens assembly 1222*b* in which the third lens group 1221*c* is seated may be positioned between an area of the first lens assembly 1222*a* in which the second lens group 1221*b* is seated and the image sensor.

The first lens assembly 1222*a* and the second lens assembly 1222*b* may face a first guide unit G1 and a second guide unit G2, respectively. The first guide unit G1 and the second guide unit G2 may be positioned on a first side portion and a second side portion of the second housing 1230 to be described below. A detailed description thereof will be made below.

In addition, a second driving magnet may be seated on outer surfaces of the first lens assembly 1222*a* and the second lens assembly 1222*b*. For example, the fifth magnet 1252*b* may be seated on the outer surface of the second lens assembly 1222*b*. The fourth magnet 1252*a* may be seated on the outer surface of the first lens assembly 1222*a*.

The second housing 1230 may be disposed between the lens unit 1220 and the second shield can (not illustrated). In addition, the second housing 1230 may be disposed to surround the lens unit 1220.

The second housing 1230 may include a 2-1 housing 1231 and a 2-2 housing 1232. The 2-1 housing 1231 may be coupled to the first lens group 1221*a* and may also be coupled to the above-described first camera actuator. The 2-1 housing 1231 may be positioned in front of the 2-2 housing 1232.

In addition, the 2-2 housing 1232 may be positioned at a rear end of the 2-1 housing 1231. The lens unit 1220 may be seated inside the 2-2 housing 1232.

A hole may be formed in a side portion of the second housing 1230 (or the 2-2 housing 1232). A fourth coil 1251*a* and a fifth coil 1251*b* may be disposed in the hole. The hole may be positioned to correspond to the above-described groove of the moving assembly 1222.

In the embodiment, the second housing 1230 (in particular, the 2-2 housing 1232) may include a first side portion 1232*a* and a second side portion 1232*b*. The first side portion 1232*a* and the second side portion 1232*b* may be positioned to correspond to each other. For example, the first side portion 1232*a* and the second side portion 1232*b* may be symmetrically disposed with respect to the third direction. A second driving coil 1251 may be positioned on the first side portion 1232*a* and the second side portion 1232*b*. In addition, the second board unit 1270 may be seated on outer surfaces of the first side portion 1232*a* and the second side portion 1232*b*. In other words, a first board 1271 may be positioned on the outer surface of the first side portion 1232*a*, and a second board 1272 may be positioned on the outer surface of the second side portion 1232*b*.

Furthermore, the first guide unit G1 and the second guide unit G2 may be positioned on the first side portion 1232*a* and the second side portion 1232*b* of the second housing 1232 (in particular, the 2-2 housing 1232).

The first guide unit G1 and the second guide unit G2 may be positioned to correspond to each other. For example, the first guide unit G1 and the second guide unit G2 may be positioned to face each other with respect to the third direction (Z-axis direction). In addition, the first guide unit G1 and the second guide unit G2 may at least partially overlap each other in the second direction (Y-axis direction).

The first guide unit G1 and the second guide unit G2 may include at least one groove (e.g., a guide groove) or recess. In addition, a first ball B1 or a second ball B2 may be seated in the groove or the recess. Therefore, the first ball B1 or the second ball B2 may move in the guide groove of the first guide unit G1 or the guide groove of the second guide unit G2 in the third direction (Z-axis direction).

Alternatively, the first ball B1 or the second ball B2 may move in the third direction along a rail formed at an inner side of the first side portion 1232*a* of the second housing 1230 or a rail formed at an inner side of the second side portion 1232*b* of the second housing 1230.

Therefore, the first lens assembly 1222*a* and the second lens assembly 1222*b* may move in the third direction.

According to the embodiment, the first ball B1 may be disposed on an upper portion of the first lens assembly 1222*a* or the second lens assembly 1222*b*. In addition, the second ball B2 may be disposed on a lower portion of the first lens assembly 1222*a* or the second lens assembly 1222*b*. For example, the first ball B1 may be positioned above the second ball B2. Therefore, at least a portion of the first ball B1 may overlap the second ball B2 in the first direction (X-axis direction) depending on a position.

In addition, the first guide unit G1 and the second guide unit G2 may include first guide grooves GG1a and GG2a facing a first recess RS1. In addition, the first guide unit G1 and the second guide unit G2 may include second guide grooves GG1b and GG2b facing a second recess RS2. The first guide grooves GG1a and GG2a and the second guide grooves GG1b and GG2b may be grooves extending in the third direction (Z-axis direction). In addition, the first guide grooves GG1a and GG2a and the second guide grooves GG1b and GG2b may have different shapes. For example, the first guide grooves GG1a and GG2a may be grooves having inclined side surfaces, and the second guide grooves GG1b and GG2b may be grooves having side surfaces perpendicular to lower surfaces thereof.

The fifth magnet 1252*b* may be positioned to face the fifth coil 1251*b*. In addition, the fourth magnet 1252*a* may be positioned to face the fourth coil 1251*a*.

The elastic unit (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of leaf springs as described above. In addition, the first elastic member (not illustrated) and the second elastic member (not illustrated) may provide elasticity for moving the moving assembly 1222. However, the present invention is not limited to the above-described position, and the elastic unit may be disposed at various positions.

In addition, the second driving unit 1250 may provide a driving force for moving the lens unit 1220 in the third direction (Z-axis direction). The second driving unit 1250 may include the second driving coil 1251 and the second driving magnet 1252. Furthermore, the second driving unit 1250 may further include a second Hall sensor unit. The second Hall sensor unit 1253 may include at least one fourth Hall sensor 1253*a* and may be positioned at an inner side or outer side of the second driving coil 1251.

The moving assembly may be moved by the electromagnetic force generated between the second driving coil 1251 and the second driving magnet 1252 in the third direction (Z-axis direction).

The second driving coil 1251 may include the fourth coil 1251*a* and the fifth coil 1251*b*. The fourth coil 1251*a* and the fifth coil 1251*b* may be disposed in the holes formed in the side portions of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

In addition, the second driving coil 1251 may be coupled to the second board unit 1270 through a yoke, etc. Furthermore, in the embodiment, the second driving coil 1251 is a fixed element together with the second board unit 1270. In contrast, the second driving magnet 1252 is a moving element that moves in the optical axis direction (Z-axis direction) together with the first and second assemblies.

The second driving magnet 1252 may include the fourth magnet 1252*a* and the fifth magnet 1252*b*. The fourth magnet 1252*a* and the fifth magnet 1252*b* may be disposed in the above-described groove of the moving assembly 1222 and positioned to correspond to the fourth coil 1251*a* and the fifth coil 1251*b*. In addition, the second driving magnet 1252 may be coupled to the first and second lens assemblies (or the moving assembly) together with the yoke to be described below. The yoke may be disposed in the first and second lens assemblies. Therefore, the second driving magnet and the first and second lens assemblies may be coupled. Furthermore, the yoke may also be disposed outside the second housing or outside the second driving coil. Therefore, it is possible to maintain the coupling between the first and second lens assemblies and the second housing.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, since the image sensor is free from foreign substances and the like, it is possible to improve the reliability of the device. However, the following description will be made with this removed from some drawings.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a controller.

In addition, the second camera actuator may be a fixed zoom or a continuous zoom. For example, the second camera actuator may provide a movement of the lens group 1221.

In addition, the second camera actuator may be formed of a plurality of lens assemblies. For example, at least one of a third lens assembly (not illustrated) in addition to the first lens assembly 1222*a* and the second lens assembly 1222*b*, and a guide pin (not illustrated) may be disposed in the second camera actuator. In this regard, the above-described contents may be applied. Therefore, the second camera actuator may perform a high-magnification zooming function through the second driving unit. For example, the first lens assembly 1222*a* and the second lens assembly 1222*b* may be moving lenses that move through the second driving unit and the guide pin (not illustrated), and the third lens assembly (not illustrated) may be a fixed lens, but the present invention is not limited thereto. For example, the third lens assembly (not illustrated) may perform a function of a focator by which light forms an image at a specific position, and the first lens assembly may perform a function of a variator for re-forming an image formed by the third lens assembly (not illustrated), which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222*b* which is the variator. However, the configuration of the embodiment will be described with reference to the following drawings.

The image sensor may be positioned at the inner side or the outer side of the second camera actuator. In an embodiment, as illustrated, the image sensor may be positioned at the outer side of the second camera actuator. For example, the image sensor may be positioned on a circuit board. The image sensor may receive light and convert the received light into an electrical signal. In addition, the image sensor may include a plurality of pixels in the form of an array. In addition, the image sensor may be positioned on the optical axis.

The second board unit 1270 may be in contact with the second housing side portion. For example, the second board unit 1270 may be positioned on an outer surface (first side surface) of the first side portion and an outer surface (second side surface) of the second side portion of the second housing, in particular, the 2-2 housing and may be in contact with the first side surface and the second side surface.

Referring to FIGS. 11 and 12, in the camera device according to the embodiment, the first lens assembly 1222*a* may move along a rail positioned on an inner surface of the housing through the first ball B1 in a direction parallel to the optical axis, that is, in the third direction (Z-axis direction) or a direction opposite to the third direction by an electromagnetic force DEM1 generated between the fourth magnet 1252*a* and the fourth coil 1251*a*.

Specifically, in the camera device according to the embodiment, the fourth magnet 1252*a* may be provided in the first lens assembly 1222*a*, for example, by a bipolar magnetization method. For example, in the embodiment, both an N pole and an S pole of the fourth magnet 1252*a* may be positioned to face the fourth coil 1251*a*. Therefore, each of the N pole and the S pole of the fourth magnet 1252*a* may be disposed to correspond to an area in which a current flows in the fourth coil 1251*a* in the X-axis direction or a direction opposite to the X-axis direction.

In the embodiment, when a magnetic force is applied from the N pole of the fourth magnet 1252*a* in a direction opposite to the second direction (Y-axis direction) and a current DE1 flows in the fourth coil 1251*a* corresponding to the N pole in a direction opposite to the first direction (X-axis direction), the electromagnetic force DEM1 may act in the third direction (Z-axis direction) according to the interaction of the electromagnetic force (e.g., Fleming's left hand rule).

In addition, in the embodiment, when a magnetic force is applied from the S pole of the fourth magnet 1252*a* in the second direction (Y-axis direction) and the current DE1 flows in the fourth coil 1251*a* corresponding to the S pole in the first direction (X-axis direction), the electromagnetic force DEM1 may act in the Z-axis direction according to the interaction of the electromagnetic force.

At this time, since the fourth coil 1251*a* is in a state of being fixed to the second housing side portion, the first lens assembly 1222*a* on which the fourth magnet 1252*a* is disposed may move in the direction opposite to the Z-axis direction by the electromagnetic force DEM1 according to the current direction. In other words, the second driving magnet may move in an opposite direction of the electromagnetic force applied to the second driving coil. In addition, the direction of the electromagnetic force may be changed depending on the current of the coil and the magnetic force of the magnet.

Therefore, the first lens assembly 1222*a* may move along the rail positioned on the inner surface of the housing through the first ball B1 in a direction (both directions) parallel to the third direction or the optical axis direction. At this time, the electromagnetic force DEM1 may be controlled in proportion to the current DE1 applied to the fourth coil 1251*a*.

The first lens assembly 1222*a* or the second lens assembly 1222*b* may include the first recess RS1 in which the first ball B1 is seated. In addition, the first lens assembly 1222*a* or the second lens assembly 1222*b* may include the second recess RS2 in which the second ball B2 is seated. A length of the first recess RS1 may be preset in the optical axis direction (Z-axis direction). In addition, a length of the second recess RS2 may be preset in the optical axis direction (Z-axis direction). Therefore, moving distances of the first ball B1 and the second ball B2 in the optical axis direction in each recess may be adjusted. In other words, the first recess RS1 or the second recess RS2 may be a stopper for the first and second balls B1 and B2.

In addition, in the camera device according to the embodiment, the fifth magnet 1252*b* may be provided on the second lens assembly 1222*b* by, for example, the bipolar magnetization method, etc. For example, in the embodiment, both the N pole and the S pole of the fifth magnet 1252*b* may be positioned to face the fifth coil 1251*b*. Therefore, each of the N pole and the S pole of the fifth magnet 1252*b* may be disposed to correspond to an area in which a current flows in the fifth coil 1251*b* in the X-axis direction or a direction opposite to the X-axis direction.

In the embodiment, when a magnetic force DM2 is applied from the N pole of the fifth magnet 1252*b* in the second direction (Y-axis direction) and the current DE2 flows in the fifth coil 1251*b* corresponding to the N pole in the first direction (X-axis direction), an electromagnetic force DEM2 may act in the third direction (Z-axis direction) according to the interaction of the electromagnetic force (e.g., Fleming's left hand rule).

In addition, in the embodiment, when a magnetic force is applied from the S pole of the fifth magnet 1252*b* in a direction opposite to the second direction (Y-axis direction) and the current DE2 flows in the fifth coil 1251*b* corresponding to the S pole in a direction opposite to the first direction (X-axis direction), the electromagnetic force DEM2 may act in the Z-axis direction according to the interaction of the electromagnetic force.

At this time, since the fifth coil 1251*b* is in a state of being fixed to the second housing side portion, the second lens assembly 1222*b* on which the fifth magnet 1252*b* is disposed may be moved by the electromagnetic force DEM2 according to the current direction in a direction opposite to the Z-axis direction. For example, as described above, the direction of the electromagnetic force may be changed depending on the current of the coil and the magnetic force of the magnet. Therefore, the second lens assembly 1222*b* may move along the rail positioned on the inner surface of the second housing through the second ball B2 in a direction parallel to the third direction (Z-axis direction). At this time, the electromagnetic force DEM2 may be controlled in proportion to the current DE2 applied to the fifth coil 1251*b*.

Referring to FIG. 13, in the camera device according to the embodiment, the second driving unit may provide driving forces F3A, F3B, F4A, and F4B that move the first lens assembly 1222*a* and the second lens assembly 1222*b* of the lens unit 1220 in the third direction (Z-axis direction). As described above, the second driving unit may include the second driving coil 1251 and the second driving magnet 1252. In addition, the lens unit 1220 may be moved by the electromagnetic force generated between the second driving coil 1251 and the second driving magnet 1252 in the third direction (Z-axis direction).

At this time, the fourth coil 1251*a* and the fifth coil 1251*b* may be disposed in the holes formed in the side portions (e.g., the first side portion and the second side portion) of the second housing 1230. In addition, the fifth coil 1251*b* may be electrically connected to the first board 1271. The fourth coil 1251*a* may be electrically connected to the second board 1272. Therefore, the fourth coil 1251*a* and the fifth coil 1251*b* may receive a driving signal (e.g., a current) from a driving driver on the circuit board 1300 through the second board unit 1270.

At this time, the first lens assembly 1222*a* on which the fourth magnet 1252*a* is seated may move in the third direction (Z-axis direction) by the electromagnetic forces F3A and F3B between the fourth coil 1251*a* and the fourth magnet 1252*a*. In addition, the second lens group 1221*b* seated on the first lens assembly 1222*a* may also move in the third direction.

In addition, the second lens assembly 1222*b* on which the fifth magnet 1252*b* is seated may be moved by the electromagnetic forces F4A and F4B between the fifth coil 1251*b* and the fifth magnet 1252*b* in the third direction (Z-axis direction). In addition, the third lens group 1221*c* seated on the second lens assembly 1222*b* may also move in the third direction.

Therefore, as described above, a focal length or magnification of the optical system may be changed by moving the second lens group 1221*b* and the third lens group 1221*c*. In the embodiment, the magnification may be changed by moving the second lens group 1221*b*. In other words, zooming may be performed. In addition, a focus may be adjusted by moving the third lens group 1221*c*. In other words, auto focusing may be performed. With this configuration, the second camera actuator may be a fixed zoom or a continuous zoom.

Figure 14:
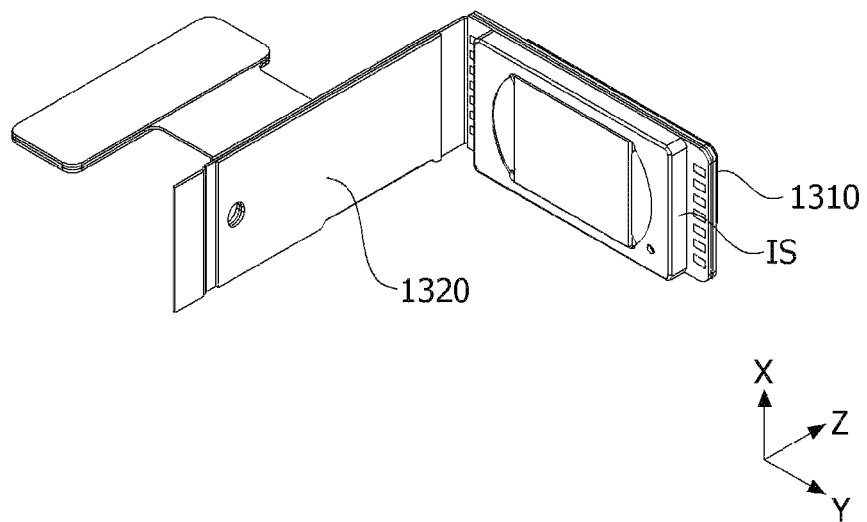
FIG. 14 is a schematic diagram illustrating a circuit board according to the embodiment.

FIG. 14 is a schematic diagram illustrating a circuit board according to the embodiment.

Referring to FIG. 14, as described above, the circuit board 1300 according to the embodiment may include a first circuit board unit 1310 and a second circuit board unit 1320. The first circuit board unit 1310 may be positioned under the base and coupled to the base. In addition, the image sensor IS may be disposed on the first circuit board unit 1310. In addition, the first circuit board unit 1310 and the image sensor IS may be electrically connected.

In addition, the second circuit board unit 1320 may be positioned on a side portion of the base. In particular, the second circuit board unit 1320 may be positioned on a first side portion of the base. Therefore, the second circuit board unit 1320 may be positioned adjacent to the fourth coil positioned adjacent to the first side portion for easy electrical connection.

Furthermore, the circuit board 1300 may further include a fixed board (not illustrated) positioned on a side surface thereof. Therefore, even when the circuit board 1300 is made of a flexible material, the circuit board 1300 may be coupled to the base while maintaining stiffness by the fixed board.

The second circuit board unit 1320 of the circuit board 1300 may be positioned on the side portion of the second driving unit 1250. The circuit board 1300 may be electrically connected to the first driving unit and the second driving unit. For example, the electrical connection may be made by the SMT. However, the present invention is not limited to this method.

The circuit board 1300 may include a circuit board having wiring patterns that may be electrically connected, such as a rigid PCB, a flexible PCB, and a rigid flexible PCB. However, the present invention is not limited to these types.

In addition, the circuit board 1300 may be electrically connected to another camera module in the terminal or a processor of the terminal. Therefore, the above-described camera actuator and camera device including the same may transmit and receive various signals within the terminal.

Figure 17:
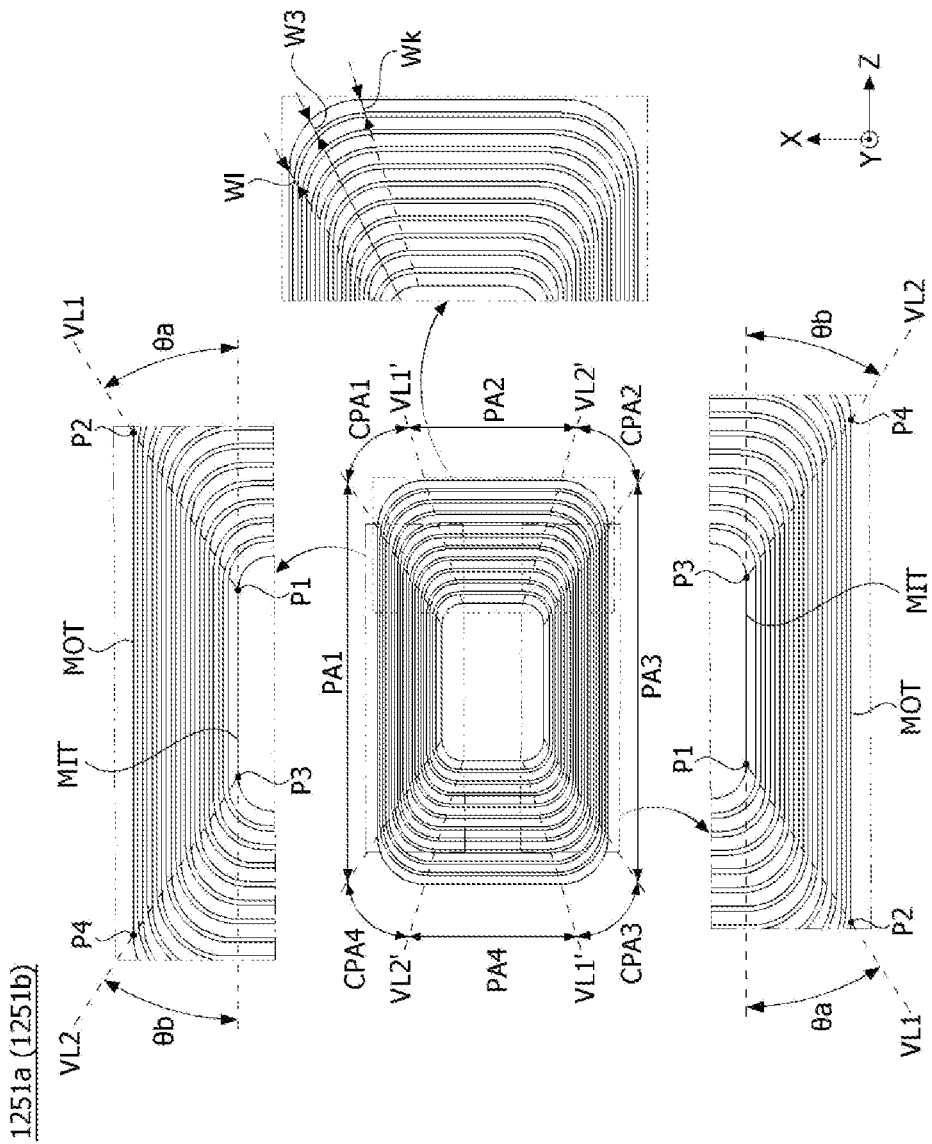
FIG. 17 is a view illustrating angles and thicknesses of turns of curve pattern areas in the second driving coil according to the embodiment.

FIG. 15 is a perspective view illustrating a first lens assembly, a first bonding member, a second bonding member, and a second lens assembly according to the embodiment, FIG. 16 is a view illustrating a second driving coil according to the embodiment, and FIG. 17 is a view illustrating angles of curve pattern areas and thicknesses of turns in the second driving coil according to the embodiment.

Referring to FIG. 15, the first lens assembly 1222*a* and the second lens assembly 1222*b* may be disposed to be spaced apart from each other in the optical axis direction (Z-axis direction). In addition, the first lens assembly 1222*a* and the second lens assembly 1222*b* may be moved by the second driving unit in the optical axis direction (Z-axis direction). For example, an auto focus or zooming function may be performed by moving the first lens assembly 1222*a* and the second lens assembly 1222*b*.

In addition, the first lens assembly 1222*a* may include a first lens holder LAH1 for holding and coupling the second lens group 1221*b*. The first lens holder LAH1 may be coupled to the second lens group 1221*b*. In addition, the first lens holder LAH1 may include a first lens hole LH1 for accommodating the second lens group 1221*b*. In other words, the second lens group 1221*b* including at least one lens may be disposed in the first lens hole LH1. The first guide unit G1 may be disposed to be spaced apart from one side of the first lens holder LAH1. For example, the first guide unit G1 and the first lens holder LAH1 may be sequentially disposed in the second direction (Y-axis direction).

In addition, the second lens assembly 1222*b* may include a second lens holder LAH2 for holding and coupling the third lens group 1221*c*. In addition, the second lens holder LAH2 may include a second lens hole LH2 for accommodating the third lens group 1221*c*. In other words, at least one lens may be disposed in the second lens hole LH2.

The second guide unit G2 may be disposed at the other side of the second lens holder LAH2. The second guide unit G2 may be disposed to face the first guide unit G1.

In the embodiment, the first guide unit G1 and the second guide unit G2 may at least partially overlap each other in the second direction (Y-axis direction). With this configuration, it is possible to improve the space efficiency of the second driving unit for moving the first and second lens assemblies within the second camera actuator, thereby easily miniaturizing the second camera actuator.

In addition, the second guide unit G2 and the second lens holder LAH2 may be sequentially disposed in a direction opposite to the second direction (Y-axis direction).

The first ball, the fourth coil, and the like may be disposed in the first guide unit G1 as described above, and the second ball, the fifth coil, and the like may be disposed in the second guide unit G2 as described above.

In the embodiment, each of the first lens assembly 1222*a* and the second lens assembly 1222*b* may include outer surfaces adjacent to each other. The first lens assembly 1222*a* may include a first outer surface M1, and the second lens assembly 1222*b* may include a second outer surface M2. The first outer surface M1 may be a lower surface of the first lens holder LAH1 with respect to the optical axis direction (Z-axis direction). In addition, a third outer surface M3 to be described below may be an upper surface of the first lens holder LAH1. In addition, the second outer surface M2 may be an upper surface of the second lens holder LAH2, and the fourth outer surface M4 may be the lower surface of the second lens holder LAH2.

In addition, the first outer surface M1 and the second outer surface M2 may at least partially overlap each other in the optical axis direction (Z-axis direction). In the embodiment, the first outer surface M1 to the fourth outer surface M4 may at least partially overlap each other in the optical axis direction (Z-axis direction).

For example, a bonding member (not illustrated) may be in contact with at least one of the first outer surface M1 and the second outer surface M2.

Referring to FIGS. 16 and 17, the second driving coil includes the fourth coil 1251*a* and the fifth coil 1251*b*. The following description will be made based on the second driving coil including the fourth coil and the fifth coil.

The second driving coil 1251*a* or 1251*b* (the following description will be made as "1251*a*") according to the embodiment may include a first pattern area PA1, a second pattern area PA2, a third pattern area PA3, and a fourth pattern PA4, and curve pattern areas CPA.

In addition, the second driving coil 1251*a* may be formed of at least one winding or turn. The following description will be made based on the second driving coil 1251*a* formed of a plurality of turns.

In addition, the second driving coil 1251*a* may be formed in various manners. For example, the second driving coil 1251*a* may be formed of a fine pattern (FP) coil. However, the present invention is not limited to these types.

In the second driving coil 1251*a*, the first pattern area PA1 and the second pattern area PA2 may be disposed in directions perpendicular to each other. For example, a plurality of turns in the first pattern area PA1 may extend in the optical axis direction (Z-axis direction), and a plurality of turns in the second pattern area PA2 may extend in the first direction (X-axis direction) perpendicular to the optical axis direction (Z-axis direction). For example, directions in which the plurality of turns in the first pattern area PA1 and the second pattern area PA2 extend are different, for example, may be perpendicular to each other.

In addition, in the embodiment, a width L1 of the first pattern area PA1 may differ from a width L2 of the second pattern area PA2. Alternatively, the width L1 of the first pattern area PA1 may differ from the width L2 of the second pattern area PA2. With this configuration, it is possible to increase the electromagnetic force generated by the interaction between the second driving coil 1251*a* and the second driving magnet facing the second driving coil 1251*a*. Therefore, it is possible to increase the moving distance or moving speed of the first lens assembly or the second lens assembly in the optical axis direction (Z-axis direction) in the camera module according to the embodiment. Therefore, the camera module according to the embodiment may easily perform focusing or the like in a large magnification range due to a larger stroke.

Furthermore, the third pattern area PA3 may face the first pattern area PA1. The third pattern area PA3 and the first pattern area PA1 may be symmetrically disposed with respect to the optical axis direction (Z-axis direction). Alternatively, the third pattern area PA3 may be positioned to be spaced apart from and overlap the first pattern area PA1 in the first direction (X-axis direction).

In addition, the fourth pattern area PA4 may face the second pattern area PA2. The fourth pattern area PA4 and the second pattern area PA2 may be spaced apart from each other and overlap each other in the optical axis direction (Z-axis direction). In addition, the fourth pattern area PA4 and the second pattern area PA2 may be symmetrically disposed with respect to the first direction (X-axis direction).

In addition, the third pattern area PA3 and the fourth pattern area PA4 may be disposed in directions perpendicular to each other. A plurality of turns in the third pattern area PA3 may extend in the optical axis direction (Z-axis direction), and a plurality of turns in the fourth pattern area PA4 may extend in the first direction (X-axis direction) perpendicular to the optical axis direction (Z-axis direction). Therefore, directions in which the plurality of turns in the third pattern area PA3 and the fourth pattern area PA4 extend may differ, for example, may be perpendicular to each other.

In another aspect, the second driving coil 1251*a* according to the embodiment may include a first group pattern area GPA1 extending in the optical axis direction (Z-axis direction) and a second group pattern area GPA2 extending in the first direction (X-axis direction) perpendicular to the optical axis direction (Z-axis direction) or in a vertical direction. In addition, the curve pattern areas CPA may be disposed between the first group pattern area GPA1 and the second group pattern area GPA2.

Furthermore, the first group pattern area GPA1 may be disposed in a direction perpendicular to the second group pattern area GPA2. Therefore, the plurality of turns in the first group pattern area GPA1 may extend in the optical axis direction (Z-axis direction), and the plurality of turns in the second group pattern area GPA2 may extend in the first direction perpendicular to the optical axis direction (Z-axis direction). Therefore, the direction in which the plurality of turns in the first group pattern area GPA1 extend and the direction in which the plurality of turns in the second group pattern area GPA2 extend may be perpendicular to each other.

In addition, a width or length L1 of the first group pattern area GPA1 in the first direction (X-axis direction) may differ from a length or width L2 of the second group pattern area GPA2 in the optical axis direction (Z-axis direction).

In the embodiment, the width or length L1 of the first group pattern area GPA1 in the first direction (X-axis direction) may be smaller than the length or width L2 of the second group pattern area GPA2 in the optical axis direction (Z-axis direction).

Furthermore, the first group pattern area GPA1 may include the first pattern area PA1 and the third pattern area PA3. In addition, the second group pattern area GPA2 may include the second pattern area PA2 and the fourth pattern area PA4. In the specification, a description is also made by applying such a viewpoint.

Therefore, the length or width L1 of any one of the first pattern area PA1 and the third pattern area PA3 in the first direction may be larger than the length or width L2 of any one of the second pattern area PA2 and the fourth pattern area PA4 in the optical axis direction.

With this configuration, it is possible to decrease a load due to an increase in the widths of the plurality of turns in the second group pattern area GPA2 in which the driving force is actually generated in the second driving coil. Therefore, as described above, it is possible to increase the electromagnetic force acting on the second driving coil 1251*a*. Therefore, it is possible to increase the moving distance or moving speed of the first lens assembly or the second lens assembly in the optical axis direction (Z-axis direction) in the camera module according to the embodiment.

Furthermore, in the second driving coil 1251*a*, the width L2 of the fourth pattern area PA4 may be larger than the width L1 of the third pattern area PA3. Therefore, it is possible to increase the moving distance or the stroke due to an increase in the electromagnetic force generated by the second driving coil 1251*a* in the same manner as the above-described contents.

In addition, the curve pattern area CPA may include a first curve pattern area CPA1, a second curve pattern area CPA2, a third curve pattern area CPA3, and a fourth curve pattern area CPA4.

The first curve pattern area CPA1, the second curve pattern area CPA2, the third curve pattern area CPA3, and the fourth curve pattern area CPA4 may be sequentially disposed clockwise in the drawings. Likewise, the first pattern area PA1 to the fourth pattern area PA4 may also be sequentially disposed clockwise.

The first curve pattern area CPA1 may be connected to one end of the first pattern area PA1 and the other end of the second pattern area PA2. In addition, the first curve pattern area CPA1 may be disposed between the one end of the first pattern area PA1 and the other end of the second pattern area PA2. Hereinafter, an end portion in a clockwise direction will be described as one side, and an end portion in a counterclockwise direction will be described as the other end.

The second curve pattern area CPA2 may be connected to one end of the second pattern area PA2 and the other end of the third pattern area PA3. In addition, the second curve pattern area CPA2 may be disposed between the one end of the second pattern area PA2 and the other end of the third pattern area PA3.

The third curve pattern area CPA3 may be connected to one end of the third pattern area PA3 and the other end of the fourth pattern area PA4. In addition, the third curve pattern area CPA3 may be disposed between the one end of the third pattern area PA3 and the other end of the fourth pattern area PA4.

The fourth curve pattern area CPA4 may be connected to one end of the fourth pattern area PA4 and the other end of the first pattern area PAL. In addition, the fourth curve pattern area CPA4 may be disposed between the one end of the fourth pattern area PA4 and the other end of the first pattern area PA1.

In other words, the first pattern area PA1 may be disposed at one side of the second driving coil 1251*a*, and the second pattern area PA2 may be disposed to be spaced the curve pattern area CPA from the first pattern area PA1. Likewise, the third pattern area PA3 may be disposed at the other side, and the fourth pattern area PA4 may be disposed to be spaced the curve pattern area CPA from the third pattern area PA3.

In addition, in the second driving coil 1251*a* according to the embodiment, an innermost turn MIT among the plurality of turns may have a first point P1, which is one end of the first group pattern area GPA1 (the first pattern area or the third pattern area).

In addition, in the second driving coil 1251*a* according to the embodiment, an outermost turn MOT among the plurality of turns may have a second point P2, which is one end of the first group pattern area GPA1 (the first pattern area or the third pattern area).

A virtual line VL1 connecting the first point P1 to the second point P2 may be inclined at a first angle θa with respect to the optical axis or the optical axis direction (Z-axis direction). In addition, the first angle θa may be in a range of 20 to 45 degrees.

Correspondingly, in the second driving coil 1251*a* according to the embodiment, the innermost turn MIT among the plurality of turns may have a third point P3, which is the other end of the first group pattern area GPA1 (the first pattern area or the third pattern area).

In addition, in the second driving coil 1251a according to the embodiment, an outermost turn MOT among the plurality of turns may have a fourth point P4, which is the other end of the first group pattern area GPA1 (the first pattern area or the third pattern area).

A virtual line VL2 connecting the third point P3 to the fourth point P4 may be inclined at a second angle θb with respect to the optical axis or the optical axis direction (Z-axis direction). The second angle θb may be in a range of 20 to 45 degrees like the first angle.

In addition, from another viewpoint, an angle (corresponding to the first angle) between a first boundary line (corresponding to VL1) and a second boundary line (corresponding to the optical axis or positioned inside the first boundary line) may be in a range of 20 to 45 degrees.

For example, the first boundary line VL1 may be a line between the first curve pattern area CPA1 and the first pattern area PA1 in contact with each other or a line between the third curve pattern area CPA3 and the third pattern area PA3 in contact with each other.

In addition, the second boundary line may be a line between the first curve pattern area CPA1 and the second pattern area PA2 in contact with each other or a line between the third curve pattern area CPA3 and the fourth pattern area PA4 in contact with each other.

Correspondingly, the angle (corresponding to the second angle) between a third boundary line (corresponding to VL2) and a fourth boundary line (corresponding to the optical axis) may be in a range of 20 to 40 degrees.

For example, the third boundary line (corresponding to VL2) may be a line between the second curve pattern area CPA2 and the third pattern area PA3 in contact with each other or a line between the fourth curve pattern area CPA4 and the first pattern area PA1 in contact with each other.

In addition, the fourth boundary line may be a line between the second curve pattern area CPA2 and the second pattern area PA2 in contact with each other or a line between the fourth curve pattern area CPA4 and the fourth pattern area PA4 in contact with each other.

In addition, the second driving coil 1251a according to the embodiment is formed with a plurality of turns as described above or is wound with unit coil patterns.

In addition, a width between the unit coil patterns may be larger in the second pattern area PA2 than a width between the unit coil patterns in the first pattern area PAL. Alternatively, a width W1 between the turns or the unit coil patterns in the first group pattern area GPA1 may be smaller than a width W2 between the turns or the unit coil patterns in the second group pattern area GPA2. Therefore, the width between the turns or the unit coil patterns in the third pattern area PA3 may be smaller than the width between the turns or the unit coil patterns in the fourth group pattern area GPA4. In the specification, a width in the first group pattern area GPA1 is a length in the first direction, and a width in the second group pattern area GPA2 is a length in the optical axis direction.

In addition, a width or distance gap1 between adjacent turns or unit coil patterns in the first group pattern area GPA1 may be different from or the same as a width or distance gap2 between adjacent turns or unit coil patterns in the second group pattern area GPA2. For example, the width or distance gap1 between the adjacent turns or unit coil patterns in the first group pattern area GPA1 may be the same as the width or distance gap2 between the adjacent turns or unit coil patterns in the second group pattern area GPA2.

For example, the width W1 between the unit coil patterns in the first pattern area PA1 or the third pattern area PA3 may be smaller than the width W2 between the unit coil patterns in the second pattern area PA2 or the fourth pattern area PA4.

Furthermore, the width of each of the pattern areas PA1 to PA4 may be a distance from the innermost turn or pattern MIT to the outermost turn or pattern MOT among the plurality of turns in the second driving coil 1251a. Therefore, the width L1 of the first pattern area PA1 or the third pattern area PA3 may be smaller than the width L2 of the second pattern area PA2 or the fourth pattern area PA4.

In contrast, the length of the first pattern area PA1 or the third pattern area PA3 in the optical axis direction (Z-axis direction) may be larger than the length of the second pattern area PA2 or the fourth pattern area PA4 in the optical axis direction (Z-axis direction). Therefore, a larger stroke of the first lens assembly or the second lens assembly may be set by the second driving unit.

In addition, the distance gap1 between the adjacent unit coil patterns in the first pattern area PA1 or the third pattern area PA3 may be the same as or different from the distance gap2 between the unit coil patterns in the second pattern area PA2 or the fourth pattern area PA4. In addition, the width of the curve pattern area CPA in the second driving coil 1251a according to the embodiment may vary depending on a position. For example, the width of the curve pattern area CPA may decrease as the width approaches the first pattern area PA1 or the third pattern area PA3.

The width of the curve pattern area CPA may be a distance between facing outer surfaces. The curve pattern area CPA may be changed in one direction. In addition, a width W3 of the curve pattern area CPA may decrease as the width approaches the first group pattern area GPA1. In addition, the width W3 of the curve pattern area CPA may increase toward the second group pattern area GPA2. For example, a width Wk between the turns or the unit patterns on one end of the first curve pattern area CPA1 may be larger than the width W1 between the turns or the unit patterns on the other end of the first curve pattern area CPA1.

In addition, a width between the first boundary line (or the virtual line VL1 or VL2) and the second boundary line (or a virtual line, VL1' or VL2') may be larger than the width L1 of the first pattern area PA1 and smaller than the width L2 of the second pattern area PA2.

Alternatively, the width in the curve pattern area CPA may be larger than the width L1 in the first group pattern area GPA1 and smaller than the width L2 in the second group pattern area GPA2.

Therefore, the width between the first boundary line (or the virtual line VL1 or VL2) and the second boundary line (or the virtual line, VL1' or VL2') may be larger than the width L1 of the third pattern area PA3 and smaller than the width L2 of the fourth pattern area PA4.

In addition, the width of the curve pattern area CPA may increase from the first boundary line (or the virtual line VL1 or VL2) to the second boundary line (or the virtual line VL1' or VL2'). In addition, as described above, the width between the turns or the unit patterns in the curve pattern area CPA may increase from the first boundary line (or the virtual line VL1 or VL2) to the second boundary line (or the virtual line VL1' or VL2'). Alternatively, the width between the turns or the unit patterns in the curve pattern area CPA may widen or increase from the first boundary line (or the virtual line VL1 or VL2) to the second boundary line (or the virtual line VL1' or VL2').

In addition, the width of the pattern area on the first boundary line (or the virtual line VL1 or VL2) may differ from the width of the pattern area on the second boundary line (or the virtual line VL1' or VL2'). For example, the width of the pattern area on the first boundary line (or the virtual line VL1 or VL2) may be smaller than the width of the pattern area on the second boundary line (or the virtual line VL1' or VL2').

In addition, in the embodiment, a ratio of the width L1 of the first pattern area PA1 to the width L2 of the second pattern area PA2 may be in a range of 1:1.5 to 1:4.5. When the ratio is larger than 1:1.5, it is difficult to generate a driving force for a larger stroke, and when the ratio is smaller than 1:4.5, the length of the second driving coil increases, and thus there is a limit in which it is difficult to control forward/backward movements. In addition, from another viewpoint, a ratio of the width of the first group pattern area GPA1 to the width of the second group pattern area GPA2 may also be in a range of 1:1.5 to 1:4.5.

In addition, the width of the first group pattern area GPA1 may be a (maximum) length in the first direction between the innermost turn (or the unit pattern) and the outermost turn (or the unit pattern) among the plurality of turns in the first group pattern area. In addition, the width of the second group pattern area GPA2 may be a (maximum) length in the optical axis direction (Z-axis direction) between the innermost turn (or the unit pattern) and the outermost turn (or the unit pattern) among the plurality of turns in the second group pattern area.

In addition, in the second driving coil 1251a according to the embodiment, a ratio of a first width L3 to a second width L4 may be in a range of 1:1.5 to 1:4. Here, the first width L3 may be a maximum length in the first direction (X-axis direction) between the outermost turns among the plurality of turns in the first group pattern area GPA1. Alternatively, the first width L3 may be a distance in the first direction (X-axis direction) between the outermost turn among the plurality of turns (unit patterns) in the first pattern area PA1 and the outermost turn among the plurality of turns in the third pattern area PA3. In addition, the second width L4 may be a maximum length in the optical axis direction (Z-axis direction) between the outermost turns (unit patterns) among the plurality of turns in the second group pattern area GPA2. Alternatively, the second width L4 may be a distance in the optical axis direction (Z-axis direction) between the outermost turn among the plurality of turns (unit patterns) in the second pattern area PA2 and the outermost turn among the plurality of turns in the fourth pattern area PA4. In addition, when the ratio is larger than 1:1.5, the efficiency for generating a driving force is degraded, and when the ratio is smaller than 1:4, there is a limit in which compactness is difficult and it is difficult to sufficiently generate an electromagnetic force for a stroke.

In addition, in the second driving coil 1251a according to the embodiment, a ratio of a third width L5 to a fourth width L6 may be in a range of 1:1.5 to 1:2.5. The third width L5 may be the shortest distance in the first direction (X-axis direction) between the innermost turns among the plurality of turns (unit patterns) in the first group pattern area GPA1. Alternatively, the third width L5 may be the shortest distance in the first direction (X-axis direction) between the innermost turn among the plurality of turns (unit patterns) in the first pattern area PA1 and the innermost turn among the plurality of turns in the first direction (X-axis direction) in the third pattern area PA3. In addition, the fourth width L6 may be the shortest distance in the optical axis direction (Z-axis direction) between the innermost turns among the plurality of turns (unit patterns) in the second group pattern area GPA2. Alternatively, the fourth width L6 may be the shortest distance in the optical axis direction (Z-axis direction) between the innermost turn among the plurality of turns (unit patterns) in the second pattern area PA2 and the innermost turn among the plurality of turns (unit patterns) in the fourth pattern area PA4. In the specification, "inside" refers to a direction toward the center of the second driving coil. In addition, "outside" refers to a direction opposite to the direction toward the center of the second driving coil. For example, the inside may refer to a direction from an area in which a single wound turn has the shortest length to an area in which the single wound turn has the largest length.

In addition, as will be described below, the moving distance of the driving magnet may be equal to or smaller than the width L2 of the second group pattern area GPA2. For example, the moving distance of the driving magnet may be larger than or equal to the width L2 of the second pattern area PA2 or the fourth pattern area PA4. With this configuration, it is possible to suppress a counter electromotive force generated by the second driving coil 1251a while the second driving magnet moves in the optical axis direction (Z-axis direction). In other words, it is possible to improve driving efficiency.

Figure 18:
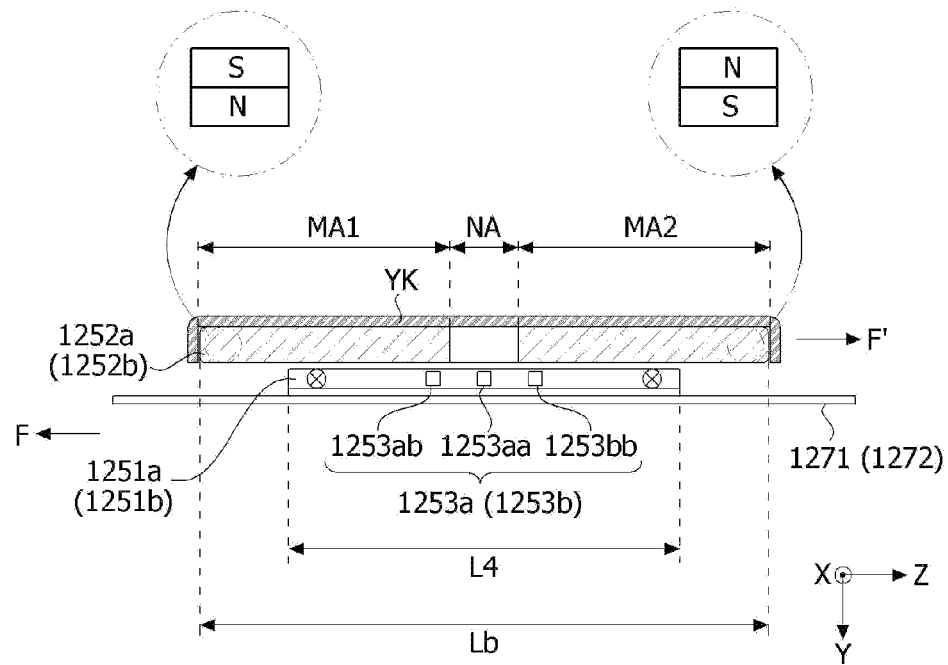
FIG. 18 is a top view illustrating a second driving unit and a first board according to the embodiment.
Figure 19:
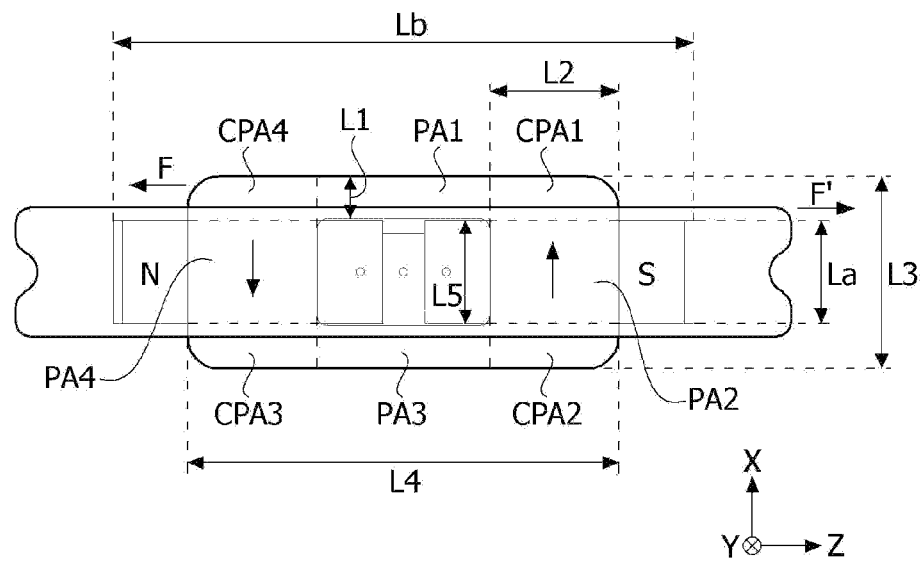
FIG. 19 is a side view illustrating the second driving unit according to the embodiment.
Figure 20:
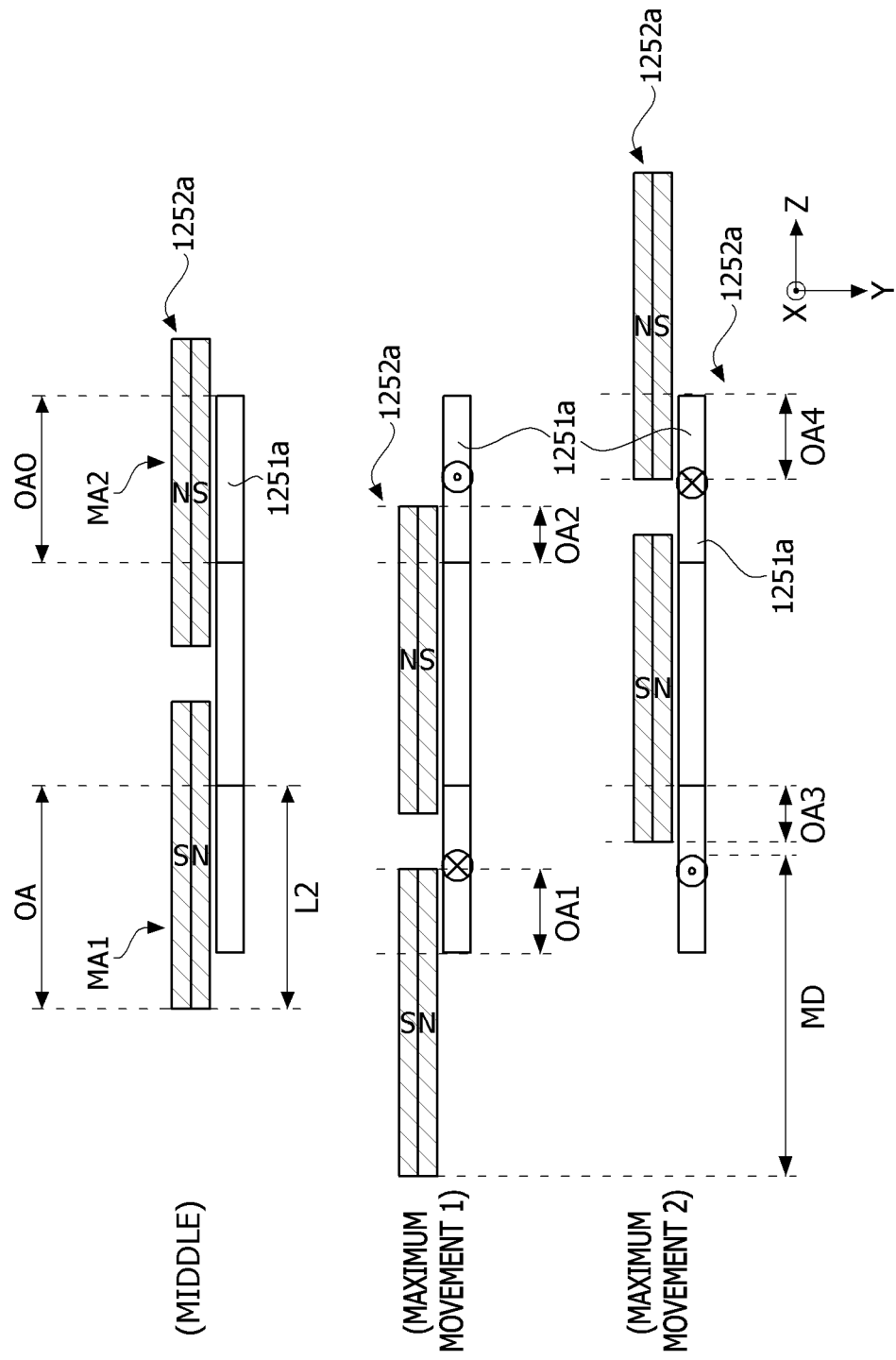
FIG. 20 is a view for describing a movement of a second driving magnet by the second driving unit according to the embodiment.
Figure 21:
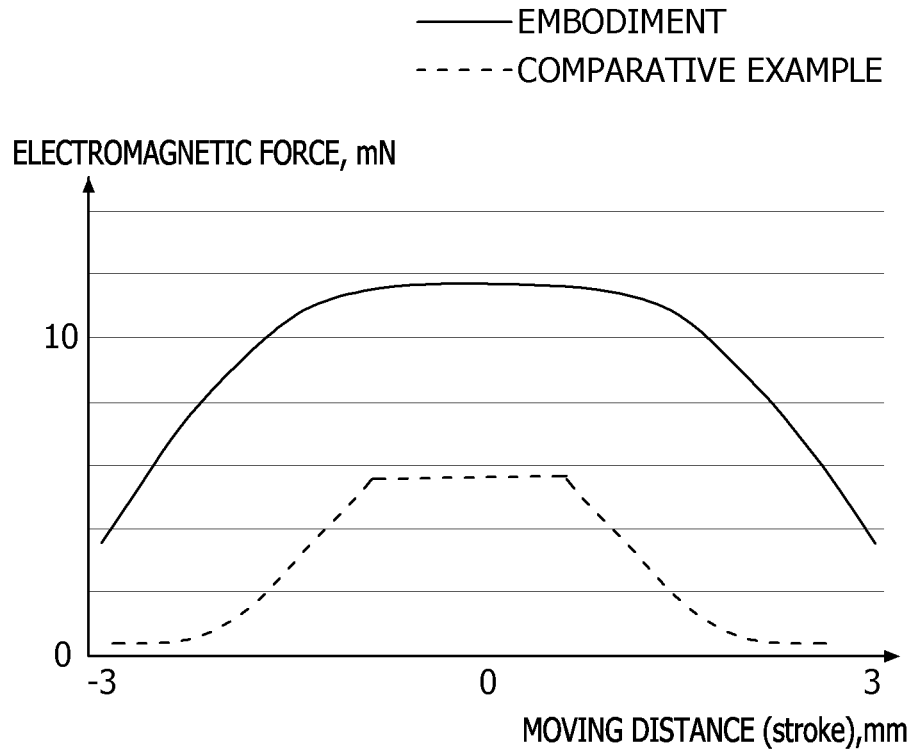
FIG. 21 is a graph illustrating an electromagnetic force according to a position of the second driving magnet.
Figure 22:
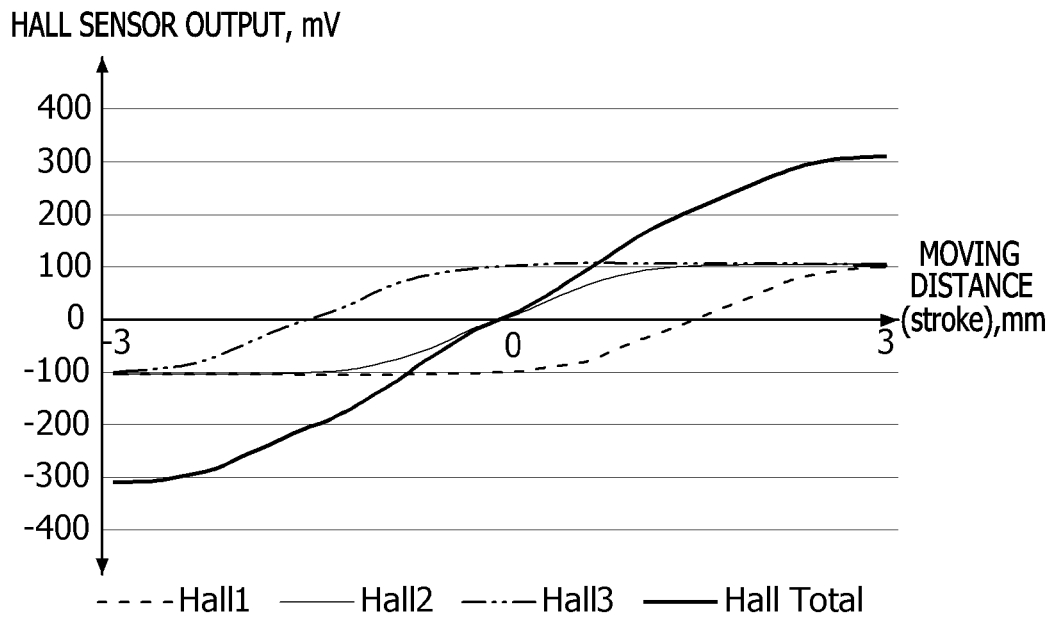
FIG. 22 is a graph illustrating an output of a Hall sensor according to a moving distance.

FIG. 18 is a top view illustrating a second driving unit and a first board according to the embodiment, FIG. 19 is a side view illustrating the second driving unit according to the embodiment, FIG. 20 is a view for describing a movement of a second driving magnet by the second driving unit according to the embodiment, FIG. 21 is a graph illustrating an electromagnetic force according to a position of the second driving magnet, and FIG. 22 is a graph illustrating an output of a Hall sensor according to a moving distance.

Referring to FIGS. 18 to 20, as described above, the second driving magnet 1252a, the second driving coil 1251a, and the first board 1271 according to the embodiment may be sequentially disposed in the second direction (Y-axis direction).

Furthermore, the second driving magnet 1252a may be coupled to a yoke YK disposed at (inside) the first lens assembly or second lens assembly side. In addition, the yoke YK may be coupled to a side surface of the first lens assembly or the second lens assembly through a bonding member. The bonding member may be made of various materials having a bonding strength and made of, for example, an epoxy. In addition, the yoke YK can prevent leakage of a magnetic flux generated from the coupled second driving magnet 1252a. Therefore, the yoke YK may be positioned on a surface of the second driving magnet 1252a, which does not face the second driving coil 1251, (or a surface opposite to the surface facing the second driving coil 1251). Alternatively, the yoke YK may be positioned on the entire surface of the second driving magnet 1252a excluding the surface facing the second driving coil 1251. For example, the yoke YK may be in contact with or positioned on the surface (the side surface and the surface opposite to the facing surface) of the second driving magnet 1252a excluding the surface facing the second driving coil 1251.

The second driving magnet 1252a may be divided into a plurality of areas in the third direction (Z-axis direction). In the embodiment, the second driving magnet 1252a may include a first magnet area MA1, a neutral area NA, and a second magnet area MA2 disposed in the third direction (Z-axis direction).

The first magnet area MA1 and the second magnet area MA2 may be disposed to be spaced apart from each other in the optical axis direction (Z-axis direction). In addition, the neutral area NA may be disposed between the first magnet area MA1 and the second magnet area MA2. In addition, the neutral area NA may be called various expressions such as "neutral area," "neutral part," "neutral part," "separation part," and "separation area."

In addition, the first magnet area MA1 may have a first polarity. In addition, the second magnet area MA2 may have a second polarity. In this case, the first polarity and the second polarity may be opposite polarities. For example, the first polarity may be any one of the N pole and the S pole, and the second polarity may be the other one of the N pole and the S pole. In this case, the polarity is a polarity of a surface facing an adjacent coil. For example, the first magnet area MA1 and the second magnet area MA2 of the fourth magnet may respectively have the first polarity and the second polarity on surfaces facing the fourth coil.

Furthermore, the first magnet area MA1 and the second magnet area MA2 of the second driving magnet may have various polarity structures according to magnetization methods. The first magnet area MA1 may have any one of the N pole and the S pole on a surface facing the adjacent second driving coil and have the other one of the N pole and S pole on a surface facing the first lens assembly or the second lens assembly. Likewise, the second magnet area MA2 may have any one of the N pole and the S pole on a surface facing the adjacent second driving coil and have the other one of the N pole and S pole on a surface facing the first lens assembly or the second lens assembly. For example, the S pole may be formed at an inner side of the first magnet area MA1, and the N pole may be formed at an outer side thereof. In addition, the N pole may be formed at an inner side of the second magnet area MA2, and an S pole may be formed at an outer side thereof. With this configuration, as described above, a force (e.g., an electromagnetic force, F) may be applied to the second drive coil 1251*a* in a direction opposite to the optical axis direction. However, since the second driving coil 1251*a* is a fixed component, a force F' may be applied to the second driving magnet 1252*a* in the optical axis direction (Z-axis direction). Therefore, the second driving magnet 1252*a* and the first lens assembly or the second lens assembly coupled to the second driving magnet 1252*a* may move in the optical axis direction (Z-axis direction). Hereinafter, "F" means a direction of the electromagnetic force applied to the second driving coil. In addition, "F'" means a direction in which the second driving magnet is moved by the electromagnetic force. However, this is an example, and as described above, the direction of the current may vary depending on the direction of the magnetic force.

In addition, in the case of the bipolar magnetization, a length of the neutral area NA in the optical axis direction may be in a range of 5% to 40% of the entire length of the second driving magnet 1252*a* in the optical axis direction.

Furthermore, in the case of the unipolar magnetization, in the second magnet formed of two magnets spaced apart in the optical axis direction, a distance between the two magnets may be maintained through various assembling or coupling structures. Likewise, the distance between the two magnets may be in a range of 5% to 40% of the entire length of the second driving magnet in the optical axis direction.

Therefore, the length of the neutral area NA in the optical axis direction may be the same as or different from a length of the first magnet area MA1 or the second magnet area MA2 in the optical axis direction.

The length of the first magnet area MA1 in the optical axis direction may be the same as the length of the second magnet area MA2 in the optical axis direction.

In addition, in the embodiment, even when the second driving magnet 1252*a* moves in the optical axis direction (Z-axis direction), at least a portion of the second driving magnet 1252*a* may overlap the second driving coil 1251*a* in the second direction (Y-axis direction). With this configuration, the second driving magnet 1252*a* may move in the optical axis direction (Z-axis direction). In addition, when the second driving magnet 1252*a* moves, interaction between the second driving magnet 1252*a* and the second driving coil 1251*a* may be easily formed.

In addition, in the embodiment, a length Lb of the second driving magnet 1252*a* in the optical axis direction (Z-axis direction) may be larger than the length L4 in the optical axis direction between the outermost turns (unit patterns) among the plurality of turns in the second group pattern area GPA2. Alternatively, the length Lb of the second driving magnet 1252*a* in the optical axis direction (Z-axis direction) may be larger than the distance/length L4 in the optical axis direction (Z-axis direction) between the outermost turn among the plurality of turns (unit patterns) in the second pattern area PA2 and the outermost turn among the plurality of turns in the fourth pattern area PA4. With this configuration, a magnetic force may be applied to the entirety of the second group pattern area (or the second pattern area and the fourth pattern area), which has a significant influence on generating the electromagnetic force, in the second driving coil 1251*a*. In addition, a uniform magnetic force may be applied to the second group pattern area (or the second pattern area and the fourth pattern area).

In addition, in the embodiment, a length La of the second driving magnet 1252*a* in the first direction (X-axis direction) may be smaller than the length L3 in the first direction (X-axis direction) between the outermost turns (unit patterns) among the plurality of turns in the first group pattern area GPA1. Alternatively, the length La of the second driving magnet 1252*a* in the first direction (X-axis direction) may be smaller than the distance/length L3 in the first direction (X-axis direction) between the outermost turn among the plurality of turns (unit patterns) in the first pattern area PA1 and the outermost turn among the plurality of turns in the third pattern area PA3. When the second driving magnet 1252*a* is positioned in the middle, at least a portion of the second driving magnet 1252*a* may overlap the second driving coil 1251*a* in the second direction (Y-axis direction). With this configuration, a magnetic force may be applied to the entirety of the second group pattern area (or the second pattern area and the fourth pattern area), which has a significant influence on generating the electromagnetic force, in the second driving coil 1251*a*. Furthermore, even when the second driving magnet 1252*a* moves in the optical axis direction (Z-axis direction), a magnetic force may be uniformly applied to the second group pattern area GPA2 of the second driving coil 1251*a*. Therefore, an electromagnetic force may be uniformly generated by the second driving coil 1251*a* and the second driving magnet 1252*a*.

In addition, the lengths (corresponding to La) of the first magnet area MA1 and the second magnet area MA2 in the first direction (X-axis direction) may be smaller than a maximum length of the second pattern area PA2 in the first direction (X-axis direction). Therefore, the entirety of the second group pattern area, which has a significant influence on generating an electromagnetic force, may receive a magnetic force from the first and second magnet areas of the first driving magnet. Furthermore, as described above, the driving force (e.g., the electromagnetic force) may be increased by a difference between the width of the first pattern area (or the third pattern area) and the width of the second pattern area (or the fourth pattern area). In addition, the moving distance (stroke) of the second driving magnet may increase.

Further referring to FIG. 21, a comparative example is a case in which the width of the first pattern area (or the third pattern area) and the width of the second pattern area (or the fourth pattern area) are the same, and an embodiment is a case in which the width of the first pattern area (or the third pattern area) is smaller than the width of the second pattern area (or the fourth pattern area). Therefore, when compared to the comparative example, the camera actuator according to the embodiment may have a smaller thickness and provide a larger maximum electromagnetic force because it has a small driving magnet in the first direction. In addition, the camera actuator according to the embodiment may provide a larger moving distance or stroke compared to the comparative example.

In addition, in the embodiment, the camera actuator may further include a second Hall sensor unit positioned within the innermost turn among the plurality of turns (unit patterns) of the second driving coil.

As described above, the second Hall sensor unit may include the fourth Hall sensor 1253a. The second Hall sensor unit may overlap the second driving coil 1251a in the first direction (X-axis direction). In addition, the second Hall sensor unit may overlap the second driving coil 1251a in the third direction (Z-axis direction). In addition, the second Hall sensor unit may overlap the second driving magnet 1252a in the second direction (Y-axis direction).

In addition, a plurality of fourth Hall sensors 1253a may be formed. For example, the fourth Hall sensor 1253a may include a 4-1 Hall sensor 1253aa, a 4-2 Hall sensor 1253ab, and a 4-3 Hall sensor 1253bb. The 4-2 Hall sensor 1253ab, the 4-1 Hall sensor 1253aa, and the 4-3 Hall sensor 1253bb may be sequentially disposed in the third direction (Z-axis direction). For example, the 4-1 Hall sensor 1253aa may be disposed between the 4-2 Hall sensor 1253ab and the 4-3 Hall sensor 1253bb. With this configuration, as described above, even when the moving distance or stroke of the first lens assembly or the second lens assembly increases, a long moving distance or stroke section may be easily covered through the plurality of fourth Hall sensors 1253a. In other words, accurate position detection may be performed even with the increased moving distance.

In addition, based on a case in which the second driving magnet is positioned at the center, the 4-1 Hall sensor 1253aa may overlap the neutral area NA in the second direction (Y-axis direction). In addition, the 4-2 Hall sensor 1253ab may overlap the first magnet area MA1 in the second direction (Y-axis direction). In addition, the 4-3 Hall sensor 1253bb may overlap the second magnet area MA2 in the second direction (Y-axis direction).

Further referring to FIG. 22, the 4-1 Hall sensor 1253aa corresponds to "Hall2." The 4-2 Hall sensor 1253ab corresponds to "Hall1." The 4-3 Hall sensor 1253bb corresponds to "Hall3." As described above, since the 4-2 Hall sensor 1253ab, the 4-1 Hall sensor 1253aa, and the 4-3 Hall sensor 1253bb are sequentially disposed in the third direction (Z-axis direction), outputs of the entire Hall sensor including the 4-2 Hall sensor 1253ab, the 4-1 Hall sensor 1253aa, and the 4-3 Hall sensor 1253bb may be formed linearly or close to linear according to the moving distance. In addition, the camera actuator or camera device according to the embodiment performs position detection by adding the outputs of the 4-2 Hall sensor 1253ab, the 4-1 Hall sensor 1253aa, and the 4-3 Hall sensor 1253bb. With this configuration, the camera actuator according to the embodiment may more accurately measure the movement or position of the first lens assembly or the second lens assembly in the optical axis direction.

In addition, in the camera actuator according to the embodiment, the second driving magnet 1252a may move from "middle" to "maximum movement 1" or "maximum movement 2." Here, in the case of "middle," the center of the first magnet area (or the second magnet area) of the second driving magnet 1252a may be disposed parallel to the center of the fourth pattern area (or the second pattern area) in the first direction (X-axis direction). Alternatively, the center of the first magnet area MA1 may be positioned in the middle of the fourth pattern area. In this case, the first magnet area MA1 and the fourth pattern area may overlap at least partially in the first direction (X-axis direction) (OA). In addition, the second magnet area MA2 and the second pattern area may overlap at least partially in the first direction (X-axis direction) (OA0).

In addition, the case of "maximum movement 1" may correspond to a case in which the second driving magnet 1252a maximally moves in a direction opposite to the third direction (Z-axis direction). In this case, the first magnet area MA1 of the second driving magnet 1252a may at least partially overlap the fourth pattern area (OA1). In addition, at least a portion of the second magnet area MA2 may overlap the second pattern area (OA2).

In this case, the area OA in which the second magnet area MA2 and the second pattern area overlap each other in the first direction (X-axis direction) in the case of "middle" may be larger than the area OA1 in which the first magnet area MA1 and the fourth pattern area overlap each other in the first direction (X-axis direction) in the case of "maximum movement 1." This may be applied to OA0 and OA2 in the same manner.

In addition, the case of "maximum movement 2" may correspond to a case in which the second driving magnet 1252a maximally moves in the third direction (Z-axis direction). In this case, the first magnet area MA1 of the second driving magnet 1252a may at least partially overlap the fourth pattern area (OA3). In addition, at least a portion of the second magnet area MA2 may overlap the second pattern area (OA4).

In this case, the area OA in which the second magnet area MA2 and the second pattern area overlap each other in the first direction (X-axis direction) in the case of "middle" may be larger than the area OA3 in which the first magnet area MA1 and the fourth pattern area overlap each other in the first direction (X-axis direction) in the case of "maximum movement 2." This may be applied to OA0 and OA4 in the same manner.

In addition, the maximum moving distance of the second driving magnet 1252a may correspond to lengths of the first and second recesses accommodating the first ball or the second ball in the above-described first lens assembly in the optical axis direction. In addition, the maximum movement distance of the second driving magnet 1252a may correspond to a distance of the first magnet area MA1 moving from the maximum movement 1 to the maximum movement 2 in the optical axis direction (Z-axis direction). Alternatively, the maximum moving distance of the second driving magnet 1252a may correspond to a distance between stoppers for restricting the movement of the first ball or the second ball in the optical axis direction. Alternatively, the maximum moving distance of the second driving magnet 1252a may be a maximum distance that a bobbin may move and may correspond to a separation distance in the optical axis direction between a stopper positioned in the optical axis direction and a stopper positioned in a direction opposite to the optical axis direction with respect to the bobbin. In addition, the maximum moving distance of the second driving magnet 1252a may correspond to twice a distance moving from the middle to the maximum movement 1. In addition, the moving distance of the second driving magnet 1252a according to the embodiment may be in a range of −6 to +6 mm based on the middle. Specifically, the moving distance of the second driving magnet 1252a may be in a range of −5 to +5 mm based on the middle. More specifically, the moving distance of the second driving magnet 1252a may be in a range of −4 to +4 mm based on the middle. Here, the moving distance from the center in the optical axis direction is referred to as "+," and a direction opposite to the optical axis direction is referred to as "−." Therefore, the second driving magnet 1252a (or at least one of the first lens assembly and the second lens assembly) according to the embodiment may move in a range of 0 to 12 mm in the optical axis direction. In addition, the above-described maximum moving distance may correspond to the maximum stroke of the lens assembly in the camera module.

In addition, a maximum moving distance MD of the second driving magnet 1252a may be larger than the length of the first pattern area in the first direction (X-axis direction).

In addition, 0.5 times (½ times) the maximum moving distance MD of the second driving magnet 1252a may be larger than the length L1 of the first pattern area in the first direction (X-axis direction).

In addition, a ratio of the maximum moving distance MD of the second driving magnet 1252a to the length L1 of the first pattern area in the first direction (X-axis direction) may be in a range of 1:0.1 to 1:0.7. With this configuration, a resistance may be appropriately adjusted by adjusting the width of the first pattern area while decreasing the thickness in the first direction (X-axis direction) by the second driving coil. In other words, the width of the first pattern area according to the embodiment may be variously adjusted by applying the above description.

In addition, 0.5 times (½ times) the maximum moving distance MD of the second driving magnet 1252a may be smaller than or equal to the length L2 of the second pattern area in the optical axis direction (Z-axis direction).

In addition, a ratio of the maximum moving distance MD of the second driving magnet 1252a to the length L2 of the second pattern area in the optical axis direction (Z-axis direction) may be in a range of 1:0.5 to 1:1.5. With this configuration, it is possible to minimize the generation of the counter electromagnetic force while decreasing a weight of the second driving unit (a weight of the second driving magnet 1252a).

In addition, twice the length L2 of the second pattern area (or the fourth pattern area) in the optical axis direction may be larger than the maximum moving distance MD of the second driving magnet 1252a.

In addition, the width of the first pattern area (or the third pattern area) may be smaller than or equal to the maximum moving distance MD of the second driving magnet 1252a.

Additionally, a structure in which the width of the above-described pattern in the second driving coil 1251 is modified may be applied to only any one of the lens assemblies that perform AF and zooming.

The structure in which the width of the above-described pattern in the second driving coil 1251 is modified may be applied to only a lens assembly that performs the AF. For example, when the first lens assembly performs the AF and the second lens assembly performs the zooming, the structure of the second driving coil according to the embodiment may be applied to only the fourth coil for providing the driving force to the first lens assembly.

In addition, in an additional modified example, the structure in which the width of the above-described pattern in the second driving coil 1251 is modified may be applied to only a lens assembly that performs the zooming. For example, when the first lens assembly performs the AF and the second lens assembly performs the zooming, the structure of the second driving coil according to the embodiment may be applied to only the fifth coil for providing the driving force to the second lens assembly.

In addition, the structure in which the width of the above-described pattern in the second driving coil 1251 is modified may be applied to both the lens assemblies that perform the AF and the zooming. For example, when the first lens assembly performs the AF and the second lens assembly performs the zooming, the structure of the second driving coil according to the embodiment may be applied to only the fourth coil and the fifth coil for providing the driving force to the first lens assembly and the second lens assembly.

Furthermore, the above-described camera device may be manufactured by assembling the first camera actuator or the second camera actuator and then coupling the first camera actuator to the second camera actuator.

Figure 23:
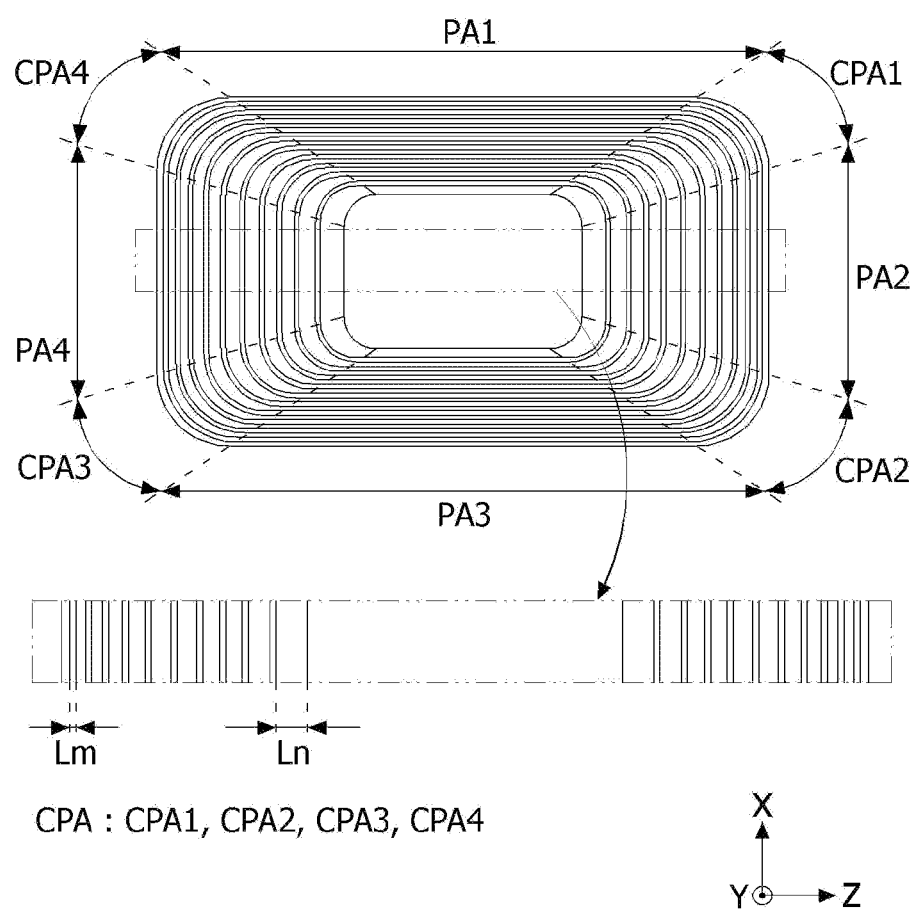
FIG. 23 is a view illustrating a second driving coil according to another embodiment.
Figure 24:
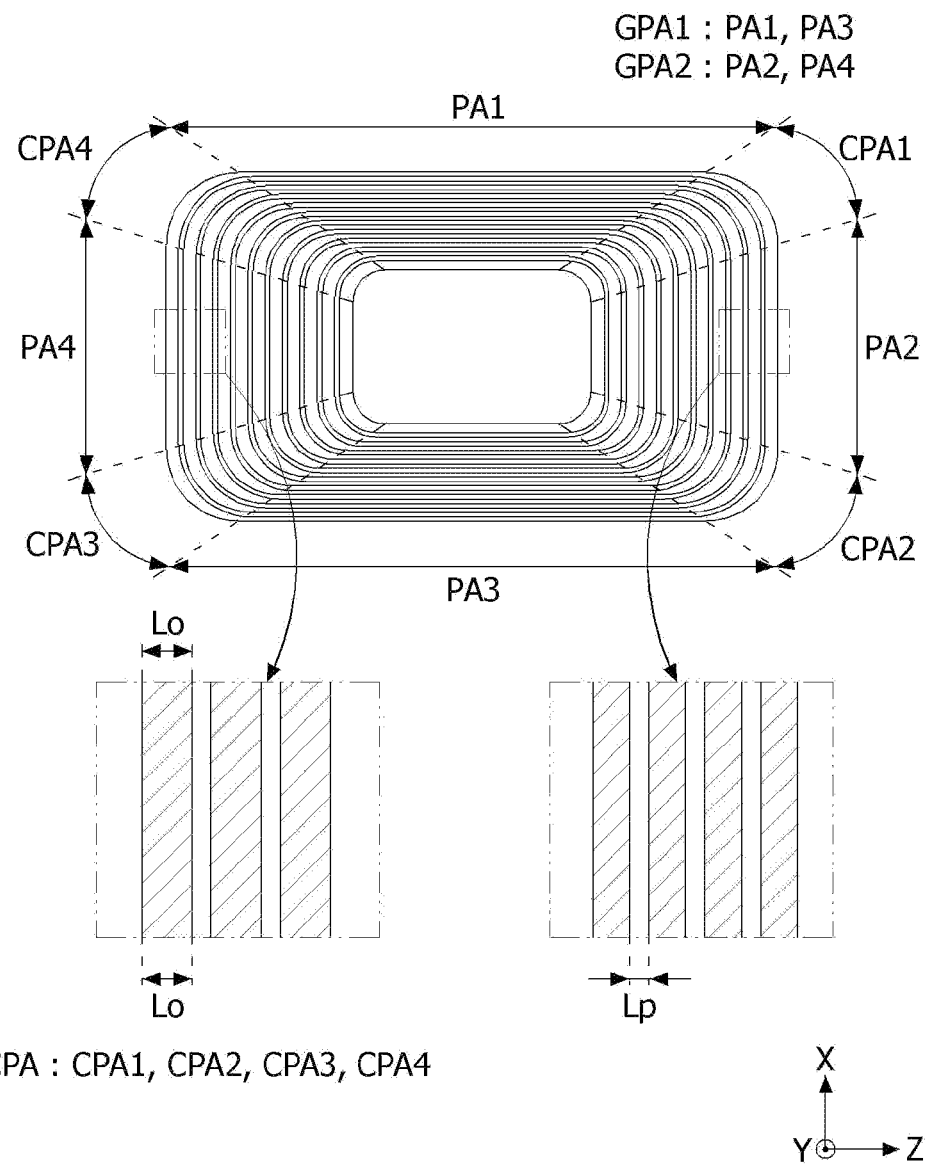
FIG. 24 is a view illustrating a second driving coil according to still another embodiment.
Figure 25:
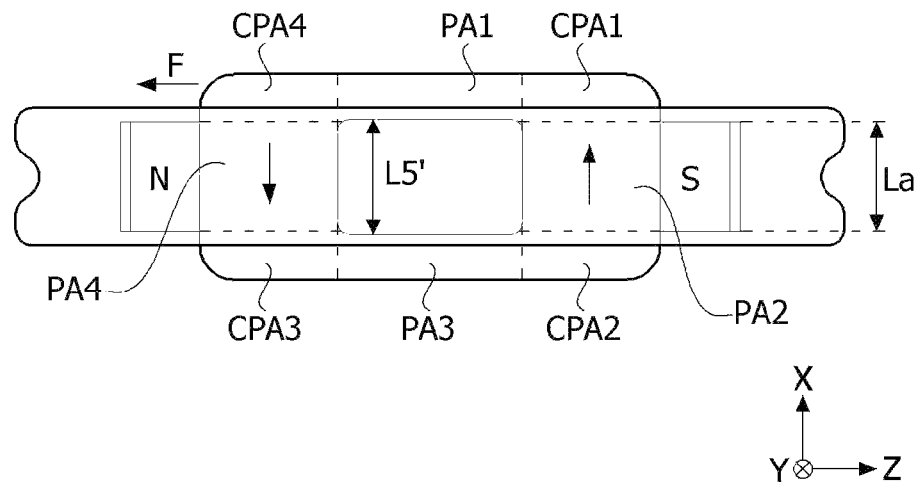
FIG. 25 is a side view illustrating a second driving unit according to another modified example.
Figure 26:
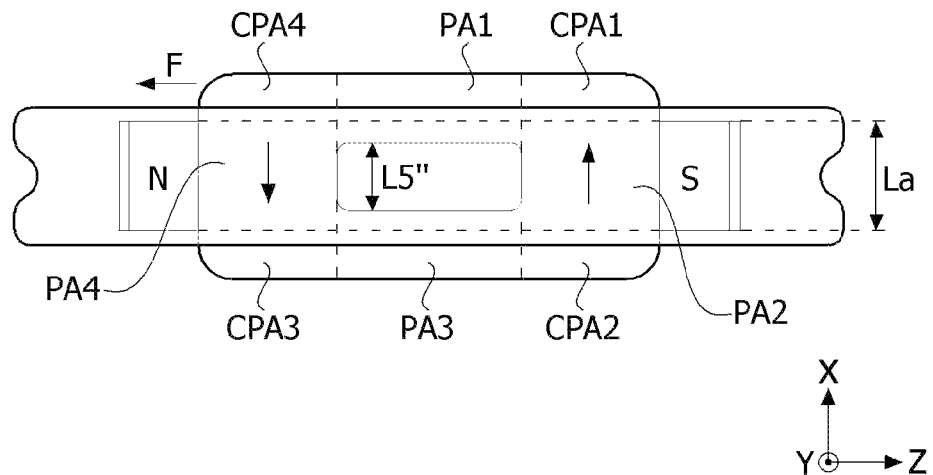
FIG. 26 is a side view illustrating a second driving unit according to still another modified example.

FIG. 23 is a view illustrating a second driving coil according to another embodiment, FIG. 24 is a view illustrating a second driving coil according to still another embodiment, FIG. 25 is a side view illustrating a second driving unit according to another modified example, and FIG. 26 is a side view illustrating a second driving unit according to still another modified example.

Referring to FIG. 23, the second driving coil 1251a according to another embodiment includes the fourth coil 1251a and the fifth coil 1251b as described above. The following description will be made based on the second driving coil including the fourth coil and the fifth coil.

The second driving coil 1251a or 1251b (the following description will be made as "1251a") according to another embodiment may include the first pattern area PA1, the second pattern area PA2, the third pattern area PA3, the fourth pattern PA4, and the curve pattern areas CPA as described above.

In addition, the second driving coil 1251a may be formed with at least one winding or turn. The following description will be made based on the second driving coil 1251a formed with a plurality of turns.

In addition, the second driving coil 1251a may be formed in various types. For example, the second driving coil 1251a may be formed of a FP coil. However, the present invention is not limited to these types.

In addition, the above-described contents excluding the following description may be applied to the description of the second driving coil in the same manner.

The second driving coil 1251a according to another embodiment may have a variable length of the turn (unit pattern) in the optical axis direction (Z-axis direction) in the second group pattern area GPA2. For example, the length of the turn (unit pattern) in the optical axis direction (Z-axis direction) in the second pattern area PA2 or the fourth pattern area PA4 may increase or decrease as the width approaches the center of the second driving coil 1251a.

A length Ln of the innermost turn among the plurality of turns (unit patterns) in the optical axis direction (Z-axis direction) in the second pattern area PA2 or the fourth pattern area PA4 may differ from a length Lm of the outermost turn among the plurality of turns (unit patterns) in the optical axis direction (Z-axis direction) in the second pattern area PA2 or the fourth pattern area PA4. For example, the length Ln of the innermost turn among the plurality of turns (unit patterns) in the optical axis direction (Z-axis direction) in the second pattern area PA2 or the fourth pattern area PA4 may be larger than or smaller than the length Lm of the outermost turn among the plurality of turns (unit patterns) in the optical axis direction (Z-axis direction) in the second pattern area PA2 or the fourth pattern area PA4. With this configuration, it is possible to reduce a phenomenon in which the electromagnetic force decreases even when the second driving magnet moves to the maximum movement 1 or maximum movement 2. Therefore, the electromagnetic force generated by the second driving coil may be generated uniformly according to the distance of the second driving magnet. Therefore, control of movement of the first lens assembly or the second lens assembly may be accurately performed.

Referring to FIG. 24, the second driving coil 1251a according to still another embodiment includes the fourth coil 1251a and the fifth coil 1251b as described above. The following description will be made based on the second driving coil including the fourth coil and the fifth coil.

The second driving coil 1251a or 1251b (the following description will be made as "1251a") according to still another embodiment may include the first pattern area PA1, the second pattern area PA2, the third pattern area PA3, the fourth pattern PA4, and the curve pattern areas CPA as described above.

In addition, the second driving coil 1251a may be formed with at least one winding or turn. The following description will be made based on the second driving coil 1251a formed with a plurality of turns.

In addition, the second driving coil 1251a may be formed in various types. For example, the second driving coil 1251a may be formed of a FP coil. However, the present invention is not limited to these types.

In addition, the above-described contents excluding the following description may be applied to the description of the second driving coil in the same manner.

In the second driving coil 1251a according to still another embodiment, lengths Lo and Lp of the turn (unit pattern) in the optical axis direction (Z-axis direction) in the second group pattern area GPA2 may differ. For example, the lengths Lo and Lp of the turn (unit pattern) in the optical axis direction (Z-axis direction) in the second pattern area PA2 or the fourth pattern area PA4 may differ.

In addition, a width Ls of the second pattern area PA2 and a width Lr of the fourth pattern area PA4 may differ. With this configuration, when a distance from an initial position (e.g., a middle) of the first lens assembly or the second lens assembly to the maximum moving position is different along the optical axis, the electromagnetic force generated by the second driving coil 1251a may be generated differently depending on a moving position of the first lens assembly or the second lens assembly.

Referring to FIGS. 25 and 26, a second driving unit according to another modified example may include the second driving coil 1251a, the second driving magnet 1252a, and the like as described above. Furthermore, the second driving coil 1251a includes the fourth coil 1251a and the fifth coil 1251b as described above. The following description will be made based on the second driving coil including the fourth coil and the fifth coil. The second driving coil 1251a or 1251b (the following description will be made as "1251a") according to another modified example may include the first pattern area PA1, the second pattern area PA2, the third pattern area PA3, the fourth pattern PA4, and the curve pattern areas CPA as described above. In addition, the second driving coil 1251a may be formed with at least one winding or turn. The following description will be made based on the second driving coil 1251a formed with a plurality of turns. The contents described above in the second driving unit excluding the following description may be applied in the same manner.

In the second driving unit according to another modified example, a third width L5' of the second driving coil 1251a may be larger than the length La of the second driving magnet 1252a in the first direction (X-axis direction). Here, the third width L5' may be the shortest distance in the first direction (X-axis direction) between the innermost turns among the plurality of turns (unit patterns) in the first group pattern area GPA1. Alternatively, the third width L5' may be the shortest distance in the first direction (X-axis direction) between the innermost turn among the plurality of turns (unit patterns) in the first pattern area PA1 and the innermost turn among the plurality of turns in the third pattern area PA3.

In a second driving unit according to still another modified example illustrated in FIG. 26, a third width L5" of the second driving coil 1251a may be smaller than the length La of the second driving magnet 1252a in the first direction (X-axis direction). Here, the third width L5" may be the shortest distance in the first direction (X-axis direction) between the innermost turns among the plurality of turns (unit patterns) in the first group pattern area GPA1. Alternatively, the third width L5" may be the shortest distance in the first direction (X-axis direction) between the innermost turn among the plurality of turns (unit patterns) in the first pattern area PA1 and the innermost turn among the plurality of turns in the third pattern area PA3.

Figure 27:
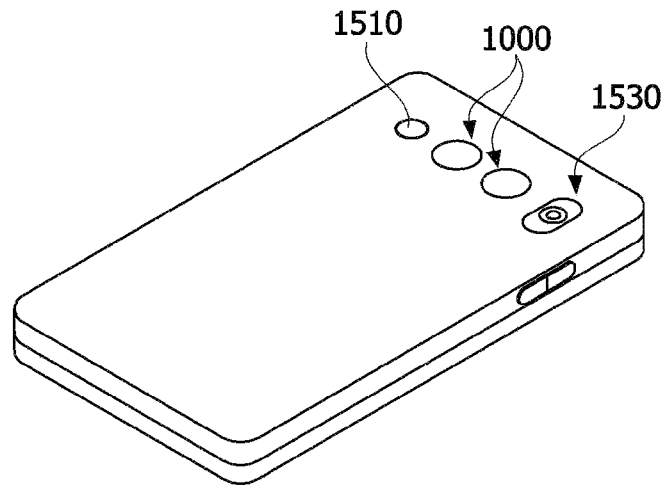
FIG. 27 is a perspective view illustrating a mobile terminal to which the camera device according to the embodiment is applied.

FIG. 27 is a perspective view illustrating a mobile terminal to which the camera module according to the embodiment is applied.

Referring to FIG. 27, a mobile terminal 1500 according to the embodiment may include the camera device 1000, a flash module 1530, and an AF device 1510, which are provided on a rear surface thereof.

The camera device 1000 may include an image photographing function and an AF function. For example, the camera device 1000 may include the AF function using an image.

The camera device 1000 processes an image frame of a still image or a moving image obtained by an image sensor in a photographing mode or a video call mode.

The processed image frame may be displayed on a predetermined display and stored in a memory. A camera (not illustrated) may also be disposed on a front surface of a body of the mobile terminal.

For example, the camera device 1000 may include the first camera device 1000 and the second camera device 1000, and the first camera module 1000 may implement an OIS function together with an AF or zooming function. In addition, the second camera device 1000 may implement the AF, zooming, and OIS functions. In this case, since the first camera device 1000 includes both the above-described first camera actuator and second camera actuator, it is possible to easily miniaturize the camera device by changing an optical path.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition in which the AF function using the image of the camera device 1000 is degraded, for example, in an environment that is close to 10 m or less or dark.

The AF device 1510 may include a light emitting unit including a vertical cavity surface emitting laser (VCSEL) semiconductor device and a light receiving unit for converting light energy into electrical energy, such as a photodiode.

Figure 28:
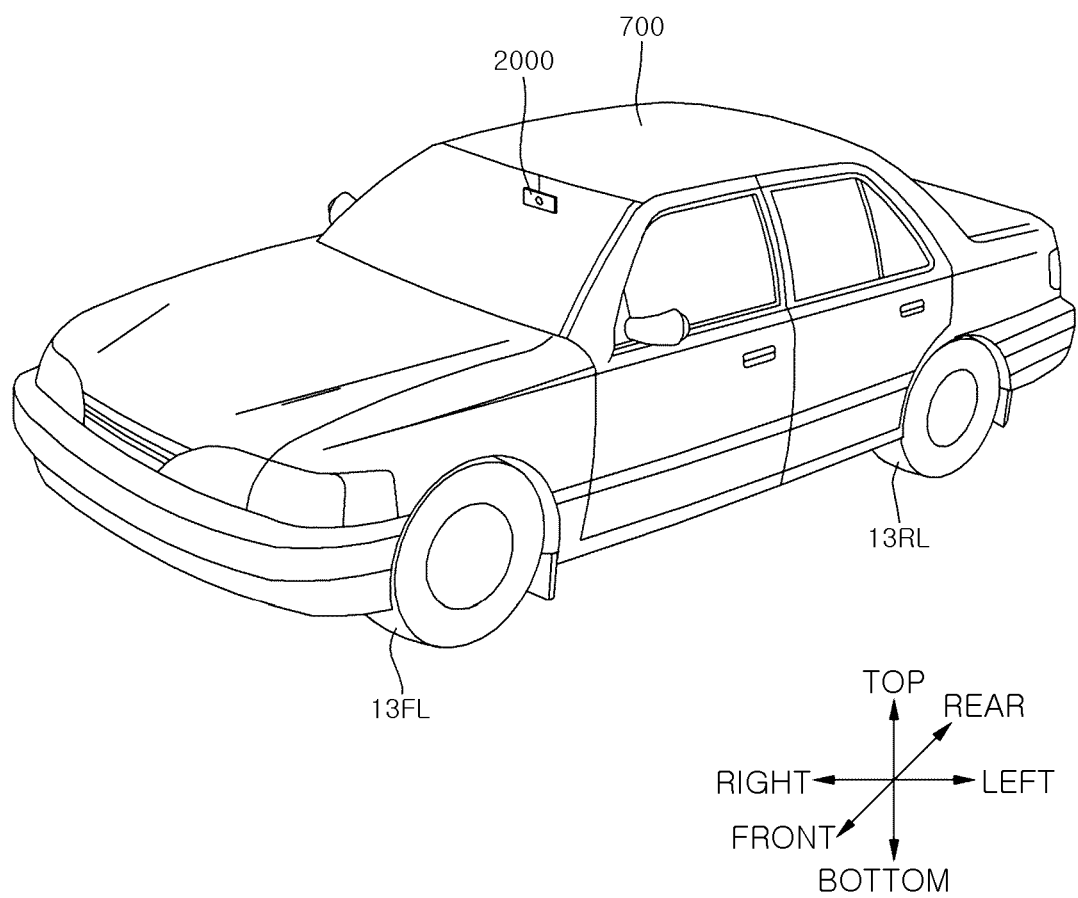
FIG. 28 is a perspective view illustrating a vehicle to which the camera device according to the embodiment is applied.

FIG. 28 is a perspective view illustrating a vehicle to which the camera device according to the embodiment is applied.

For example, FIG. 28 is a view illustrating an exterior of a vehicle including a vehicle driver assistance device to which the camera device 1000 according to the embodiment is applied.

Referring to FIG. 28, a vehicle 700 according to the embodiment may include wheels 13FL and 13FR rotated by a power source and a predetermined sensor. The sensor may be a camera sensor 2000, but the present invention is not limited thereto.

The camera sensor 2000 may be a camera sensor to which the camera device 1000 according to the embodiment is applied. The vehicle 700 according to the embodiment may acquire image information through the camera sensor 2000 for photographing a front image or a surrounding image, determine a situation in which a lane line is not identified using the image information, and generate a virtual lane line when the lane line is not identified.

For example, the camera sensor 2000 may acquire a front image by photographing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are photographed in the image photographed by the camera sensor 2000, the processor may detect the object and include the detected object in the image information. In this case, the processor may further supplement the image information by acquiring information on a distance from the object detected through the camera sensor 2000.

The image information may be information on the object photographed in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Hereinafter, a camera device according to an embodiment and an optical instrument including the same will be described with reference to the accompanying drawings as follows. For convenience of description, the camera device according to the embodiment is described using a Cartesian coordinate system (x, y, z), but may be described using another coordinate system, and the embodiment is not limited thereto. In each drawing, an x-axis and a y-axis refer to directions perpendicular to a z-axis, which is an optical axis direction, in which the z-axis direction, which is the optical axis direction, may be referred to as "first direction," the x-axis direction may be referred to as "second direction," and the y-axis direction may be referred to as "third direction." Furthermore, descriptions of the drawings below will be made based on this.

"Hand shaking correction function" applied to small camera devices of mobile devices such as a smartphone or a tablet PC may be a function of moving a lens in a direction perpendicular to the optical axis direction or tilting the lens with respect to the optical axis in order to cancel vibration (or movement) caused by a user's hand shaking.

In addition, "AF function" may be a function of automatically focusing on a subject by moving the lens in the optical axis direction according to a distance to the subject in order to obtain a clear image of the subject by an image sensor. For example, the optical axis direction may be a direction parallel to an optical axis of a lens of a lens module or perpendicular to a sensing surface of the image sensor.

Hereinafter, "camera device" may be interchangeably expressed as "camera module," "imager," or "photographer," the term "coil" may be interchangeably expressed as a coil unit or a coil body, and the term "elastic member" may be interchangeably expressed as an elastic unit or a spring.

In addition, in the following description, "terminal" may be interchangeably expressed as a pad, an electrode, a conductive layer, a bonding portion, etc.

Furthermore, the camera actuator described above with reference to FIGS. 1 to 27 may be applied to a portion of the camera device to be described with reference to FIGS. 29 to 38.

Figure 29:
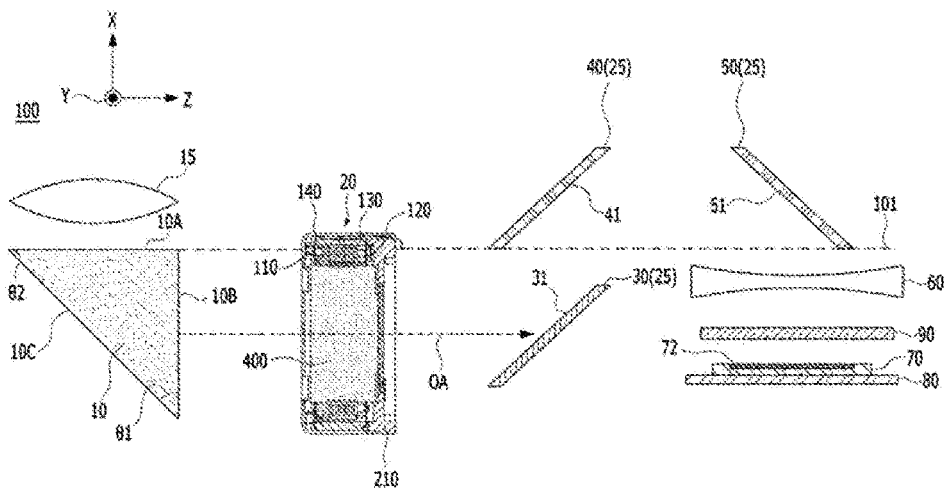
FIG. 29 is an exploded view illustrating the camera device according to the embodiment.
Figure 30:
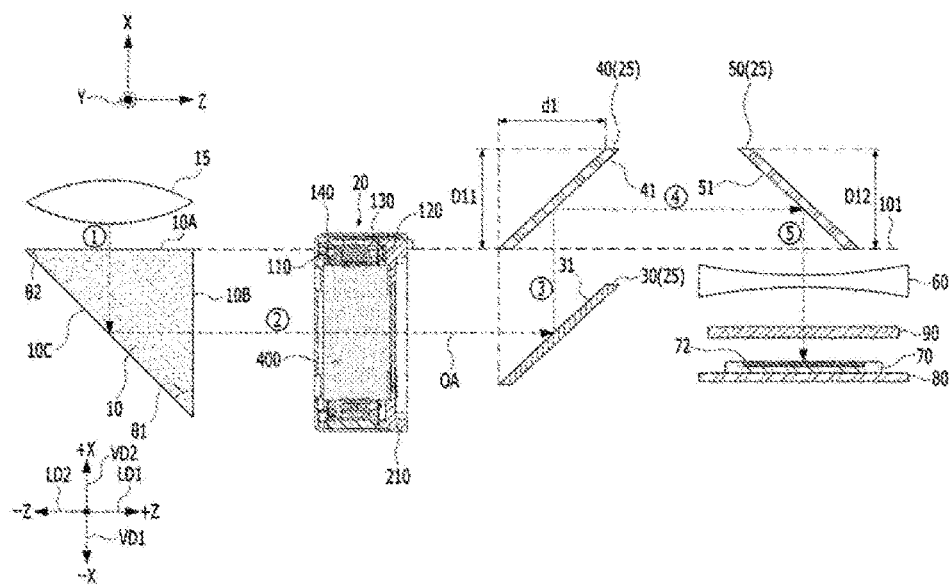
FIG. 30 is a view illustrating an optical path of the camera device in FIG. 29.

FIG. 29 is an exploded view illustrating a camera device 100 according to the embodiment, and FIG. 30 is a view illustrating an optical path of the camera device 100 in FIG. 29.

Referring to FIG. 29, the camera device 100 may include an optical path changing unit 10, a moving unit 20, a reflective unit 25, and an image sensor 70.

The moving unit 20 may be interchangeably expressed as "lens driving device," "driving unit," "voice coil motor (VCM)," "actuator," or "lens moving device," etc.

The camera device 100 may further include at least one of a lens module 400 and a circuit board 80. The camera device 100 may further include at least one of a first lens unit 15 and a second lens unit 60. The camera device 100 may further include a filter 90.

The camera device 100 may further include a cover member or housing for accommodating the optical path changing unit 10, the moving unit 20, the reflective unit 25, the image sensor 70, and the circuit board 80.

Although not illustrated in FIG. 29, the camera device 100 may further include at least one of a connector, a motion sensor, and a controller disposed on the circuit board 80.

The image sensor 70 may receive an image included in light entering after passing through the optical path changing unit 310 and the lens module 400 and convert the received image into an electrical signal.

For example, the image sensor 70 may include an imaging area 72 for detecting light passing through the lens module 400. Here, the imaging area 72 may be interchangeably expressed as an effective area, a light-receiving area, or an active area. For example, the imaging area 72 of the image sensor 70 is a portion in which the light passing through the filter 90 enters and an image included in the light is formed and may include at least one pixel. For example, the image sensor 70 may be a large-capacity image sensor, for example, an image sensor including pixels of 108 megabytes or more, but the present invention is not limited thereto. The image sensor 70 may be disposed or mounted on the circuit board 80.

The circuit board 80 may include various circuits, elements, controllers, and the like in order to convert the image formed on the image sensor 70 into an electrical signal and transmit the electrical signal to an external device. In addition, the image sensor 70 and circuit patterns electrically connected to various elements may be formed on the circuit board 80. For example, the circuit board 80 may include at least one of a rigid board and a flexible board.

The filter 90 may be disposed between the reflective unit 25 and the image sensor 70. The camera device 100 may further include a base (not illustrated) disposed on the circuit board 80 and for mounting, seating, or arranging the filter 90.

The optical path changing unit 10 may change a path of incident light and emit the light.

An emitting surface 10B of the optical path changing unit 10 may be disposed to face the lens module 400 mounted on the moving unit 20. For example, the emitting surface 10B may be perpendicular to the optical axis direction OA, but the present invention is not limited thereto.

The optical path changing unit 10 may be a member to change the optical path by reflecting or refracting light. For example, the optical path changing unit 10 may be a prism or a mirror.

The optical path changing unit 10 may include a first surface 10A, which is an incident surface into which light enters, and a second surface 10B, which is an emitting surface from which light is emitted. The optical path changing unit 10 may reflect the light entering the first surface 10A and emit the light to the second surface 10B. For example, the first surface 10A and the second surface 10B may be perpendicular to each other, and the second surface 10B may face the moving unit 20.

For example, the optical path changing unit 10 may be a right angle prism or mirror including the first surface 10A, the second surface 10B, and a third surface 10C disposed between the first surface 10A and the second surface 10B. The first surface 10A may be interchangeably expressed as "incident surface," the second surface 10B may be interchangeably expressed as "emitting surface," and the third surface 10C may be interchangeably expressed as "reflective surface."

For example, an inner angle between the first surface 10A and the second surface 10B may be a right angle. In addition, for example, each of a first inner angle θ1 between the first surface 10A and the third surface 10C and a second inner angle θ2 between the second surface 10B and the third surface 10C may be in a range of 30 to 60 degrees. For example, each of the first inner angle θ1 and the second inner angle θ2 may be 45 degrees.

For example, the optical path changing unit 10 may further include a fourth surface and a fifth surface in contact with the first to third surfaces. The fourth surface and the fifth surface of the optical path changing unit 10 may be positioned at opposite sides. For example, each of the first to third surfaces 10A to 10C may have a quadrangular shape, and each of the fourth and fifth surfaces may have a triangular shape.

For example, the optical path changing unit 10 may move or may not move in the optical axis direction. In addition, for example, the optical path changing unit 10 may move or may not move in a direction perpendicular to the optical axis direction OA. In addition, for example, the optical path changing unit 10 may not be rotated using a first axis parallel to the optical axis direction OA as a rotational axis. In addition, for example, the optical path changing unit 10 may not be rotated about a second axis perpendicular to the optical axis direction OA.

The lens module 400 may be disposed to face the second surface 10B of the optical path changing unit 10 and coupled to the moving unit 20. The lens module 400 may be interchangeably expressed as "lens unit" or "lens assembly."

For example, the lens module 400 may include at least one of a lens barrel coupled to a bobbin 110 and a lens array disposed within the lens barrel. The lens array may include at least one lens.

The moving unit 20 may be coupled to the lens module 400 and may move the lens module 400 in the optical axis direction. For example, the moving unit 20 may move at least one of the plurality of lenses included in the lens module 400 in the optical axis direction. For example, the moving unit 20 may move all of the plurality of lenses in the optical axis direction. Alternatively, the moving unit 20 may move some lenses adjacent to the second surface 10B of the optical path changing unit 10.

Referring to FIG. 29, the moving unit 20 may include a housing 140, the bobbin 110 disposed in the housing 140 and coupled to the lens module 400, and a first driving unit for moving the bobbin 110 in the optical axis direction.

The first driving unit may include a coil 120 and a magnet 130. For example, the coil 120 may be disposed in any one of the bobbin 110 and the housing 140, and the magnet 130 may be disposed in the other one of the bobbin 110 and the housing 140.

The moving unit 20 may further include an elastic member coupled to the bobbin 110 and the housing 140. The elastic member may support the bobbin 110 with respect to the housing 140. For example, the elastic member may be implemented as a leaf spring, a coil spring, a suspension wire, etc. In addition, the moving unit 20 may further include a base 210 coupled to the housing 140.

Since the bobbin 110 may be moved in the optical axis direction by an electromagnetic force generated by the interaction between the coil 120 and the magnet 130, an AF operation of the camera device 100 may be performed.

For example, by adjusting a strength or/and direction of the electromagnetic force generated by the interaction between the coil 120 and the magnet 130 by controlling a strength or/and polarity (e.g., a direction in which a current flows) of a driving signal applied to the coil 120, a movement of an AF operating unit in the first direction may be controlled to perform an AF function.

To detect a displacement or position of the bobbin 110, the camera device 100 may further include a position sensor and a sensing magnet. The position sensor may be disposed in any one of the housing and the bobbin, and the sensing magnet may be disposed in the other one of the housing and the bobbin. The position sensor may output an output signal according to a result of detecting a strength of a magnetic field of the sensing magnet. The displacement or position of the bobbin 110 may be detected based on the output signal of the position sensor. In another embodiment, the sensing magnet may be omitted, and the position sensor may detect the strength of the magnetic field of the magnet 130, and in this case, the position sensor may be disposed in any one of the housing and the bobbin, and the magnet 130 may be disposed in the other one of the housing and the bobbin.

Unidirectional or bidirectional driving of the AF operating unit may be performed by the electromagnetic force generated by the interaction between the coil 120 and the magnet 130. Here, the unidirectional driving refers to the movement of the AF operating unit in one direction, for example, upward (e.g., +Z-axis direction) based on an initial position of the AF operating unit. In addition, the bidirectional driving refers to the movement of the AF operating unit in both directions (e.g., upward (e.g., +Z-axis direction) or downward (e.g., −Z-axis direction)) based on the initial position of the AF operating unit. For example, the initial position of the AF operating unit (e.g., the bobbin 110) may be the initial position of the AF operating unit (e.g., the bobbin) in a state in which power or a driving signal is not applied to the coil 120.

Referring to FIG. 30, light may enter the first surface 10A of the optical path changing unit 10 in a first vertical direction VD1, and the optical path changing unit 10 may emit the light in a first horizontal direction LD1.

The reflective unit 25 may include a first reflector 30 for reflecting the light passing through the lens module 400 in a second vertical direction VD2 perpendicular to the first lateral direction LD1, a second reflector 40 for reflecting the light reflected from the first reflector 30 in the same direction as the first lateral direction LD1, and a third reflector 50 for reflecting the light reflected by the second reflector 40 in the first vertical direction VD1 opposite to the second vertical direction VD2.

For example, each of the first to third reflectors 30, 40, and 50 may be a mirror or a prism.

The first reflector 30 may be disposed behind the moving unit 10 and disposed to be spaced apart from the moving unit 10. The second reflector 40 may be disposed above the first reflector 30 and disposed to be spaced apart from the first reflector 40. The third reflector 50 may be disposed behind the second reflector 40.

The lens of the lens module 400 may correspond to, face, or overlap a reflective surface 31 of the first reflector 30 in the first lateral direction LD1. The reflective surface 31 of the first reflector 30 may correspond to, face, or overlap a reflective surface 41 of the second reflector 40 in the second vertical direction VD2. The reflective surface 41 of the second reflector 40 may correspond to, face, or overlap a reflective surface 51 of the third reflector 50 in the first lateral direction LD1.

The first reflector 30 may be disposed under a baseline 101. For example, an uppermost end of the first reflector 30 may be positioned under the baseline 101. The baseline 101 may be a line parallel to the first surface 10A of the optical path changing unit 10.

For example, the reflective surface 31 of the first reflector 30 may be disposed under the baseline 101. For example, an uppermost end of the reflective surface 31 of the first reflector 30 may be positioned under the baseline 101.

Each of the second reflector 40 and the third reflector 50 may be disposed on the baseline 101. For example, a lowermost end of the second reflector 40 and a lowermost end of the third reflector 50 may be positioned above the baseline 101. For example, the reflective surface 41 of the second reflector 40 and the reflective surface 51 of the third reflector 50 may be disposed on the baseline 101. For example, an uppermost end of the reflective surface 41 of the second reflector 40 and an uppermost end of the reflective surface 51 of the third reflector 50 may be positioned above the baseline 101.

For example, the third reflector 50 may be positioned at the same height as the second reflector 40. For example, the third reflector 50 may be symmetrically positioned with the second reflector 40.

For example, each of inclined angles of the reflective surfaces 31, 41, and 51 of the first to third reflectors 30, 40, and 50 based on the baseline 101 may be in a range of 30 to 60 degrees. For example, each of the inclined angles of the reflective surfaces 31, 41, and 51 of the first to third reflectors 30, 40, and 50 based on the baseline 101 may be 45 degrees.

For example, the lowermost end of the second reflector 40 (or the second reflective surface 41) may be positioned at the same height as the baseline 101. In addition, the lowermost end of the third reflector 50 (or the third reflective surface 51) may be positioned at the same height as the baseline 101. Since this may be implemented by decreasing heights of the second and third reflectors 40 and 50 based on the baseline 101, it is possible to decrease a length of the camera device 100 in the vertical direction, thereby decreasing a thickness of an optical instrument 200A on which the camera device 100 is mounted. The third reflector 50 may be positioned at the same height as the second reflector 40 based on the baseline 101.

In another embodiment, the lowermost end of the second reflector 40 (or the reflective surface 41) and the lowermost end of the third reflector 50 (or the reflective surface 51) may be positioned above the baseline 101. In this case, a distance from the baseline 101 to the lowermost end of the second reflector 40 (or the reflective surface 41) in the vertical direction may be smaller than a distance D11 from the lowermost end to the uppermost end of the second reflector 40 in the vertical direction. In addition, a distance from the baseline 101 to the lowermost end of the third reflector 50 (or the reflective surface 51) in the vertical direction may be smaller than a distance D12 from the lowermost end to the uppermost end of the third reflector 50 in the vertical direction. This is for preventing an increase in size of the camera device in the vertical direction due to an increase in length of the reflective unit 25 and preventing the occurrence of light loss due to an increased optical path.

The second reflector 40 and the third reflector 50 may be spaced apart from each other in the lateral direction LD1 or LD2. A separation distance d2 between the second reflector 40 and the third reflector 50 in the lateral direction LD1 or LD2 may be smaller than or equal to K times a distance d1 from the lowermost end to the uppermost end of the second reflector 40 (or the second reflective surface 41) in the lateral direction LD1 or LD2. For example, d2 may be a distance between an upper portion (or the uppermost end) of the second reflector 40 and an upper portion (or the uppermost end) of the third reflector 50 in the lateral direction LD1 or LD2.

For example, K may be $1 \leq K \leq 3$. Alternatively, for example, K may be 1.5. When d2 exceeds 3 times d1, the optical path increases to cause light loss.

In another embodiment, the second reflector 40 and the third reflector 50 may be in contact with each other. For example, in another embodiment, an upper end of the second reflector 40 may be in contact with an upper end of the third reflector 50.

The first lens unit 15 may be disposed on the first surface 10A of the optical path changing unit 10. The first lens unit 15 may include at least one lens and collect and emit light to the first surface 10A. In other words, the first lens unit 15 may function to make an image circle smaller and decrease sizes of components disposed behind the optical path changing unit 10 and thus decrease the size of the camera device 100.

For example, the first lens unit 15 may include a convex lens. For example, the first lens unit 15 may include an emitting surface, which is a convex surface that is convex toward the first surface 10A. For example, the incident surface of the first lens unit 15 may be a surface that is concave toward the first surface 10A. In another embodiment, the incident surface of the first lens unit 15 may be flat. An optical path of the light passing through the first lens unit 15 may be narrowed. In another embodiment, the first lens unit 15 may be omitted.

The second lens unit 60 may be disposed between the third reflector 50 and the image sensor 70. The second lens unit 60 may function to enlarge the image and form the enlarged image on the image sensor 70.

For example, the second lens unit 60 may include a concave lens. The second lens unit 60 may include at least one lens and disperse light to widen the optical path. For example, the second lens unit 60 may include a concave emitting surface when the image sensor 70 is viewed from the third reflector 50. For example, the incident surface of the second lens unit 60 may include a convex incident surface when the image sensor 70 is viewed from the third reflector 50. In another embodiment, the incident surface of the second lens unit 60 may be flat. The optical path of the light passing through the second lens unit 60 may be widened, and the second lens unit 60 may function to widen the image circle.

The filter 90 may be disposed between the second lens unit 60 and the image sensor 70. The filter 90 may function to block light in a specific frequency band from entering the image sensor 70 or pass through the light. For example, the filter 90 may be an infrared blocking filter, but the present invention is not limited thereto. For example, the filter 90 may be disposed parallel to an active area or imaging area of the image sensor 70. In another embodiment, the filter may be disposed between the third reflector 50 and the second lens unit 60. In still another embodiment, the filter may be disposed between the lens module 400 of the moving unit 20 and the first reflector 30.

A length of an optical path between the emitting surface (or the incident surface) of the first lens unit 15 and the imaging area 72 of the image sensor 70 is defined as a total track length (TTL). For example, the TTL may be a value obtained by summing lengths of path ①, path ②, path ③, path ④, and path ⑤ in FIG. 30.

The image sensor 70 may be disposed so that the imaging area 72 is parallel to the lateral direction LD1 or LD2. For example, the image sensor 70 (or the imaging area 72) may be disposed in a direction parallel to the optical axis direction OA. In addition, for example, the image sensor 70 (or the imaging area 72) may be disposed parallel to the first surface 10A of the optical path changing unit 10.

In addition, for example, the image sensor 70 (or the imaging area 72) may not face or overlap the moving unit 20 and the lens module 400 in the vertical direction VD1 or VD2. For example, the image sensor 70 (or the imaging area 72) may not face or overlap the lens of the lens module 400 in the vertical direction VD1 or VD2.

The image sensor 70 may face or overlap the optical path changing unit 10 (e.g., the second surface 10B) or/and the moving unit 20 in the optical axis direction or the lateral direction LD1 or LD2.

The second lens part 60 or/and the filter 90 may face and overlap the optical path changing unit 10 (e.g., the second surface 10B) or/and the moving unit 20 in the optical axis direction or the lateral direction LD1 or LD2.

Figure 31:
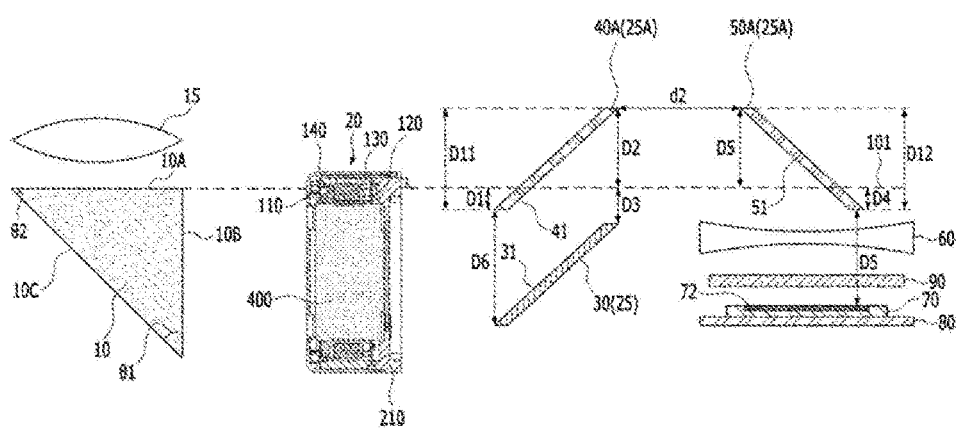
FIG. 31 is a view illustrating a reflective unit according to another embodiment.

FIG. 31 is a view illustrating a reflective unit 25A according to another embodiment. The same reference numerals as in FIGS. 29 and 30 denote the same components, and descriptions of the same components will be simplified or omitted.

Referring to FIG. 31, the reflective unit 25A in FIG. 31 is positioned differently from the reflective unit 25 in FIGS. 29 and 30. The reflective unit 25A may include the first reflector 30, a second reflector 40A, and a third reflector 50A. A portion of the second reflector 40A may be disposed under the baseline 101, and the remaining portions of the second reflector 40A may be disposed above the baseline 101. In addition, a portion of the third reflector 50A may be disposed under the baseline 101, and the remaining portions of the third reflector 50A may be disposed above the baseline 101.

A distance D1 from the baseline 101 to a lowermost end of the second reflector 40A (or the second reflective surface 41) in the vertical direction (e.g., VD1) may be smaller than a distance D2 from the baseline 101 to an uppermost end of the second reflector 40A (or the second reflective surface 41) in the vertical direction (e.g., VD2) (D1<D2).

The distance D1 from the baseline 101 to the lowermost end of the second reflector 40A (or the second reflective surface 41) may be equal to or smaller than a distance D3 from the baseline 101 to an uppermost end of the first reflector 30 (or the first reflective surface 31) (D1≤D3).

The distance D2 from the baseline 101 to the uppermost end of the second reflector 40A (or the second reflective surface 41) may be larger than the distance D3 from the baseline 101 to the uppermost end of the first reflector 30 (or the first reflective surface 31) (D2>D3). For example, each of D1 and D3 may be a distance in the first vertical direction VD2, and D2 may be a distance in the second vertical direction VD2.

A distance from the lowermost end of the second reflector 40A (or the second reflective surface 41) to the uppermost end of the second reflector 40A (or the second reflective surface 41) in the second vertical direction VD2 is defined as "first distance D11."

The distance D1 from the baseline 101 to the lowermost end of the second reflector 40A (or the second reflective surface 41) may be in a range of 0 to 20% of the first distance D11. For example, the distance D2 from the baseline 101 to the uppermost end of the second reflector 40A (or the second reflective surface 41) may be in a range of 80 to 100% of the first distance D11.

In another embodiment, D1 may be in a range of 5 to 15% of D11, and D2 may be in a range of 85 to 95% of D11.

A case in which D1 exceeds 20% of the first distance D11 is because a portion of the light passing through the lens module 400 may be blocked by the second reflector 40A so as to block the light from entering the first reflector 30.

A distance D4 from the baseline 101 to a lowermost end of the third reflector 50A (or the third reflective surface 51) in the vertical direction (e.g., VD1) may be smaller than a distance D5 from the baseline 101 to an uppermost end of the third reflector 50A (or the third reflective surface 51) in the vertical direction (e.g., VD2) (D4<D5).

The distance D4 from the baseline 101 to the lowermost end of the third reflector 50A (or the third reflective surface 51) may be equal to or smaller than the distance D3 from the baseline 101 to the uppermost end of the first reflector 30 (or the first reflective surface 31) (D4 D3).

The distance D5 from the baseline 101 to the uppermost end of the third reflector 50A (or the third reflective surface 51) may be larger than the distance D3 from the baseline 101 to the uppermost end of the first reflector 30 (or the first reflective surface 31) (D5>D3). For example, D4 may be a distance in the first vertical direction VD1, and D5 may be a distance in the second vertical direction VD2.

A distance from the lowermost end of the third reflector 50A (or the third reflective surface 51) to the uppermost end of the third reflector 50A (or the third reflective surface 51) in the vertical direction is defined as "second distance D12."

The distance D4 from the baseline 101 to the lowermost end of the third reflector 50A (or the third reflective surface 51) may be in a range of 0 to 20% of the second distance D12. For example, the distance D5 from the baseline 101 to the uppermost end of the third reflector 50A (or the third reflective surface 51) may be in a range of 80 to 100% of the second distance D12.

A case in which D4 exceeds 20% of the second distance D12 is because a portion of the light passing through the lens module 400 may be blocked by the first reflector 30 so as to block the light from entering the third reflector 50.

For example, D1 may be the same as D4, and D2 may be the same as D5. In addition, for example, D11 may be the same as D12.

The distance D5 from the lowermost end of the third reflector 50 (or the third reflective surface 51) to the image sensor 70 (or the imaging area 72) in the first vertical direction VD1 may be equal to or smaller than a distance D6 from the lowest end of the second reflector 40A (or the second reflective surface 41) to the lowest end of the first reflector 30 (or the first reflective surface 31) in the first vertical direction (D5≤D6). Since D5≤D6, it is possible to decrease the length of the camera device 100 in the second direction (X-axis direction), thereby decreasing the thickness of the optical instrument 200A.

Figure 32:
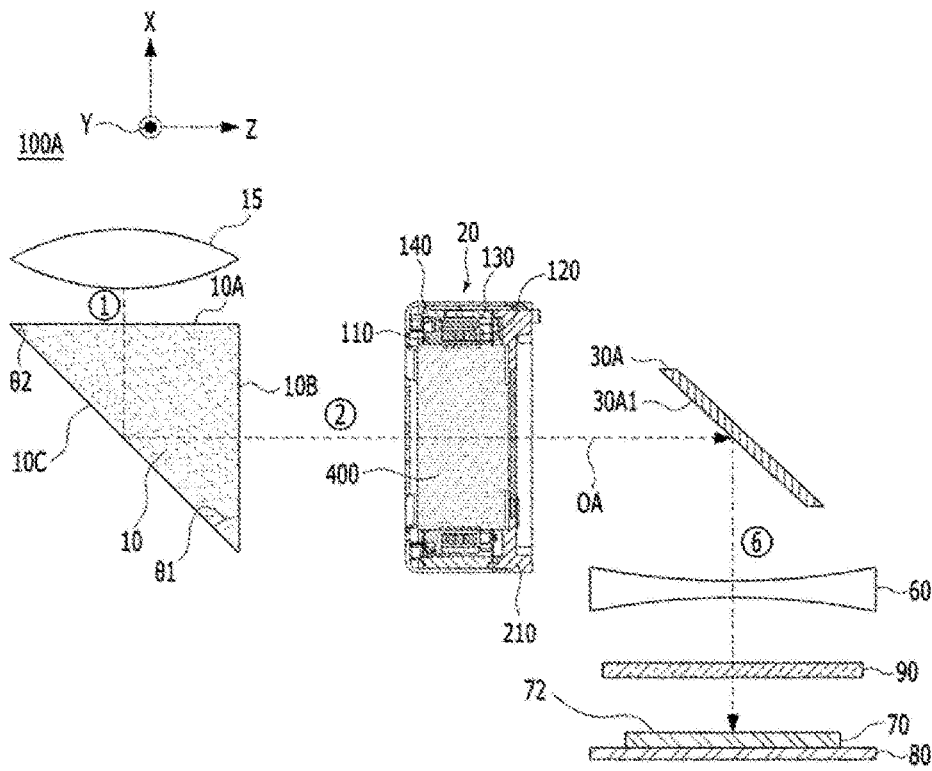
FIG. 32 is an exploded view illustrating a camera device according to another embodiment.

FIG. 32 is an exploded view illustrating a camera device 100A according to another embodiment. The same reference numerals as in FIG. 29 denote the same components, and descriptions of the same components will be simplified or omitted.

Referring to FIG. 32, the camera device 100A may include the optical path changing unit 10, the moving unit 20, a reflector 30A, the second lens part 60, and the image sensor 70. In addition, the camera device 100A may further include at least one of a first lens 15, the filter 90, and the circuit board 80.

The reflector 30A may be disposed behind the moving unit 20 (or the lens module 400) to face the moving unit 20 in the optical axis direction or the lateral direction LD1 or LD2.

The reflector 30A may include a reflective surface 30A1 facing or overlapping the moving unit 20 (or the lens module 400) in the optical axis direction or the lateral direction LD1 or LD2.

The reflective surface 30A1 of the reflector 30A may face or overlap the second lens part 60 in the vertical direction VD1 or DV2. In addition, the reflective surface 30A1 of the reflector 30A may face or overlap the filter 90 in the vertical direction VD1 or VD2. The reflective surface 30A1 of the reflector 30A may face or overlap the image sensor 70 (or the imaging area 72) in the vertical direction VD1 or VD2.

The reflector 30A reflects the light passing through the lens module 400 in the first vertical direction VD1. The reflector 30A may be a mirror or a prism. The TTL in the camera device 100A in FIG. 33 may be a value obtained by summing lengths of path ①, path ②, and path ⑥.

Figure 33:
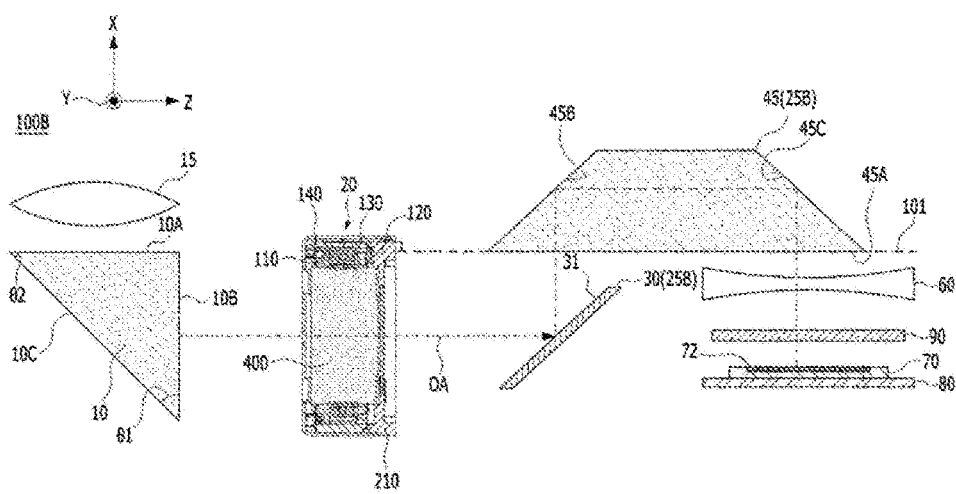
FIG. 33 is an exploded view illustrating a camera device according to still another embodiment.

FIG. 33 is an exploded view illustrating a camera device 100B according to still another embodiment. The same reference numerals as in FIG. 29 denote the same components, and descriptions of the same components will be simplified or omitted.

Referring to FIG. 33, the camera device 100B may include the optical path changing unit 10, the moving unit 20, a reflective unit 25B, and the image sensor 70. In addition, the camera device 100B may further include at least one of the first lens 15, the filter 90, the second lens part 60, and the circuit board 80.

The reflective unit 25B in FIG. 33 may include the first reflector 30 and a second reflector 45.

Instead of the second and third reflectors 40 and 50 in FIG. 29 and the second and third reflectors 40 and 50 in FIG. 30, the second reflector 45 will be implemented as one prism in FIG. 33.

The second reflector 45 may include a first surface 45A, a second surface 45B, and a third surface 45C. The light reflected from the first reflector 30 may enter a partial area of the first surface 45A, the incident light entering the first surface 45A may be reflected by the second surface 45B in the first horizontal direction LD1, the first reflected light reflected by the second surface 45B may be reflected by the third surface 45C in the first vertical direction VD1, and the second reflected light reflected by the third surface 45C may be emitted through the remaining areas of the first surface 45A. The second reflected light may pass through the second lens part 60 and/or the filter 90 and reach the imaging area 72 of the image sensor 70.

Figure 34:
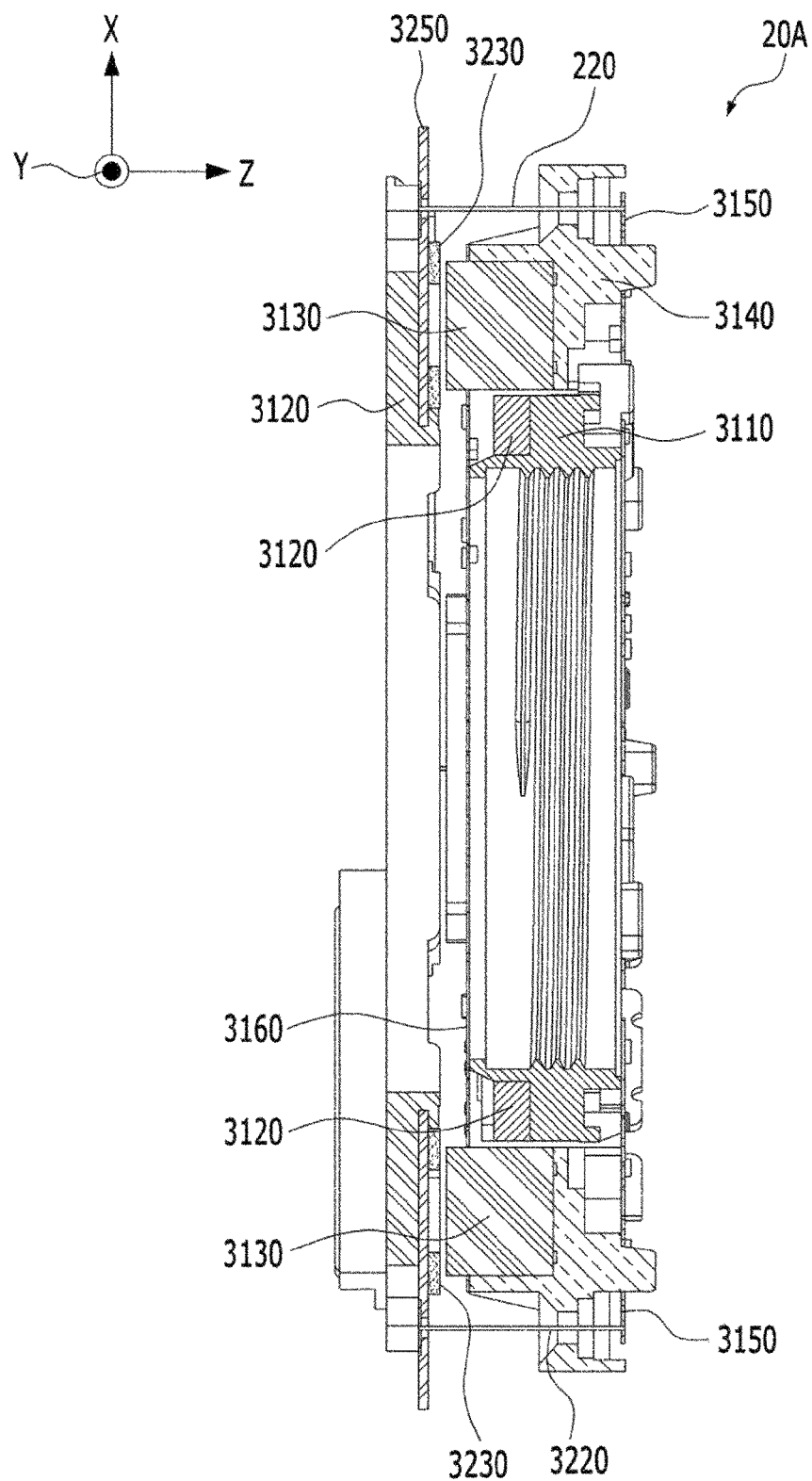
FIG. 34 is a cross-sectional view illustrating a moving unit according to another embodiment.

FIG. 34 is a cross-sectional view illustrating a moving unit 20A according to another embodiment.

Referring to FIG. 34, the moving unit 20A may perform an AF operation for focusing and an OIS operation for correcting hand shaking. In other words, the moving unit 20A may move the lens module 400 in the optical axis direction (e.g., the Z-axis direction) and move the lens module 400 in a direction (e.g., the X-axis direction or the Y-axis direction) perpendicular to the optical axis direction.

The moving unit 20A may include a housing 3140, a bobbin 3110 disposed within the housing 3140 and coupled to the lens module 400, elastic members 3150 and 3160 coupled to the bobbin 3110 and the housing 3140, a first driving unit for moving the bobbin 3110 in the optical axis direction, and a second driving unit for moving the housing 140 in a direction perpendicular to the optical axis direction.

The moving unit 20A may include a base disposed under the housing 3140, and a support member 220 coupled to the elastic member (e.g., 3150) and for supporting the housing 3140 with respect to the base. The elastic member may include the upper elastic member 3150 coupled to an upper portion of the bobbin 3110 and an upper portion of the housing 3140 and the lower elastic member 3160 coupled to a lower portion of the bobbin 3110 and a lower portion of the housing 3140. This may also be applied to the first camera actuator described with reference to FIGS. 1 to 7.

The first driving unit may include a first coil 3120 disposed in the bobbin 3110 and a magnet 3130 disposed in the housing 3140. Since the bobbin 3110 may be moved in the optical axis direction by an electromagnetic force generated by the interaction between the first coil 3120 and the magnet 3130, the AF operation of the camera device 100, 100A, or 100B may be performed.

The second driving unit may include a magnet 3130 and a second coil 3230 facing the magnet 3130 in the optical axis direction. The moving unit 20A may further include a circuit board 3250 electrically connected to the second coil 3230 and coupled to the base 3210. The circuit board 3250 may be electrically connected to the support member 220. Since the housing 3140 may be moved in the second direction (e.g., the X-axis direction) or/and the third direction (e.g., the Y-axis direction) of a plane perpendicular to the optical axis direction by an electromagnetic force generated by the interaction between the second coil 3230 and the magnet 3130, the hand shaking correction of the camera device 100, 100A, or 100B may be performed.

Figure 35A:
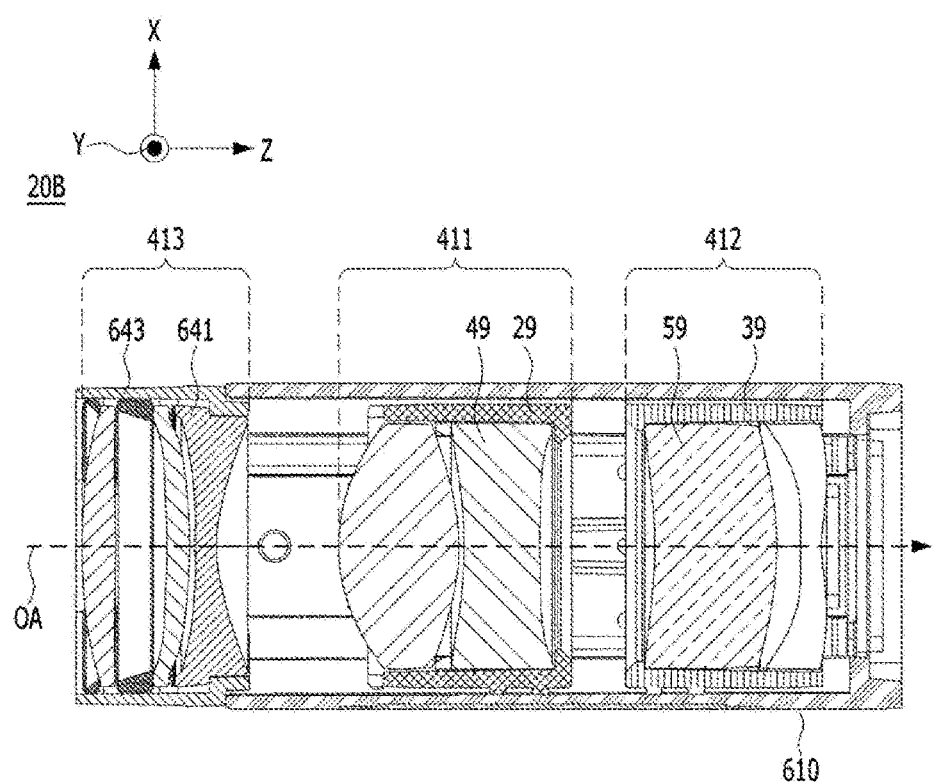
FIG. 35A is a first cross-sectional view illustrating a moving unit according to still another embodiment.
Figure 35B:
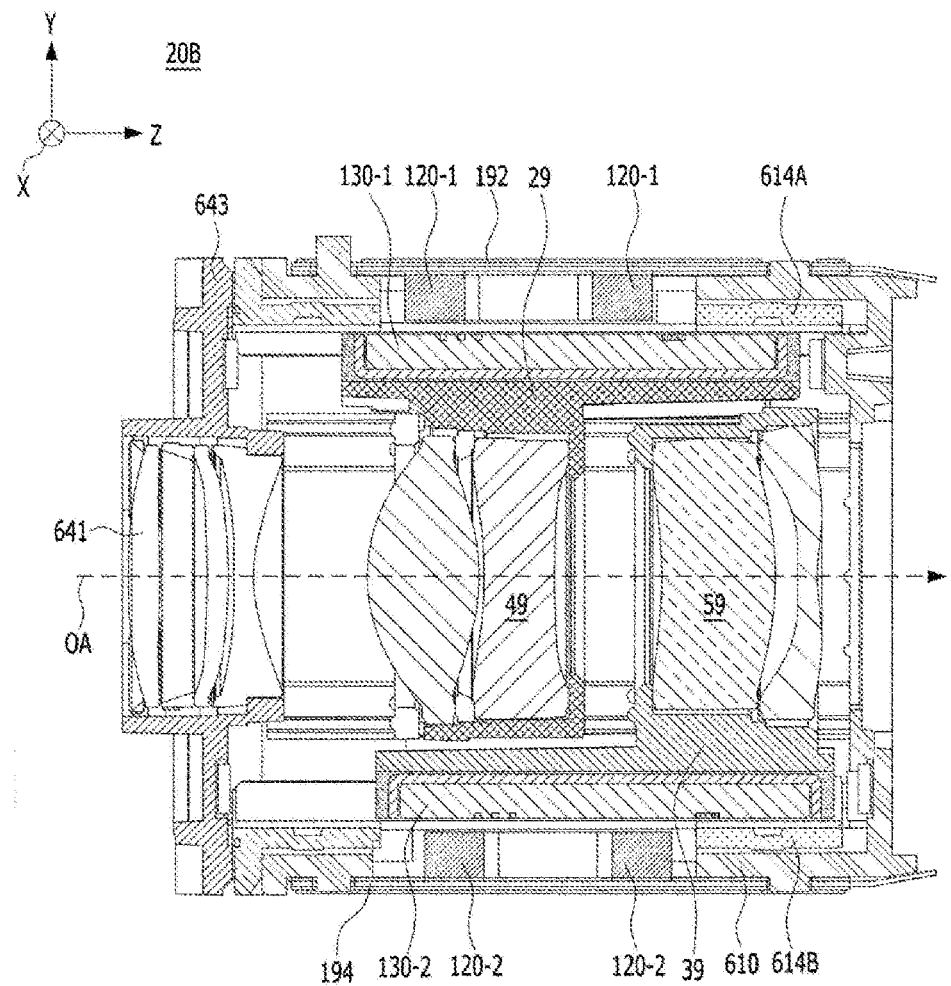
FIG. 35B is a second cross-sectional view illustrating the moving unit in FIG. 35A.

FIG. 35A is a first cross-sectional view illustrating a moving unit 20B according to still another embodiment, and FIG. 35B is a second cross-sectional view illustrating the moving unit 20B in FIG. 35A.

Referring to FIGS. 35A and 35B, the moving unit 20B includes a first lens unit 411, a second lens unit 412, and a driving unit disposed or arranged in the optical axis direction (or the first direction). The moving unit 20B may perform AF and/or zooming functions. Here, the zooming function may be a zooming function of photographing a distant subject by increasing or decreasing the magnification through a zoom lens. The lens unit may be interchangeably expressed as "lens assembly." In other words, a description of the moving unit 20B may also be applied to FIGS. 8 to 26 described above.

The driving unit may move each of the first lens unit 411 and the second lens unit 412 in the optical axis direction OA (or the first direction).

For example, the first lens unit 411 may be a zoom lens unit for performing the zooming function, and the second lens unit 412 may be a focus lens unit for performing a focusing function. For example, the driving unit may perform zooming at a preset magnification by moving the first lens unit 411 to a preset zoom position. In addition, the driving unit may perform the focus operation by moving the second lens unit 412 to a preset focus position in response to the preset zoom position.

The first lens unit 411 may include a first lens holder 29 and a first lens array 49 disposed within the first lens holder 29, and the second lens unit 412 may include a second lens holder 39 and a second lens array 59 disposed within the second lens holder 39. Each of the first and second lens arrays 29 and 49 may include a single lens or a plurality of lenses arranged in the optical axis direction.

For example, the second lens unit 412 may be disposed behind the first lens unit 411. For example, the first lens unit 411 may be disposed between the optical path changing unit 10 and the second lens unit 412.

The moving unit 20B may further include a housing 610 for accommodating the first lens unit 411 and the second lens unit 423.

The driving unit may include a first driving unit for moving the first lens unit 411 in the optical axis direction and a second driving unit for moving the second lens unit 412 in the optical axis direction.

For example, the first driving unit may include a first coil unit 120-1 disposed at a first side of the housing 610 and a first magnet unit 130-1 disposed in the first lens holder 29 and facing or overlapping the first coil unit 120-1 in the third direction. For example, the first driving unit may further include a first circuit board 192 disposed at the first side of the housing 610 and electrically connected to the first coil unit 120-1. A first driving signal for zooming may be supplied to the first coil 120-1 from the first circuit board 192.

The second driving unit may include a second coil unit 120-2 disposed at a second side of the housing 610 and a second magnet unit 130-2 disposed in the second lens holder 59 and facing or overlapping the second coil unit 120-2 in the third direction. For example, the second driving unit may further include a second circuit board 194 disposed at the second side of the housing 610 and electrically connected to the second coil unit 120-2. A second driving signal for the focus operation may be supplied to the second coil 120-2 from the second circuit board 194.

The moving unit 20B may include a first support member disposed between the housing 610 and the first lens holder 29 and a second support member disposed between the housing 610 and the second lens holder 39. For example, each of the first and second support members may be a rolling member. For example, the rolling member may be a ball member, a ball, or a ball bearing. The housing 610 may include a guide unit for guiding a rolling motion of the ball member. For example, the housing 610 may include a first guide unit corresponding to the first lens holder 29 and a second guide unit corresponding to the second lens holder 39.

At least one first ball member may be disposed between the first guide unit and the first lens holder 29, and the first lens holder 29 may be moved by the rolling motion of the first ball member in the optical axis direction in a sliding manner. In addition, at least one second ball member may be disposed between the second guide unit and the second lens holder 39, and the second lens holder 39 may be moved by the rolling motion of the second ball member in the optical axis direction in a sliding manner.

The movement of each of the first lens unit 411 and the second lens unit 412 may be controlled by controlling the first driving signal and the second driving signal. As the movement of each of the first lens unit 411 and the second lens unit 412 is controlled, a position (or a displacement) of each of the first lens unit 411 and the second lens unit 412 may be controlled, and thus the zooming and AF of the camera device 100, 100A, or 100B may be performed.

The moving unit 20B may further include a third lens unit 413 disposed in front of the first lens unit 411. The third lens unit 413 may be a fixed lens unit that does not move in the optical axis direction. For example, the third lens unit 413 may include a third lens holder 643 and a third lens array 641 including a single lens or a plurality of lenses disposed within the third lens holder 643.

Figure 36A:
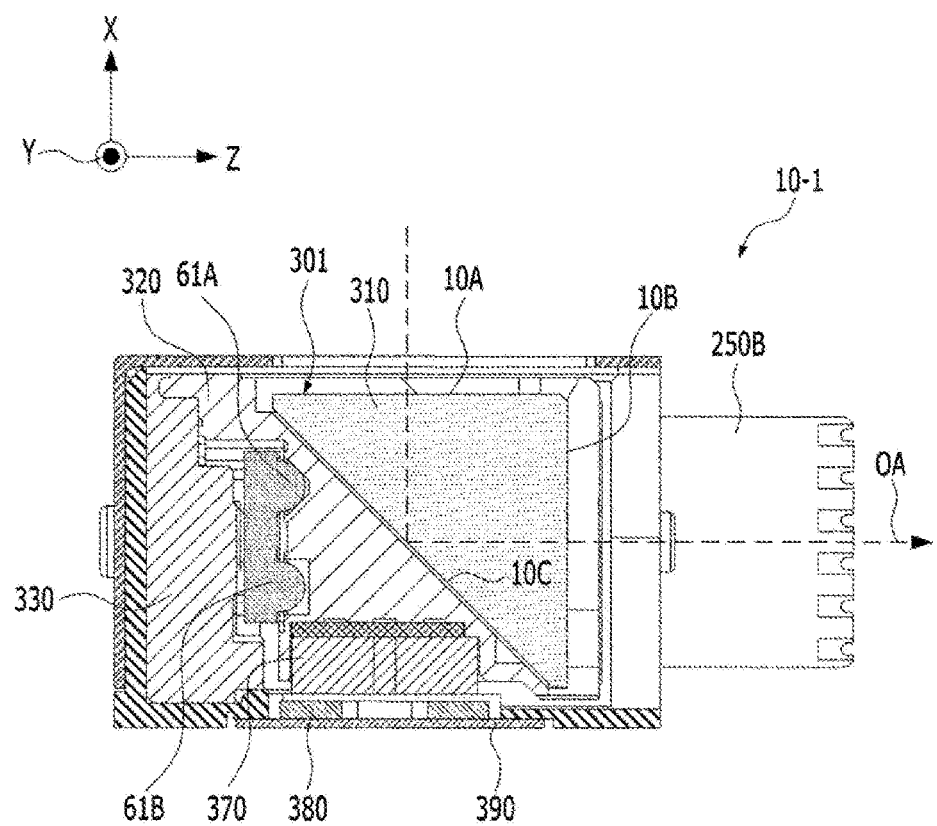
FIG. 36A is a first cross-sectional view illustrating an optical path changing unit according to another embodiment.
Figure 36B:
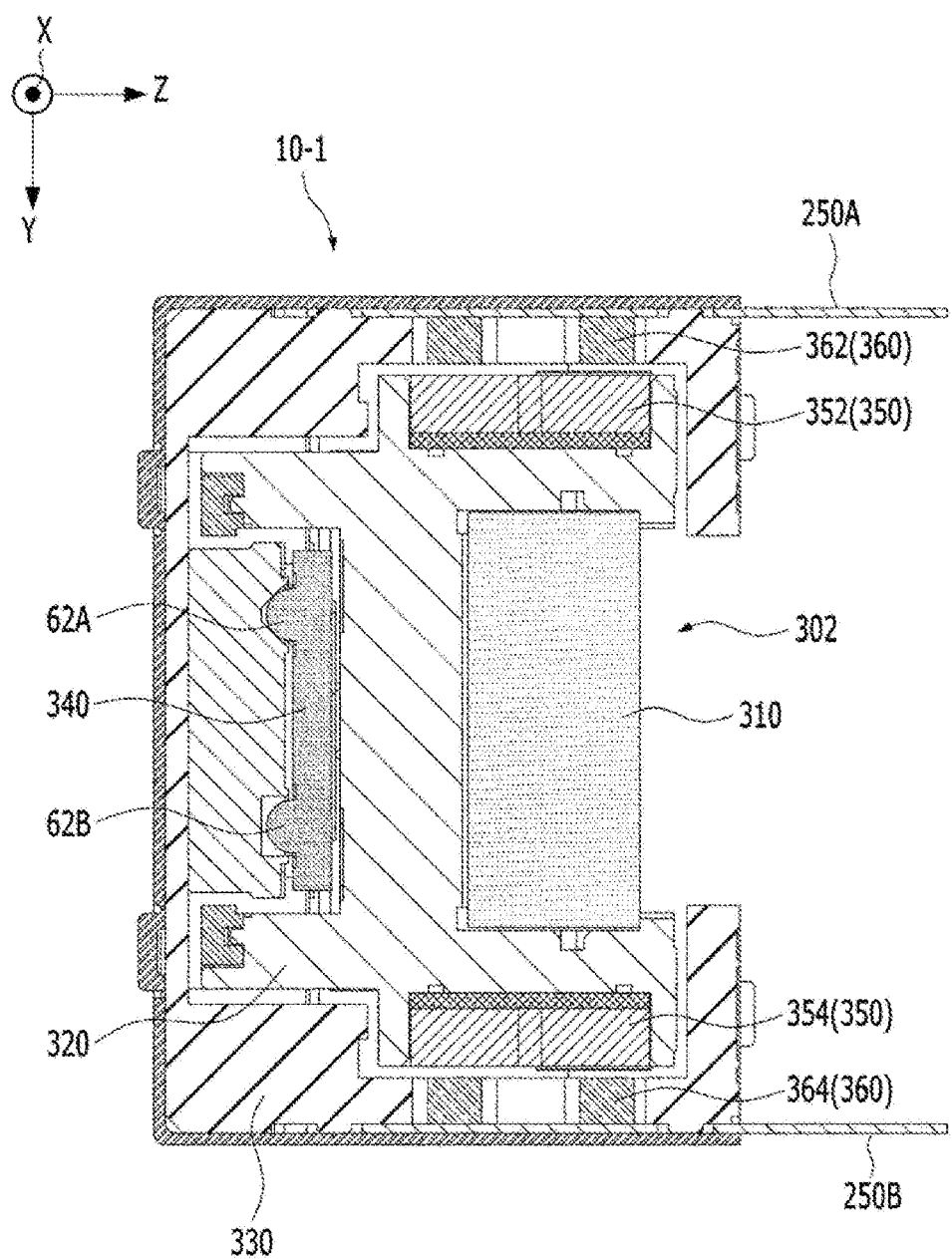
FIG. 36B is a second cross-sectional view illustrating the optical path changing unit in FIG. 36A.

FIG. 36A is a first cross-sectional view illustrating an optical path changing unit 10-1 according to another embodiment, and FIG. 36B is a second cross-sectional view illustrating the optical path changing unit 10-1 in FIG. 36A. The optical path changing unit 10-1 in FIGS. 36A and 36B may be applied or analogously applied to the camera devices according to the embodiment of FIGS. 29 to 35B.

Referring to FIGS. 36A and 36B, the optical path changing unit 10-1 may move in a direction (e.g., the Y-axis direction or the X-axis direction) perpendicular to the optical axis direction (e.g., the Z-axis direction) of the lens module 400 for OIS driving.

The optical path changing unit 10-1 may include a housing 330, a holder 320 disposed within the housing 330, an optical member 310 disposed within the holder 320, a support plate 340 disposed between the holder 320 and the housing 330, and an OIS driving unit.

The optical member 310 may be a prism (e.g., a right angle prism) for reflecting light. For example, the optical member 310 may correspond to the optical path changing unit 10 in FIG. 29, and a description of the first surface 10A, the second surface 10B, and the third surface 10C of the prism of the optical path changing unit 10 described with reference to FIG. 29 may be applied or analogously applied to the optical member 310. In addition, the following description may also be applied to FIGS. 1 to 7 in the same manner.

The holder 320 may include a first opening 301 exposing the first surface 10A of the optical member 310 and a second opening 302 exposing the second surface 10B of the optical member 310. The housing 330 may include a first opening exposing the first surface 10A of the optical member 310 disposed in the holder 320 and a second opening exposing the second surface 10B of the optical member 310.

The support plate 340 may support the holder 320 with respect to the housing 330. The support plate 340 may include at least one front protrusion 61A and 61B protruding toward the holder 320 and at least one rear protrusion 62A and 62B protruding toward the housing 330. For example, the support plate 340 may include the two front protrusions 61A and 61B disposed or arranged to be spaced apart from each other in the second direction (or the third direction) and the two rear protrusions 62A and 62B disposed or arranged to be spaced apart from each other in the third direction (or the second direction).

The holder 320 may include at least one groove where the front protrusions 61A and 61B are inserted, disposed, or seated. In addition, the housing 330 may include at least one groove where the rear protrusions 62A and 62B are inserted, disposed, or seated.

The OIS driving unit may include a first OIS driving unit and a second OIS driving unit.

For example, the first OIS driving unit may include a first OIS magnet 350 disposed in the holder 320 and a first OIS coil 360 disposed in the housing 330 and corresponding to or facing the first OIS magnet 350 in the third direction. For example, the first OIS magnet 350 may include a first magnet unit 352 disposed at the first side of the holder 320 and a second magnet unit 354 disposed at the second side of the holder 320. For example, the first magnet unit 352 and the third magnet unit 354 may be positioned at opposite sides in the third direction.

For example, the first OIS coil 360 may include a first coil unit 362 disposed at the first side of the housing 330 and a second coil unit 364 disposed at the second side of the housing 330.

In addition, the first OIS driving unit may further include a first circuit board 250A disposed at the first side of the housing 330 and electrically connected to the first coil unit 362 and a second circuit board 250B disposed at the second side of the housing 330 and electrically connected to the second coil unit 364.

The second OIS driving unit may include a second OIS magnet 370 disposed in the holder 320 and a second OIS coil 380 disposed under the housing 330 and corresponding to or facing the second OIS magnet 370 in the second direction. The second OIS driving unit may further include a third circuit board 390 disposed under the housing 330 and electrically connected to the second OIS coil 380. A first driving signal may be supplied to the first OIS coil 360, and a second driving signal may be supplied to the second OIS coil 380.

The holder 320 may be tilted or rotated at a preset angle about the second axis (X-axis) or using the second axis as the rotational axis by a first electromagnetic force generated by the interaction between the first OIS magnet 350 and the first OIS coil 360.

In addition, the holder 320 may be tilted or rotated at a preset angle about the third axis (Y-axis) or using the third axis as the rotational axis by a second electromagnetic force generated by the interaction between the second OIS magnet 370 and the second OIS coil 380. By controlling the first and second driving signals supplied to the first and second OIS driving units, the optical member 310 of the optical path changing unit 10-1 may be tilted or rotated at a preset angle about the axis (e.g., the X-axis or the Y-axis) perpendicular to the optical axis direction (e.g., the Z-axis direction) of the lens module 400, and thus the hand shaking correction of the camera device 100, 100A, or 100B may be performed.

The optical path changing unit 10-1 may include a first magnetic part (not illustrated) disposed in the holder 320 and a second magnetic part (not illustrated) disposed in the housing 330. An attractive force or a repulsive force may act between the first magnetic part and the second magnetic part, and the holder 320 and the housing 330 may press the support plate 340 by the attractive force or the repulsive force between the first magnetic part and the second magnetic part, and by the pressing, the support plate 340 may be stably coupled to the holder 320 and the housing 330.

As the size of the image sensor increases, an effective diameter and a focal length of the lens also increase, and thus the size of the camera device increases. The thickness of the optical instrument on which the camera device is mounted may be increased due to the increase in the thickness of the camera device.

As the size of the image sensor increases to improve image performance, the AF and OIS functions are essentially required to obtain high-quality images, but there are constraints in applying the AF and OIS functions due to the increase in the size and weight of the lens.

Since the camera device 100, 100A, or 100B according to the embodiment includes the optical path changing unit 10 and the reflective unit 25, 25A, or 25B, which change the optical path, it is possible to decrease the thickness or height of the camera device 100, 100A, or 100B in the vertical direction VD1 or VD2, thereby preventing an increase in length between a front surface and a rear surface of the optical instrument 200A or the thickness of the optical instrument 200A.

In addition, the camera device 100, 100A, or 100B according to the embodiment includes the second lens part 60 capable of enlarging the image, and thus may supply light suitable for the large image sensor 70 without increasing the size of the lens of the moving unit 20, 20A, or 20B.

Figure 37:
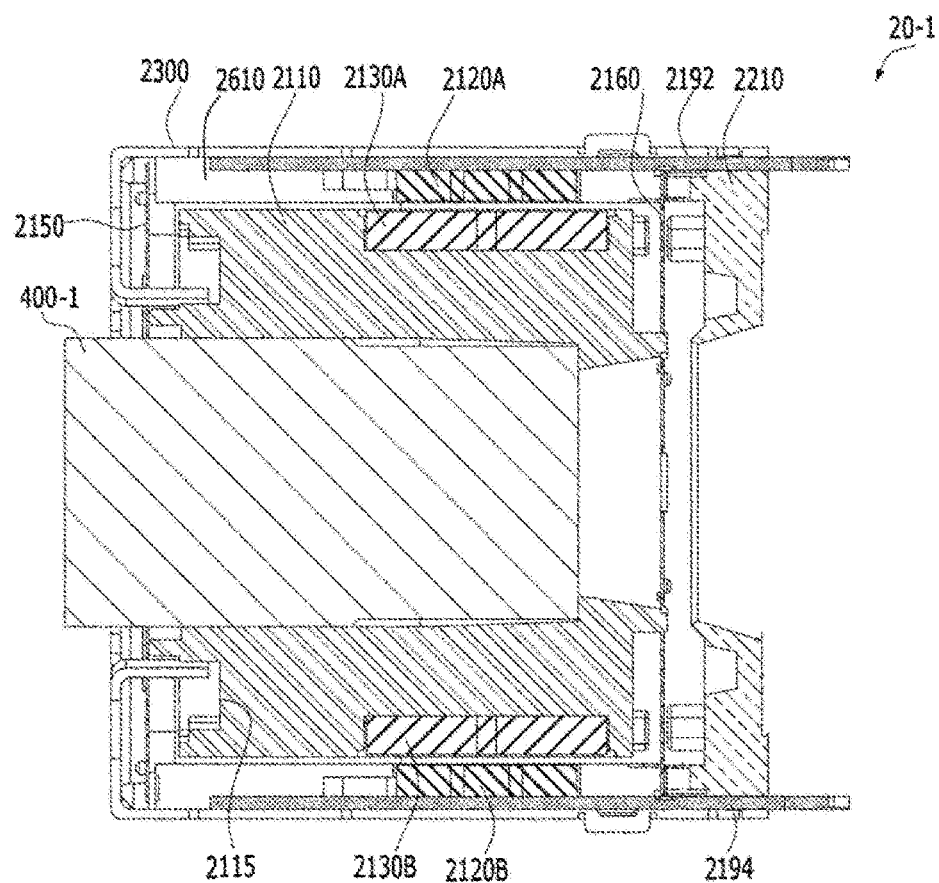
FIG. 37 is a cross-sectional view illustrating a moving unit according to yet another embodiment.

FIG. 37 is a cross-sectional view illustrating a moving unit 20-1 according to yet another embodiment.

Referring to FIG. 37, the moving unit 20-1 may include a housing 2610, a bobbin 2110 disposed within the housing 2610, a lens module 400-1 coupled to the bobbin 2110, and a driving unit for moving the bobbin 2110 in the first direction (e.g., the optical axis direction or the Z-axis direction). The bobbin 2110 may be interchangeably expressed as "lens holder."

For example, the lens module 400-1 may include at least one lens or lens array. For example, the lens module 400-1 may include various types of optical lenses. For example, the lens module 400-1 may include a front lens having positive power and a rear lens having negative power.

The moving unit 20-1 may include an elastic member coupled to the bobbin 2110 and the housing 2610, and the elastic member may support the bobbin 2110 with respect to the housing 2610 so that the bobbin 2110 may be moved in the optical axis direction. The elastic member may include at least one of an upper elastic member 150 coupled to an upper portion of the bobbin 2110 and an upper portion of the housing 2610 and a lower elastic member 160 coupled to a lower portion of the bobbin 2110 and a lower portion of the housing 2610. For example, the housing 2610 may be a fixed unit, and the bobbin 2110 may be an AF moving unit.

The moving unit 20-1 may further include a cover member 300 for accommodating the housing 2610 and the bobbin 2110. The cover member 300 may be in a shape of a box including an upper plate and a side plate and may have an open lower portion. The housing 2610 may include an opening for accommodating the bobbin 2110.

The driving unit moves the lens module 400-1 in the first direction. The driving unit may include magnets 2130A and 2130B disposed in the bobbin 2110 and coils 2120A and 2120B disposed in the housing 2610.

For example, the magnet may include the first magnet 2130A disposed on a first side portion of the bobbin 2110 and the second magnet 2130B disposed on a second side portion of the bobbin 2110.

The coil may include the first coil 2120A corresponding to, facing, or overlapping the first magnet 2130A and disposed on a first side portion of the housing 610 and the second coil 2120B corresponding to, facing, or overlapping the second magnet 2130B and disposed on a second side portion of the housing 610.

The bobbin 2110 supported by the elastic member may be moved in the first direction by an electromagnetic force generated by the interaction between the first coil 2120A and the first magnet 2130A and an electromagnetic force generated by the interaction between the second coil 2120B and the second magnet 2130B.

By controlling driving signals provided to the first and second coils 2130A and 2130B, a movement of the lens module 400-1 mounted in the bobbin 2110 in the optical axis direction or the first direction may be controlled, and thus the AF function or/and the zooming function may be performed. For example, the moving unit 20-1 may perform a fixed zooming function. The fixed zooming function may be a zooming function of photographing a distant subject by increasing the magnification through a zoom lens.

The driving unit may further include a board unit electrically connected to the first coil 2120A and the second coil 2120B. For example, the board unit may be disposed in the housing 2610. For example, the board unit may include a first circuit board 2192 disposed on the first side portion of the housing 2610 and a second circuit board 2194 disposed on the second side portion of the housing 2610.

The moving unit 20-1 may further include a base 2210 disposed behind the bobbin 2110 and/or the housing 2610. A direction toward the reflective unit 25 from the bobbin 2110 and/or housing 2610 is referred to as a rearward direction. For example, the base 2210 may be disposed behind a lower elastic member 2160.

The base 2210 may have an opening corresponding to the opening of the bobbin 2110 and/or the opening of the housing 2610. The base 2210 may be coupled to the cover member 300.

Figure 38:
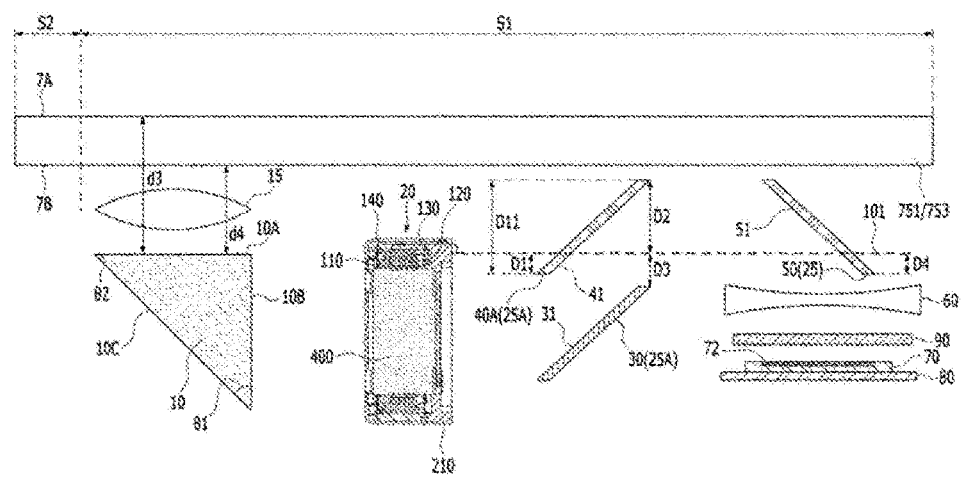
FIG. 38 is a view illustrating the camera device according to the embodiment disposed under a display panel.

FIG. 38 is a view illustrating the camera device 100 according to the embodiment disposed under a display panel 751.

Referring to FIG. 38, the optical instrument 200A may include a front surface (or a front side) and a rear surface (or a rear side) opposite to the front surface (or the front side).

For example, structurally, the front surface of the optical instrument 200A may be formed of a glass (e.g., a front tempered glass) included in the display panel 751 or a touch screen panel 753.

For example, structurally, the front surface of the optical instrument 200A may be formed of a glass (e.g., a front tempered glass) included in the display panel 751 or the touch screen panel 753.

The touch screen panel 753 and the display panel 751 may be positioned adjacent to the front surface of the optical instrument 200A. For example, the front surface of the optical instrument 200A may be "front surface 7A of the display panel 751."

A rear surface 7B of the display panel 751 may be a rear surface of a component (e.g., a glass or a board) closest to the camera device 100, 100A, or 100B among components constituting the general display panel 751.

For example, in an embedded type in which the display panel and the touch screen panel are integrated, the front surface of the optical instrument 200A may be "front surface of the display panel." Alternatively, for example, in an add-on type in which the display panel and the touch screen panel are separated, the front surface of the optical instrument 200A may be "front surface of the touch screen panel." Alternatively, for example, a front surface of a portable terminal in the case of both the embedded type and the add-on type may correspond to the front surface of the display panel. The display panel 753 may include an active area S1.

The first surface 10A of the optical path changing unit 10 may be disposed to face the front surface 7A or the rear surface 7B of the display panel 751 in the vertical direction VD1 or VD2. For example, the first surface 10A of the optical path changing unit 10 may be disposed parallel to the front surface 7A or the rear surface 7B of the display panel 751.

The first surface 10A of the optical path changing unit 10 may be disposed to be fixed at a position spaced a preset distance d3 from the front surface 7A of the display panel 751. Alternatively, for example, the first surface 10A of the optical path changing unit 10 may be disposed to be fixed at a position spaced a preset distance d4 from the rear surface 7B of the display panel 751.

For example, d3 may be a distance in the vertical direction between the first surface 10A of the optical path changing unit 10 and the front surface 7A of the display panel 751. For example, d4 may be a distance in the vertical direction between the first surface 10A of the optical path changing unit 10 and the rear surface 7B of the display panel 751.

Since a large-capacity image sensor has a large number of pixels in the imaging area 72, the size of the image sensor is large. When the imaging area of the large-capacity image sensor is disposed perpendicular to the first surface 10A of the optical path changing unit 10 illustrated in FIG. 38 or the front surface 7A (or the rear surface 7B) of the display panel 751, the size, for example, the thickness of the optical instrument may be increased.

In the embodiment, since the image sensor 70 is disposed parallel to the first surface 10A of the optical path changing unit 10 and/or the front surface 7A or the rear surface 7B of the display panel 751, even when the size of the image sensor 70 increases, the size of the optical instrument 200A in a direction perpendicular to the display panel 751 does not increase, and thus it is possible to prevent an increase in the thickness of the optical instrument 200A.

The reflective unit 25, 25A, or 25B may function to reflect the light passing through the moving unit 20 and provide the reflected light to the image sensor 70 disposed parallel to the front surface 7A or the rear surface 7B of the display panel 751.

In addition, as illustrated in FIG. 30, by adjusting the heights of the second reflector 40A and the third reflector 50A, it is possible to decrease the height of the camera devices 100, 100A, or 100B in the vertical direction VD1 or VD2, thereby preventing the increase in the thickness of the optical instrument 200A.

In addition, since the second lens part 60, the filter 90, and/or the image sensor 70 may be disposed to face or overlap the moving unit 20 or/and the second surface 10B in the optical axis direction or a direction parallel to the first surface 10A, it is possible to decrease the height of the camera device 100, 100A, or 100B, thereby preventing the increase in the thickness of the optical instrument 200A. In addition, as illustrated in FIG. 31, since D5≤D6, it is possible to decrease the height of the camera device 100, 100A, or 100B in the vertical direction, thereby preventing the increase in the thickness of the optical instrument 200A.

According to the embodiment, it is possible to increase the resolution by providing the large-capacity image sensor and prevent the increase in the size of the camera device 100, 100A, or 100B caused by the increase in the size of the large-capacity image sensor and the increase in the thickness of the optical instrument 200A on which the camera device 100, 100A, or 100B is mounted.

For example, the camera device 100 according to the embodiment may be included in an optical instrument for forming an image of an object in a space using the characteristics of light, such as reflection, refraction, absorption, interference, and diffraction and increasing the visual power of the eyes, or recording and reproducing images formed by the lens, performing optical measurement, propagating or transmitting the image, etc. For example, the optical instrument according to the embodiment may be a handphone, a portable phone, a smart phone, a portable smart device, a digital camera, a laptop computer, a digital broadcasting terminal, a personal digital assistant (PDA), a portable multimedia player (PMP), a navigation device, or the like, but is not limited thereto and may be any device for capturing videos or photos.

For example, the optical instrument according to the embodiment may include a mobile device, a phone, a smart phone, and a portable terminal in which a camera is mounted.

Figure 39:
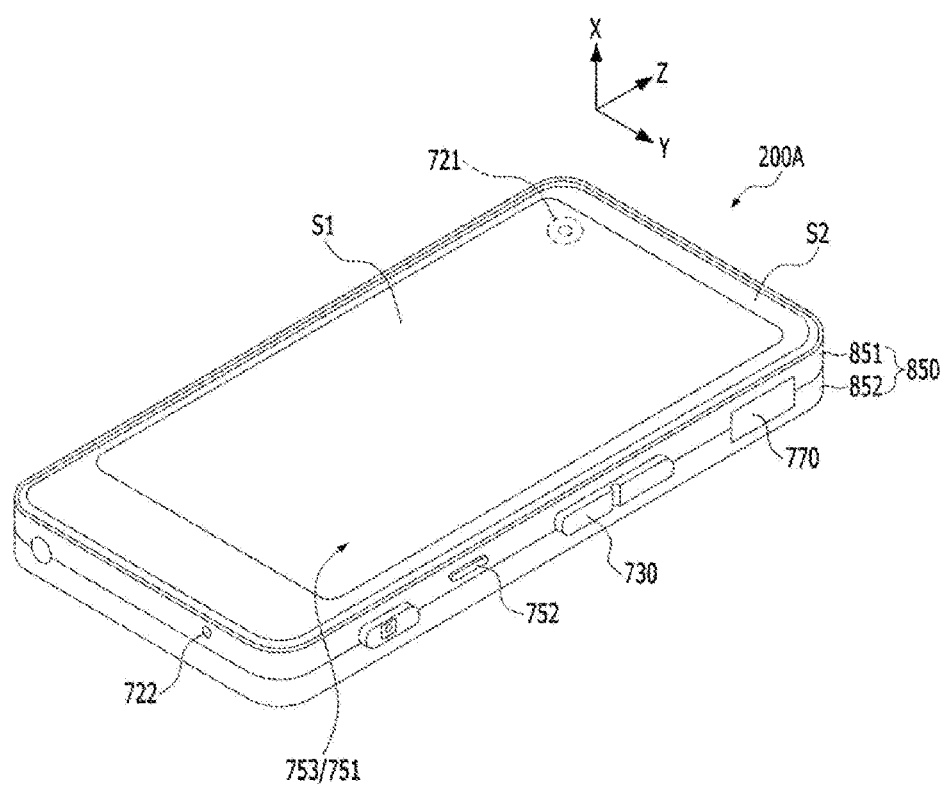
FIG. 39 is a perspective view illustrating an optical instrument according to the embodiment.
Figure 40:
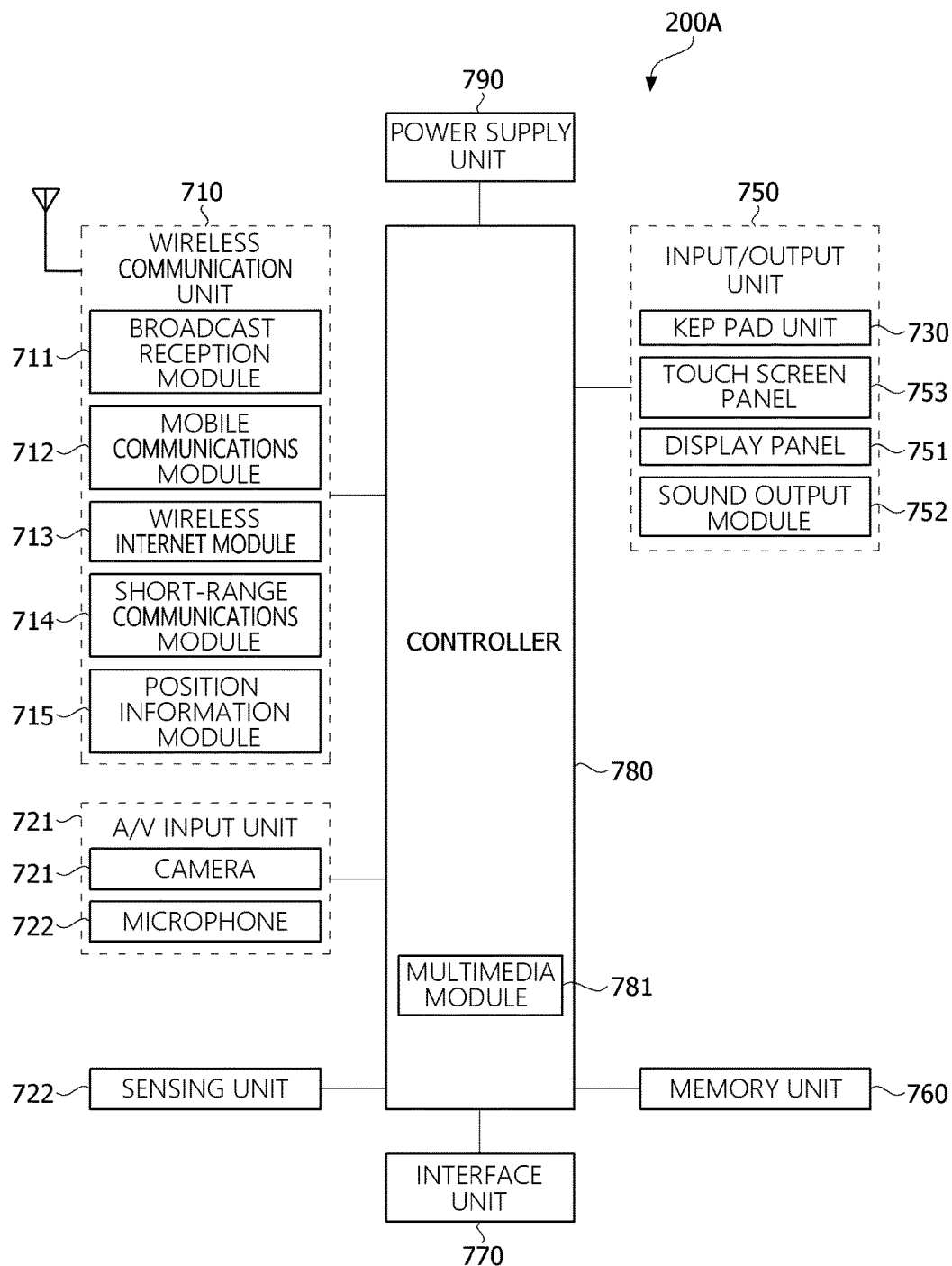
FIG. 40 is a configuration diagram illustrating the optical instrument illustrated in FIG. 39.

FIG. 39 is a perspective view illustrating the optical instrument 200A according to the embodiment, and FIG. 40 is a configuration diagram of the optical instrument 200A illustrated in FIG. 39.

Referring to FIGS. 39 and 40, the portable terminal 200A (hereinafter referred to as "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 39 may be in the form of a bar, but is not limited thereto and may have various structures such as a slide type, a folder type, a swing type, or a swivel type in which two or more sub-bodies are coupled to enable a relative movement.

The body 850 may include a case (a casing, a housing, a cover, or the like) forming an exterior. For example, the body 850 may be divided into a front case 851 and a rear case 852. Various electronic components of the terminal may be embedded in a space formed between the front case 851 and the rear case 852.

The wireless communication unit 710 may include one or more modules for enabling wireless communication between the terminal 200A and a wireless communication system or between the terminal 200A and a network in which the terminal 200A is positioned. For example, the wireless communication unit 710 may include a broadcast reception module 711, a mobile communication module 712, a wireless Internet module 713, a short-range communication module 714, and a position information module 715.

The A/V input unit 720 is for inputting an audio signal or a video signal and may include a camera 721, a microphone 722, etc.

The camera 721 may include the camera device according to any one of the embodiments.

The sensing unit 740 may detect a current state of the terminal 200A, such as an opened/closed state of the terminal 200A, a position of the terminal 200A, the presence of a user's touch, an orientation of the terminal 200A, or the acceleration/deceleration of the terminal 200A and generate a sensing signal for controlling an operation of the terminal 200A. For example, when the terminal 200A is in the form of a slide phone, the sensing unit 740 may detect whether the slide phone is opened or closed. In addition, the sensing unit 740 is in charge of detecting functions related to whether the power supply unit 790 supplies power, whether the interface unit 770 is connected to an external device, etc.

The input/output unit 750 is for generating an input or output related to vision, hearing, touch, etc. The input/output unit 750 may generate input data for controlling the operation of the terminal 200A and also display information processed by the terminal 200A.

The input/output unit 750 may include a key pad unit 730, the display panel 751, the touch screen panel 753, and a sound output module 752. The key pad unit 730 may generate input data by a key pad input.

The display panel 751 may include a plurality of pixels of which a color varies depending on an electrical signal. For example, the display panel 751 may include at least one of a liquid crystal display, a thin film transistor-liquid crystal display, an organic light-emitting diode, a flexible display, or a three-dimensional (3D) display.

The touch screen panel 753 may convert a change in a capacitance generated by a user's touch to a specific area of the display panel 751 into an electrical input signal. For example, the touch screen panel 753 may include at least one sensing electrode for detecting the user's touch.

The touch screen panel 751 and the display panel 753 may be a separated or integrated form.

For example, the touch screen panel may be an add-on type or an embedded type. In the add-on type, the touch screen panel may be attached to an outer side of the display panel in the form of a film. In the embedded type, the touch screen panel is installed inside the display panel. For example, the embedded type may include an in-cell type or an on-cell type.

The sound output module 752 may output audio data received from the wireless communication unit 710 in a call signal reception mode, a call mode, a recording mode, a voice recognition mode, a broadcast reception mode, or the like or output audio data stored in the memory unit 760. The sound output module 752 may include a speaker for outputting sounds.

The memory unit 760 may store a program for processing and controlling the controller 780 and temporarily store input/output data (e.g., a phone book, a message, an audio, a still image, a photo, or a video). For example, the memory unit 760 may store images, such as a photo or a video, photographed by the camera 721.

The interface unit 770 functions as a passage for connection with an external device connected to the terminal 200A. The interface unit 770 receives data from an external device, receives and transmits power to each of the components inside the terminal 200A, or transmits data inside the terminal 200A to the external device. For example, the interface unit 770 may include a wired/wireless headset port, an external charger port, a wired/wireless data port, a memory card port, a port connecting a device in which an identification module is provided, an audio input/output (I/O) port, a video I/O port, an earphone port, etc.

The controller 780 may control the overall operation of the terminal 200A. For example, the controller 780 may perform control and processing related to a voice call, data communication, a video call, etc.

The controller 780 may include a multimedia module 781 for playing multimedia. The multimedia module 781 may be implemented within the controller 780 or implemented separately from the controller 780.

The controller 780 may perform pattern recognition processing for recognizing a handwriting input or a drawing input on the touch screen as a text and an image, respectively.

The power supply unit 790 may receive external power or internal power under the control of the controller 780 and supply power necessary for the operation of each of the components.

The embodiments relates to the camera device 100, 100A, or 100B positioned under the display panel 751, and the camera device 100, 100A, or 100B may include the optical path changing unit 10 disposed to be spaced apart from the display panel 751 in the vertical direction (e.g., VD1), the lens module 400 disposed to be spaced apart from the optical path changing unit 10 in the lateral direction (e.g., LD1), the moving unit 20 for moving the lens module 400 in the lateral direction, the image sensor 70 disposed parallel to the display panel 751, and the reflective unit 25 for reflecting the light passing through the lens module 400 to the image sensor 70. For example, the optical axis direction of the lens module 400 (or the lens) may be parallel to the active area of the display panel 751.

At least a portion of the optical path changing unit 10 may overlap the active area in the vertical direction (or a direction perpendicular to the optical axis direction OA). For example, the entire area of the optical path changing unit 10 may overlap the active area in the vertical direction (or the direction perpendicular to the optical axis direction OA).

At least a portion of the reflective unit 25, 25A, or 25B may overlap the active area in the vertical direction (or the direction perpendicular to the optical axis direction OA). For example, the entire area of the reflective unit 25, 25A, or 25B may overlap the active area in the vertical direction (or the direction perpendicular to the optical axis direction OA).

At least a portion of the moving unit 20 may overlap the active area in the vertical direction (or the direction perpendicular to the optical axis direction OA). For example, the entire area of the moving unit 20 may overlap the active area in the vertical direction (or the direction perpendicular to the optical axis direction OA).

At least a portion of the camera device 100, 100A, or 100B may overlap the active area of the display panel 751 in the vertical direction (or the direction perpendicular to the optical axis direction OA). For example, at least one of the moving unit 20, the circuit board 80, and the image sensor 70 may overlap the active area of the display panel 751 in the vertical direction. For example, at least a portion of the image sensor 70 may overlap the active area in the vertical direction. Alternatively, at least a portion of the image sensor 70 may overlap the active area in a direction perpendicular to the display panel 751. At least a portion of the image sensor 70 may be disposed under the active area. For example, the active area may be a display area or view area in which an image is displayed. For example, the active area of the image sensor 70 may be disposed or arranged parallel to the front surface 7A or the rear surface 7B of the display panel 751.

The front surface (or the front side) of the optical instrument 200A may include a view area S1 visible to a user and a non-view area S2 invisible to the user.

The view area S1 may be a display surface in which an image is displayed on the front surface 7A of the display panel 751 so that the user may see the image. In addition, a touch surface touched by the user may be included in the view area. In addition, for example, the non-view area S2 may be an area (e.g., a black area) in which an image that may be identified by the user is not visible. For example, the non-view area S2 may be disposed around the active area. For example, the non-view area S2 may be disposed to surround the active area.

The camera device 100, 100A, or 100B may be disposed behind the view area S1 of the optical instrument 200A. For example, the camera device 100, 100A, or 100B may not be exposed to the view area S1 of the optical instrument 200A. For example, at least a portion of the camera device 100, 100A, or 100B may overlap the view area S1 in the vertical direction. In addition, the camera device 100, 100A, or 100B may not overlap the non-view area S2 in the vertical direction or a direction perpendicular to the front surface 7A of the display panel.

In another embodiment, at least a portion of the camera device 100, 100A, or 100B may overlap the non-view area S2 in the vertical direction or the direction perpendicular to the front surface 7A of the display panel.

The display panel 751 may include an active area including a plurality of pixels. For example, the active area may be included in the view area S1.

In addition, for example, at least a portion of the camera device 100, 100A, or 100B may overlap at least one of the pixels in the active area of the display panel 751 in the vertical direction. For example, the reflective unit 25, 25A, or 25B may overlap at least one of the pixels in the active area in the vertical direction or the direction perpendicular to the front surface 7A of the display panel. In addition, at least one of the moving unit 20, the circuit board 80, and the image sensor 70 may overlap at least one of the pixels in the active area in the vertical direction or the direction perpendicular to the front surface 7A of the display panel.

For example, the first surface 10A of the optical path changing unit 10 of the camera device may be opposite to or may face the active area of the display panel 751 in the vertical direction. For example, the first surface 10A of the optical path changing unit 10 of the camera device may be opposite to or may face at least one of the pixels in the active area of the display panel 751 in the vertical direction.

Since the camera device 100, 100A, or 100B is disposed behind the active area of the display panel 751, in the embodiment, it is possible to make a bezel of the optical instrument 200A thinner and increase the display area (e.g., the active area). In addition, for example, the speaker of the sound output module 752 may be disposed on a side surface of the optical instrument 200A in order to increase the display area.

In addition, in the camera devices 100, 100A, and 100B according to the embodiments, the distance d3 or d4 in the vertical direction between the front surface 7A (or the rear surface 7B) of the display panel 751 and the first surface 10A of the optical path changing unit 10 is constant regardless of the AF operation.

Therefore, even under a condition in which an amount of light is decreased by the touch screen panel 753 and the display panel 751, an amount of light entering the optical path changing unit 10 may be uniform. According to the embodiments, since the amount of light entering the camera device is uniform, it is possible to smoothly perform the AF operation even under the condition in which the amount of light is decreased by the touch screen panel 753 and the display panel 751 and prevent degradation of the resolution of the camera device.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator, comprising:
   a housing;
   a first lens assembly and a second lens assembly configured to move in an optical axis direction based on the housing; and
   a driving unit configured to move the first lens assembly and the second lens assembly, wherein the driving unit includes a driving coil and a driving magnet facing the driving coil, wherein the driving coil includes a first pattern area and a second pattern area disposed in a direction perpendicular to the first pattern area, and wherein a width of the driving coil in the first pattern area differs from a width of the driving coil in the second pattern area.

2. The camera actuator of claim 1, wherein the driving coil includes:
   a third pattern area facing the first pattern area; and
   a fourth pattern area facing the second pattern area, and wherein a width of the driving coil in the fourth pattern area is larger than a width of the driving coil in the third pattern area.

3. The camera actuator of claim 2, wherein the driving coil includes a curve pattern area connecting the first pattern area to the second pattern area.

4. The camera actuator of claim 3, wherein the curve pattern area includes a first curve pattern area to a fourth curve pattern area.

5. The camera actuator of claim 1, wherein the width of the driving coil in the first pattern area is smaller than the width of the driving coil in the second pattern area.

6. The camera actuator of claim 1, wherein the driving coil is formed with a plurality of turns.

7. The camera actuator of claim 6, wherein the width of the driving coil in the first pattern area is smaller than the width of the driving coil in the second pattern area.

8. The camera actuator of claim 4, wherein the first pattern area is disposed at one side, wherein the second pattern area is disposed to be spaced apart from the first pattern area, and wherein the third pattern area is disposed to be spaced apart from the fourth pattern area.

9. The camera actuator of claim 8, wherein an innermost turn among a plurality of turns of the driving coil has a first point which is one end of any one of the first pattern area or the third pattern area, wherein an outermost turn among the plurality of turns of the driving coil has a second point which is one end of any one of the first pattern area or the third pattern area, and wherein a virtual line connecting the first point to the second point is inclined at a first angle with respect to an optical axis.

10. The camera actuator of claim 9, wherein the first curve pattern area is an area in which a width of the driving coil in the first curved area is changed, and wherein a first angle between a first boundary line in contact with the first pattern area and a second boundary line in contact with the second pattern area is in a range of 20 to 45 degrees.

11. The camera actuator of claim 9, wherein the first angle may be in a range of 20 to 45 degrees.

12. The camera actuator of claim 1, wherein a maximum moving distance of the driving magnet may be larger than or equal to the width of the driving coil in the second pattern area.

13. The camera actuator of claim 1, wherein a ratio of the width of the driving coil in the first pattern area to the width of the driving coil in the second pattern area may be in a range of 1:1.5 to 1:4.5.

14. The camera actuator of claim 13, wherein the width of the driving coil in the first pattern area may be a length in a vertical direction between an innermost turn and an outermost turn among the plurality of turns in the driving coil in the first pattern area, and the width of the driving coil in the second pattern area may be a length in an optical axis direction between an innermost turn and an outermost turn among the plurality of turns in the driving coil in the second pattern area.

15. The camera actuator of claim 2, wherein a ratio of a first width to a second width may be in a range of 1:1.5 to 1:4, wherein the first width may be a distance in a vertical direction between the outermost turn among the plurality of turns in the driving coil in the first pattern area and the outermost turn among the plurality of turns in the driving coil in the third pattern area, and wherein the second width may be a distance in the optical axis direction between the outermost turn among the plurality of turns in the driving coil in the second pattern area and the outermost turn among the plurality of turns in the driving coil in the fourth pattern area.

16. The camera actuator of claim 2, wherein a ratio of a third width to a fourth width may be in a range of 1:1.5 to 1:2.5, wherein the third width may be a distance in a vertical direction between the innermost turn among the plurality of turns in the driving coil in the first pattern area and the innermost turn among the plurality of turns in the driving coil in the second pattern area, and wherein the fourth width may be a distance in the optical axis direction between the innermost turn among the plurality of turns in the driving coil in the third pattern area and the innermost turn among the plurality of turns in the driving coil in the fourth pattern area.

17. The camera actuator of claim 3, wherein a width of the driving coil in the curve pattern area may decrease as the width approaches the first pattern area or the third pattern area.

18. The camera actuator of claim 1, wherein a surface of the driving magnet facing the driving coil may include a first magnet area having a first polarity, and a second magnet area having a second polarity, and the first polarity may be opposite to the second polarity.

19. The camera actuator of claim 18, wherein the first magnet area and the second magnet area may be spaced apart from each other in the optical axis direction.

20. The camera actuator of claim 19, wherein lengths of the first magnet area and the second magnet area in a vertical direction may be smaller than a length of the second pattern area in the vertical direction.

* * * * *